(12) United States Patent
Kheit

(10) Patent No.: US 12,088,541 B1
(45) Date of Patent: Sep. 10, 2024

(54) PRIVACY SECURE SOCIAL SET APPARATUSES, METHODS AND SYSTEMS

(71) Applicant: John Kheit, Lago Vista, TX (US)

(72) Inventor: John Kheit, Lago Vista, TX (US)

( * ) Notice: Subject to any disclaimer, the term of this patent is extended or adjusted under 35 U.S.C. 154(b) by 527 days.

(21) Appl. No.: 17/488,264

(22) Filed: Sep. 28, 2021

Related U.S. Application Data

(63) Continuation-in-part of application No. 15/296,019, filed on Oct. 17, 2016.

(60) Provisional application No. 62/242,264, filed on Oct. 15, 2015, provisional application No. 62/242,270, filed on Oct. 15, 2015, provisional application No. 63/084,560, filed on Sep. 28, 2020, provisional application No. 63/115,567, filed on Nov. 18, 2020, provisional application No. 63/128,833, filed on Dec. 21, 2020, provisional application No. 63/135,741, filed on Jan. 10, 2021, provisional application No. 63/137,322, filed on Jan. 14, 2021, provisional (Continued)

(51) Int. Cl.
*H04L 51/046* (2022.01)
*G06F 16/22* (2019.01)
*G06F 16/28* (2019.01)

(52) U.S. Cl.
CPC ........ *H04L 51/046* (2013.01); *G06F 16/2272* (2019.01); *G06F 16/289* (2019.01)

(58) Field of Classification Search
CPC ... H04L 51/046; G06F 16/2272; G06F 16/289
USPC ........................................................ 715/741
See application file for complete search history.

(56) References Cited

U.S. PATENT DOCUMENTS 7,634,448 B1 * 12/2009 Ramachandran .... G07G 1/0045
705/64
2007/0136140 A1 * 6/2007 Smith, Jr. .......... G06Q 30/0639
705/26.62

(Continued)

OTHER PUBLICATIONS

Matrix, matrix.org, visited Sep. 28, 2021.

(Continued)

*Primary Examiner* — Stephen S Hong
*Assistant Examiner* — Ahamed I Nazar
(74) *Attorney, Agent, or Firm* — Hanchuk Kheit LLP.; Walter G. Hanchuk

(57) ABSTRACT

The Privacy Secure Social Set Apparatuses, Methods and Systems ("PSSS") transforms atom interaction mechanism actuations, atom action interaction mechanism actuations, message shard send request, resource production allocation indication inputs via PSSS components into message shard acknowledgement response, user interface display, message shard acknowledgement response, crypto currency provision notification request outputs. An atom interaction interface mechanism initial actuation is obtained from a user. An atom messaging object datastructure corresponding to the actuated atom interaction interface mechanism is determined. An atom terms datastructure associated with the atom messaging object datastructure is retrieved. Atom action interaction interface mechanisms corresponding to allowed common atom actions are generated and provided for the user. An atom action interaction interface mechanism subsequent actuation is obtained from the user. A performed atom action is determined. An atom action message corresponding to the performed atom action is generated.

22 Claims, 45 Drawing Sheets

Related U.S. Application Data application No. 63/172,073, filed on Apr. 7, 2021, provisional application No. 63/173,047, filed on Apr. 9, 2021.

(56) References Cited

U.S. PATENT DOCUMENTS

| | | | | |
|---|---|---|---|---|
| 2009/0114716 A1* | 5/2009 | Ramachandran | ....... | G07F 19/20 235/379 |
| 2011/0145093 A1* | 6/2011 | Paradise | ................ | G06Q 30/02 705/26.1 |
| 2012/0271712 A1* | 10/2012 | Katzin | ................. | G06Q 20/047 705/14.51 |
| 2021/0152508 A1* | 5/2021 | Willis | ...................... | H04L 51/18 |
| 2022/0043919 A1* | 2/2022 | Crumb | ................... | H04N 7/155 |

OTHER PUBLICATIONS

Element, https://en.wikipedia.org/wiki/Element_(software), visited Sep. 28, 2021.
Rumble, https://github.com/Marlinski/Rumble, visited Sep. 28, 2021.
InterPlanetary File System, https://en.wikipedia.org/wiki/InterPlanetary_File_System, visited Sep. 28, 2021.
Gab, https://en.wikipedia.org/wiki/Gab_(social_network), visited Sep. 28, 2021.
Mastodon, https://en.wikipedia.org/wiki/Mastodon_(software), visited Sep. 28, 2021.
Facebook, https://en.wikipedia.org/wiki/Facebook, visited Sep. 28, 2021.
Twitter, https://en.wikipedia.org/wiki/Twitter, visited Sep. 28, 2021.
IMessage, https://en.wikipedia.org/wiki/IMessage, visited Sep. 28, 2021.
Snapchat, https://en.wikipedia.org/wiki/Snapchat, visited Sep. 28, 2021.
Slack, https://en.wikipedia.org/wiki/Slack_(software), visited Sep. 28, 2021.
Zoom, https://en.wikipedia.org/wiki/Zoom_(software), visited Sep. 28, 2021.
YouTube, https://en.wikipedia.org/wiki/YouTube, visited Sep. 28, 2021.
LBRY, https://en.wikipedia.org/wiki/LBRY, visited Sep. 28, 2021.
Internet Archive, https://en.wikipedia.org/wiki/Internet_Archive, visited Sep. 28, 2021.
Amazon Web Services, https://en.wikipedia.org/wiki/Amazon_Web_Services, visited Sep. 28, 2021.
Bitcoin, https://en.wikipedia.org/wiki/Bitcoin, visited Sep. 28, 2021.
Polkadot, https://polkadot.network/, visited Sep. 28, 2021.
Adamant, https://adamant.im/, visited Sep. 28, 2021.
BitTorrent, https://en.wikipedia.org/wiki/BitTorrent, visited Sep. 28, 2021.
Freenet, https://en.wikipedia.org/wiki/Freenet, visited Sep. 28, 2021.
Akamai, https://en.wikipedia.org/wiki/ Akamai_Technologies, visited Sep. 28, 2021.

\* cited by examiner

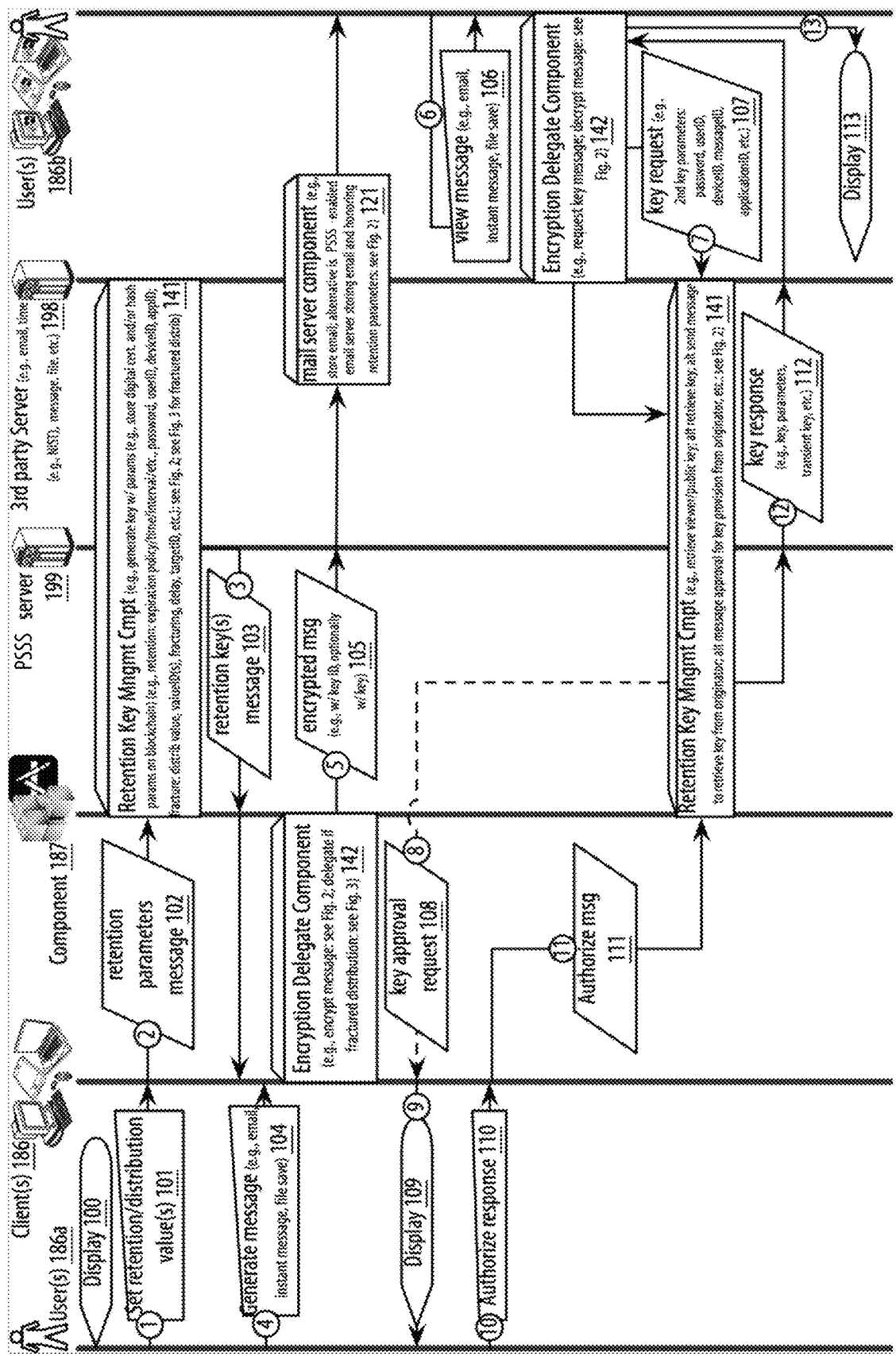
FIGURE 1: PSSS DATA FLOW

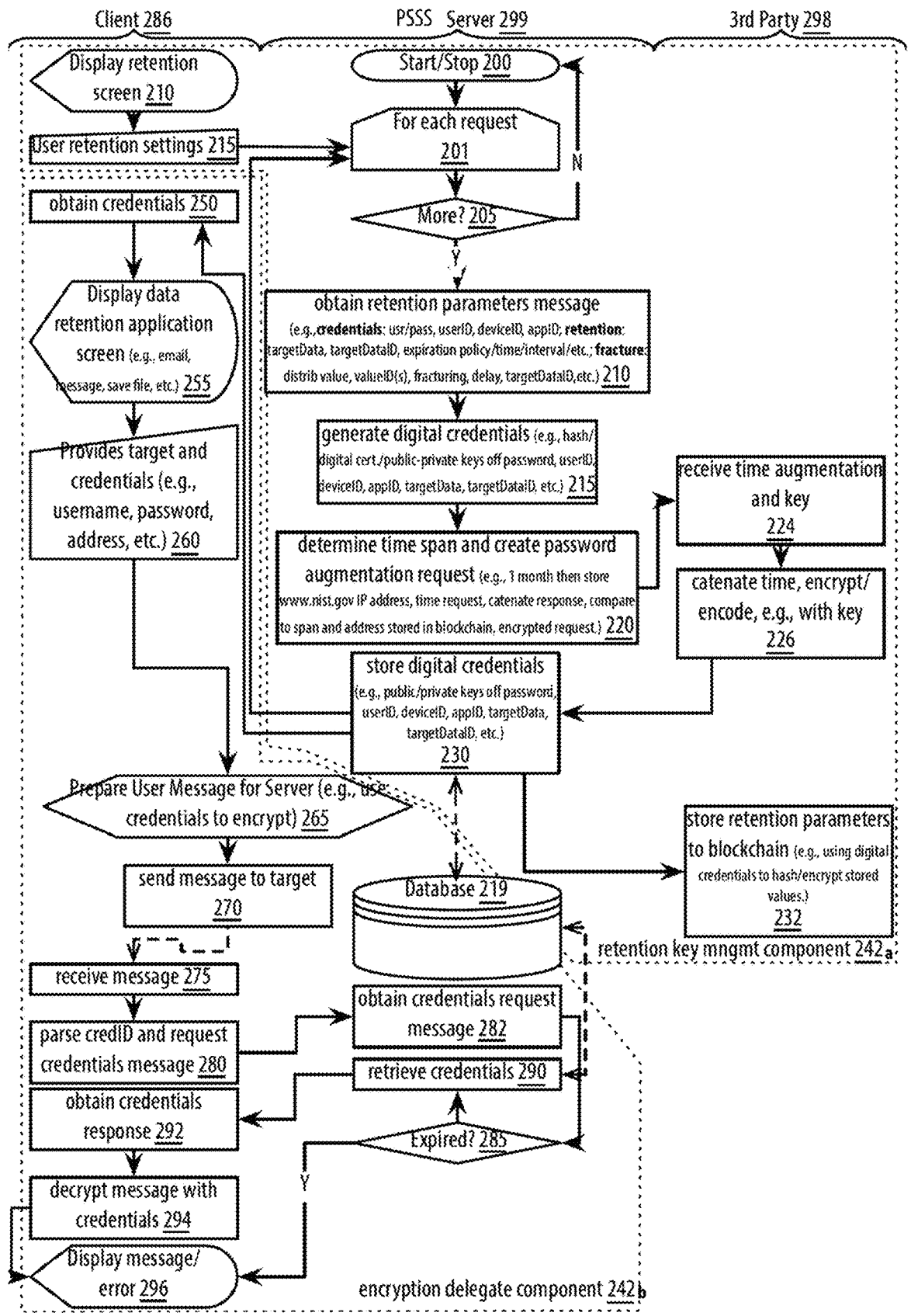
FIGURE 2: PSSS COMPONENTS

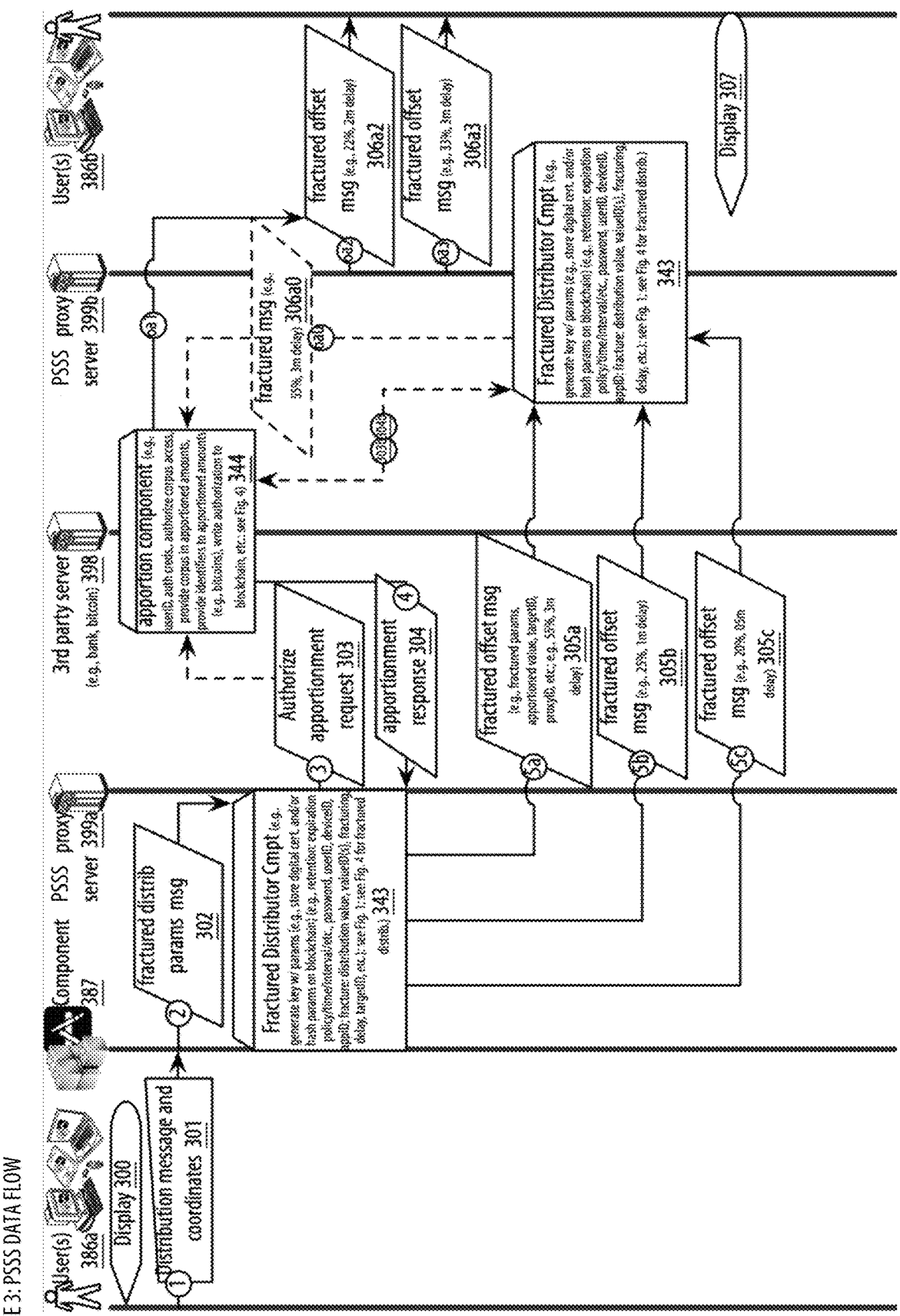
FIGURE 3: PSSS DATA FLOW

FIGURE 4: PSSS COMPONENTS
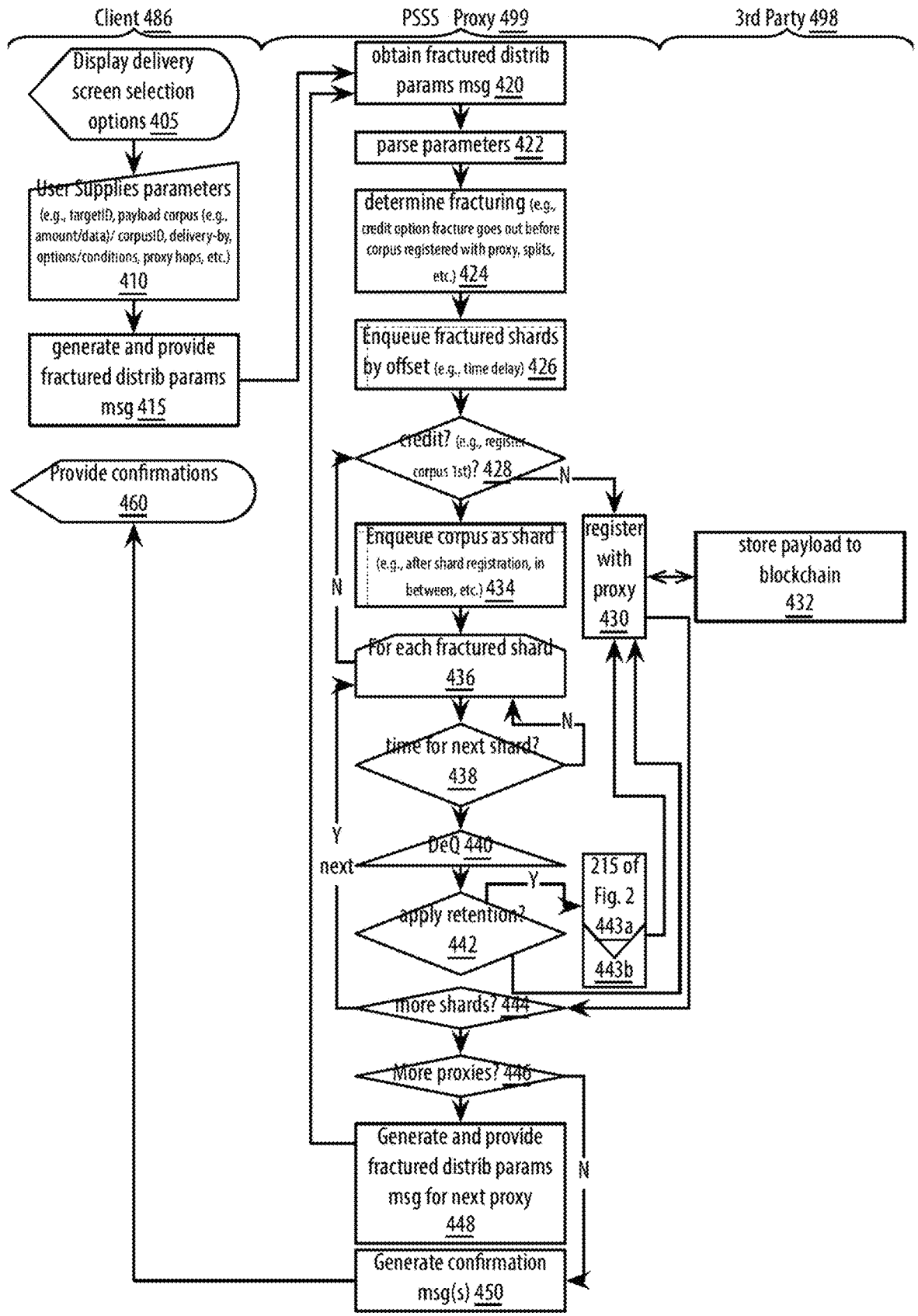

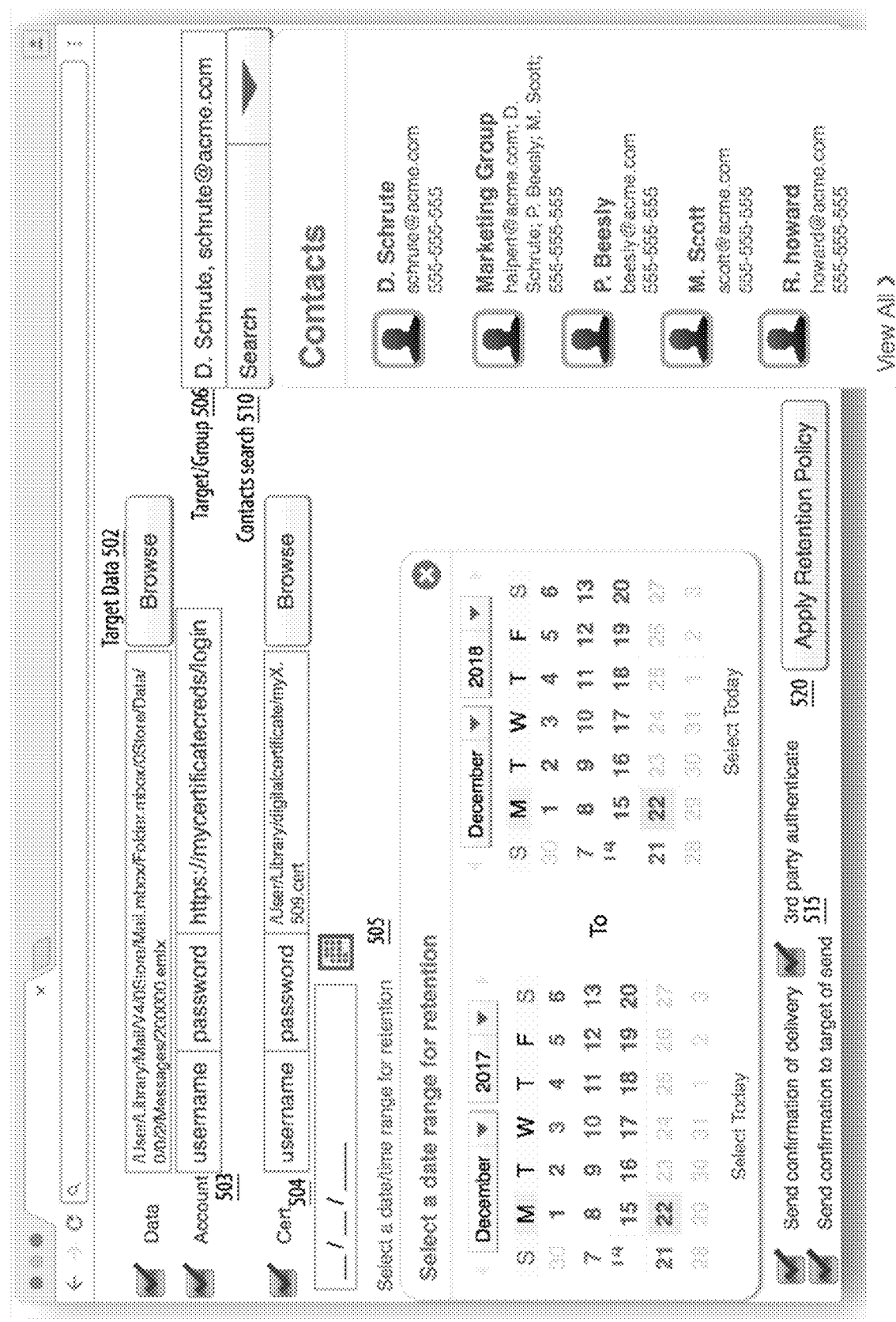
FIGURE 5: PSSS SCREENSHOT

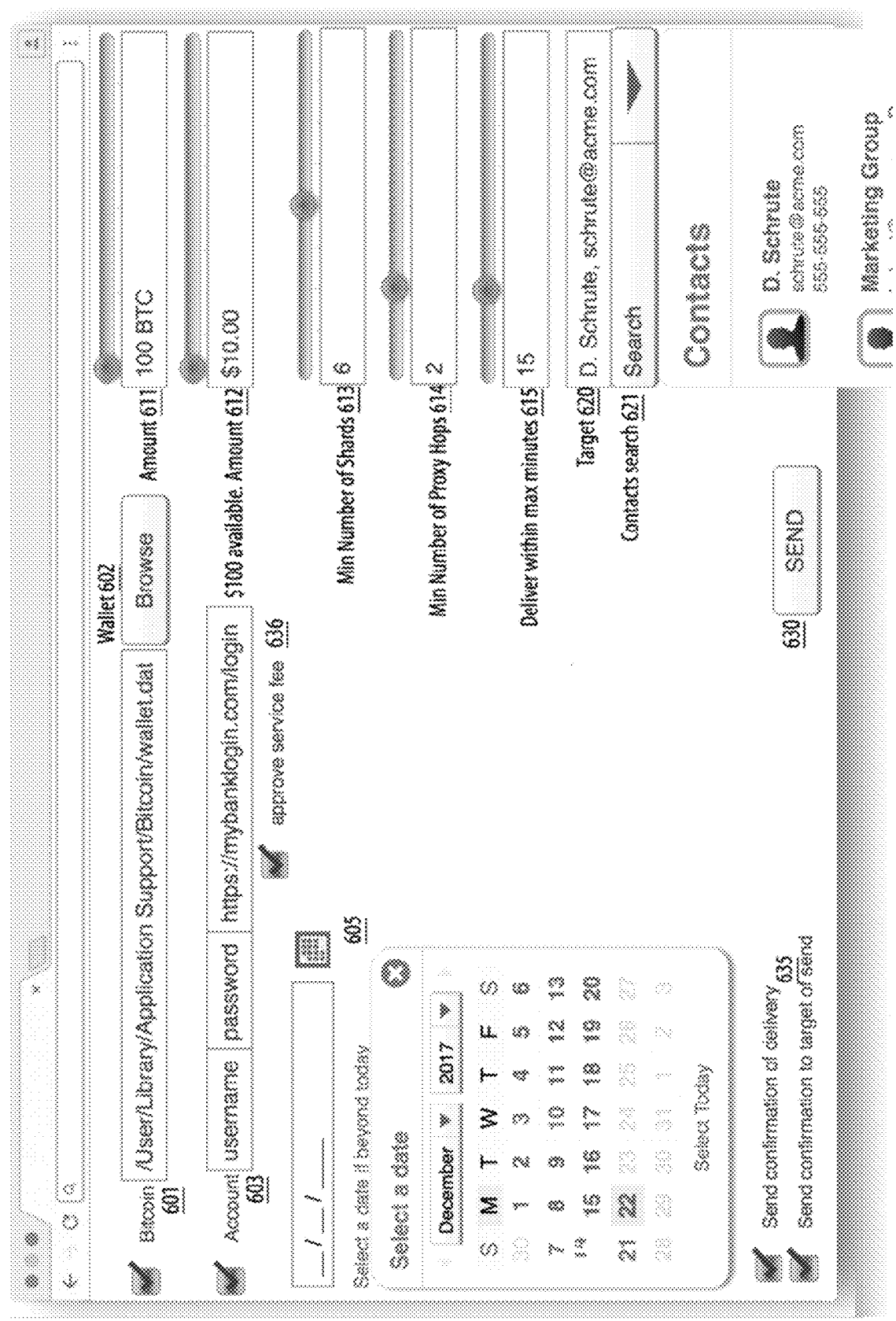
FIGURE 6: PSSS SCREENSHOT

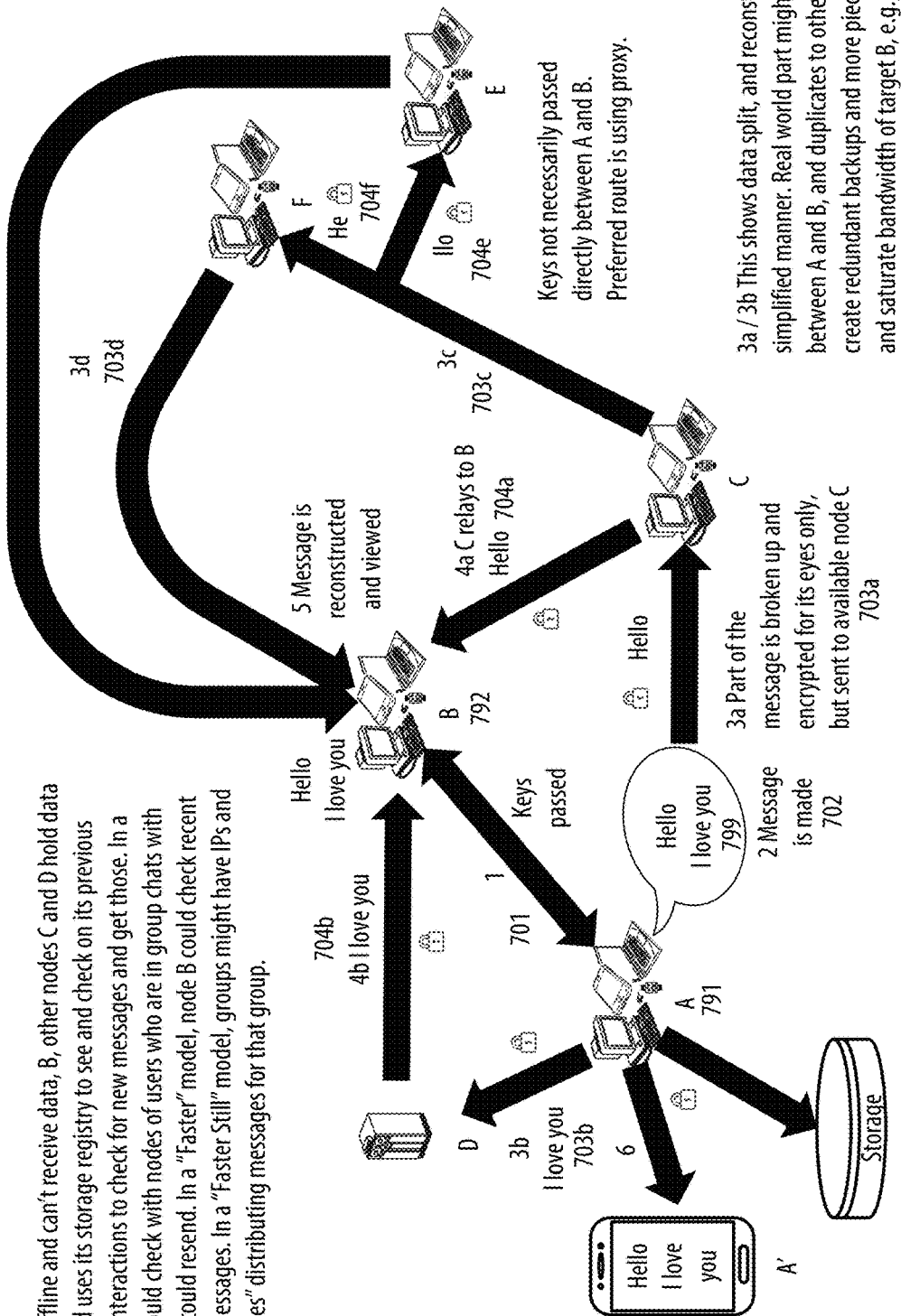

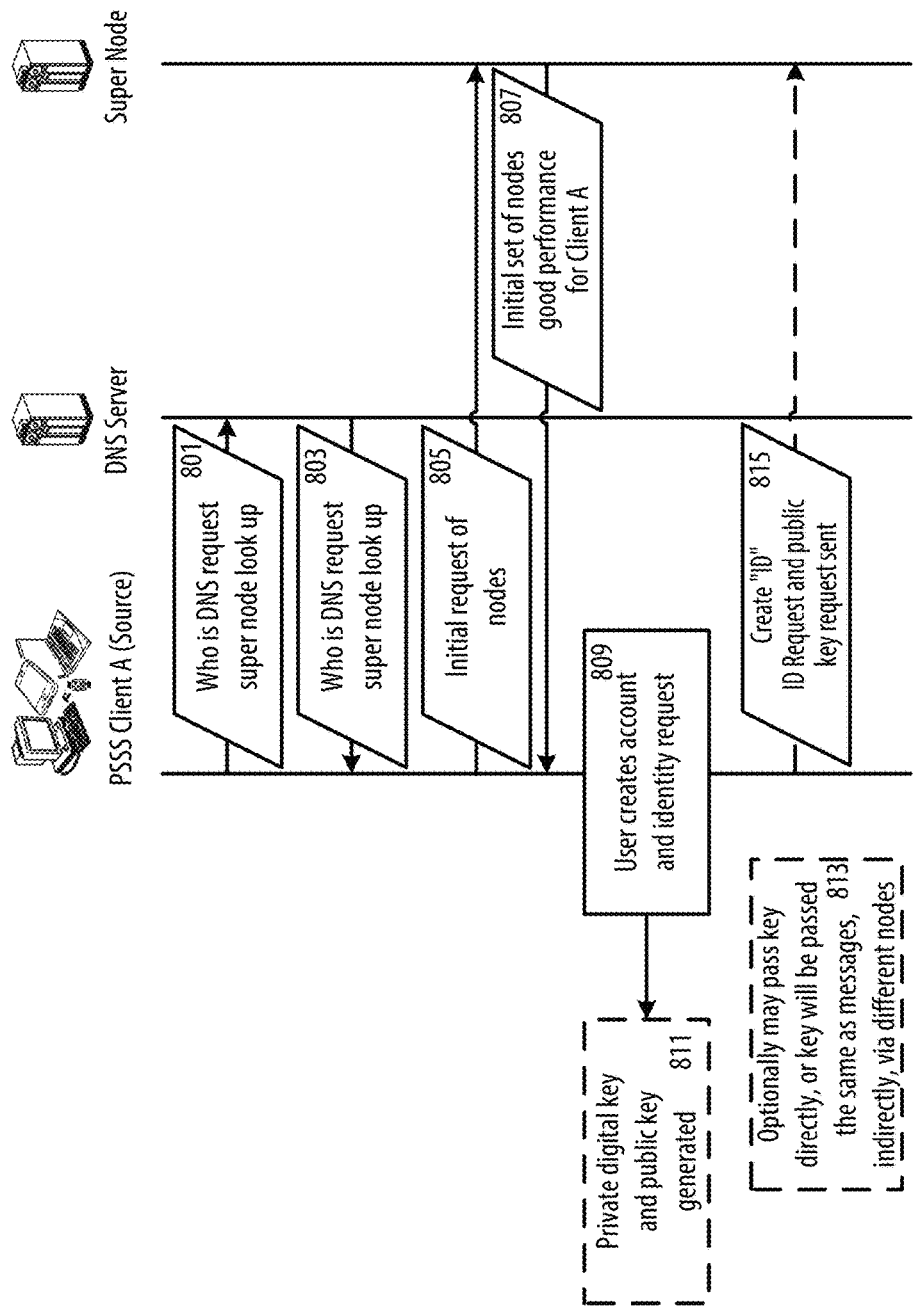

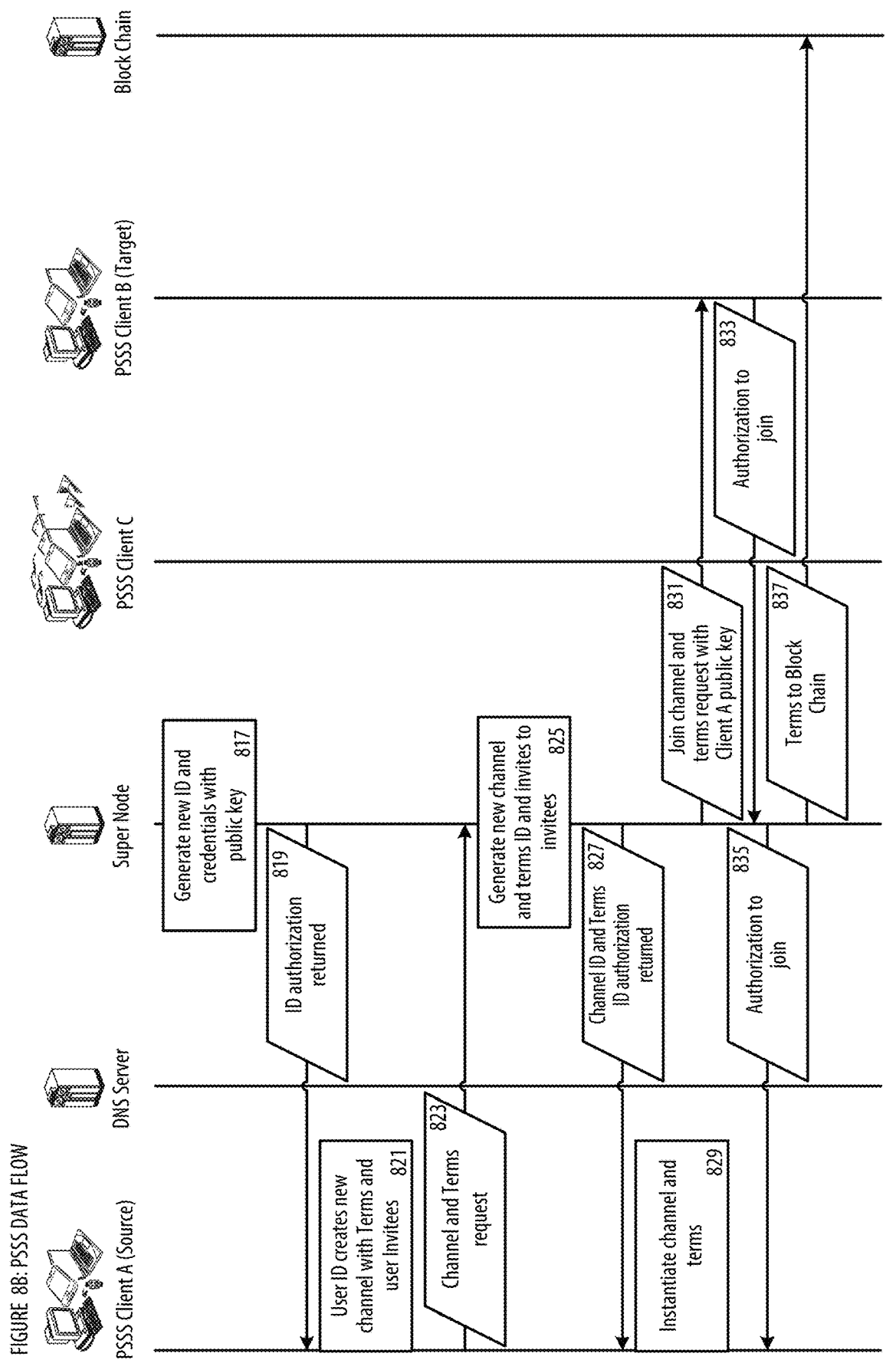

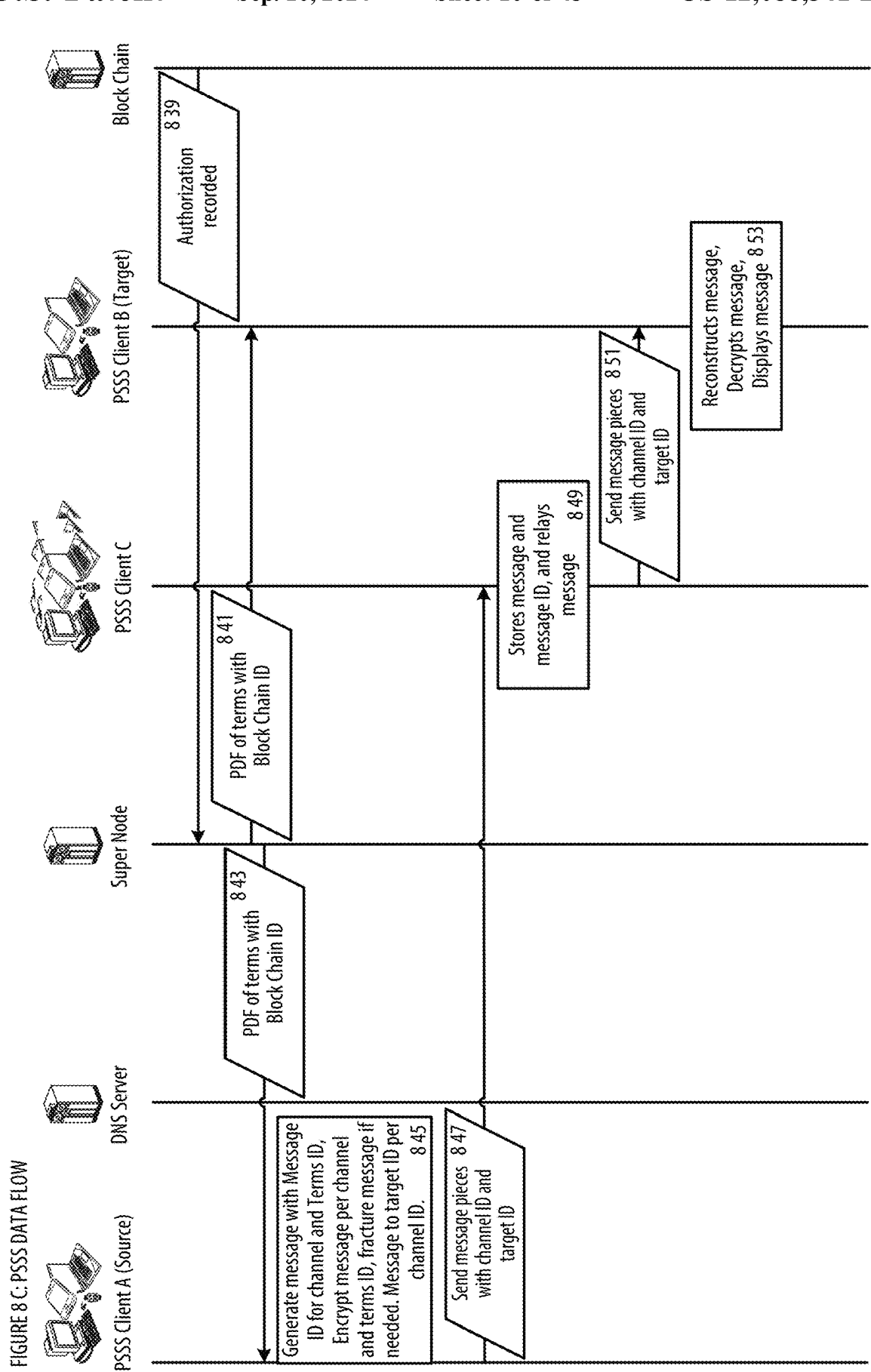

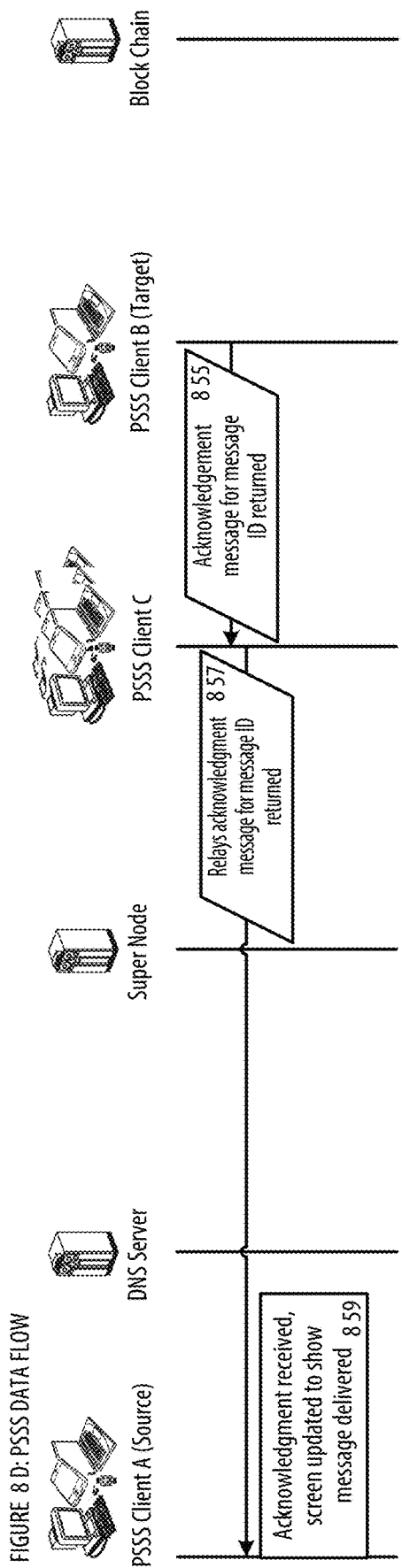

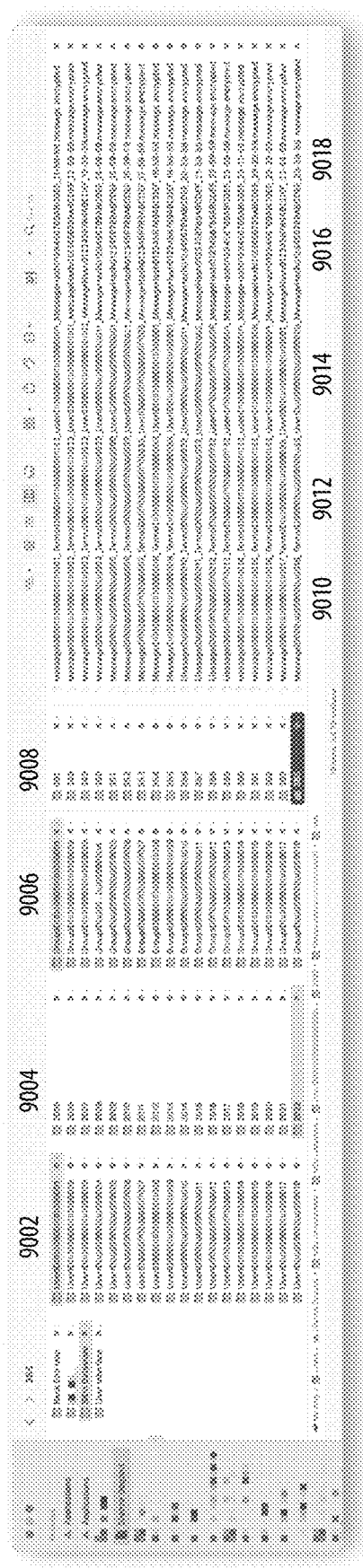
FIGURE 9: PSSS DATA STORE

FIGURE 10A: PSSS DATA STRUCTURE
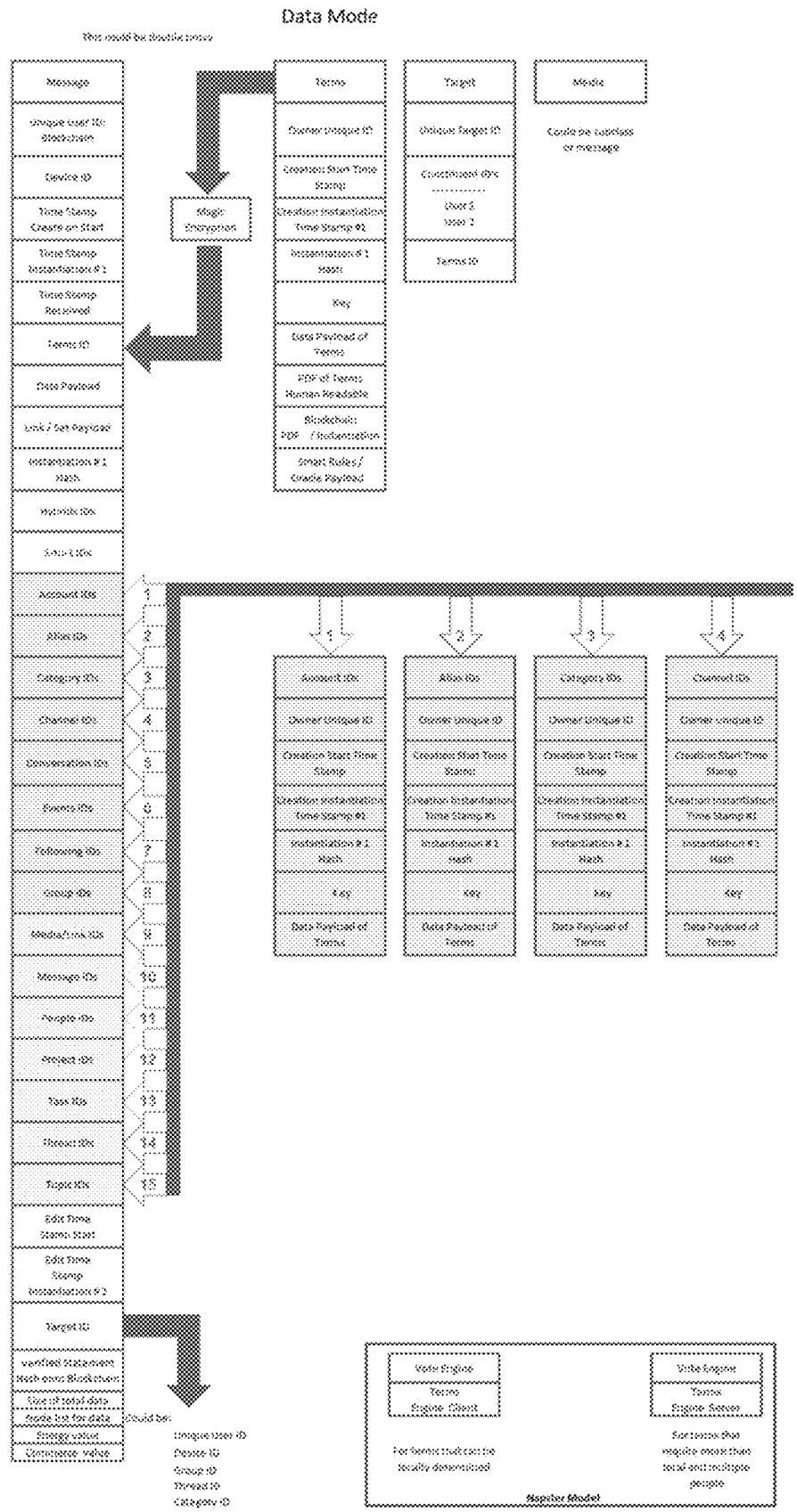

FIGURE 10B: PSSS DATA STRUCTURE
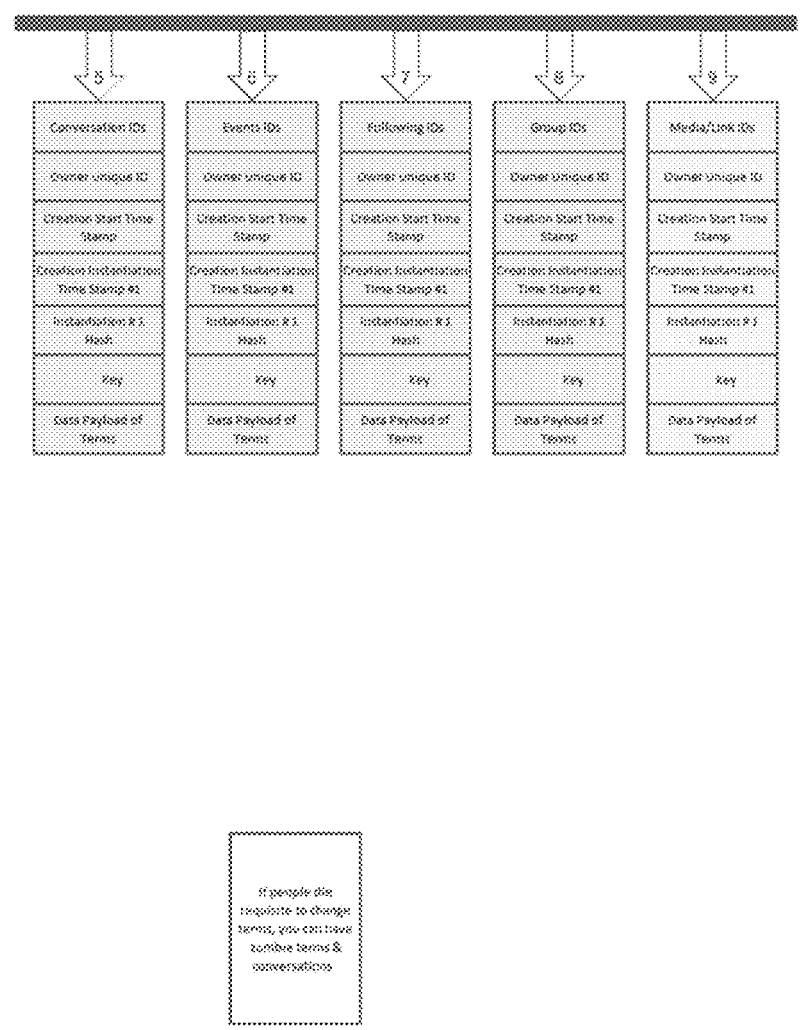

FIGURE 10 C: PSSS DATA STRUCTURE
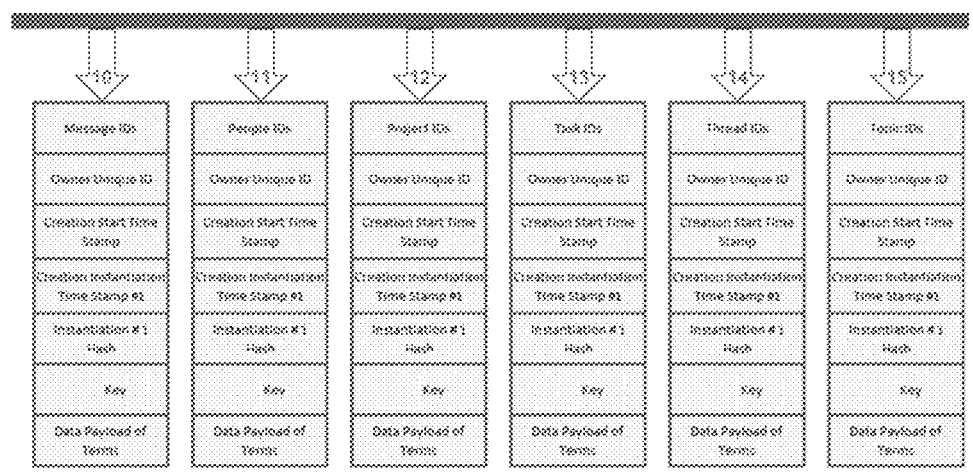

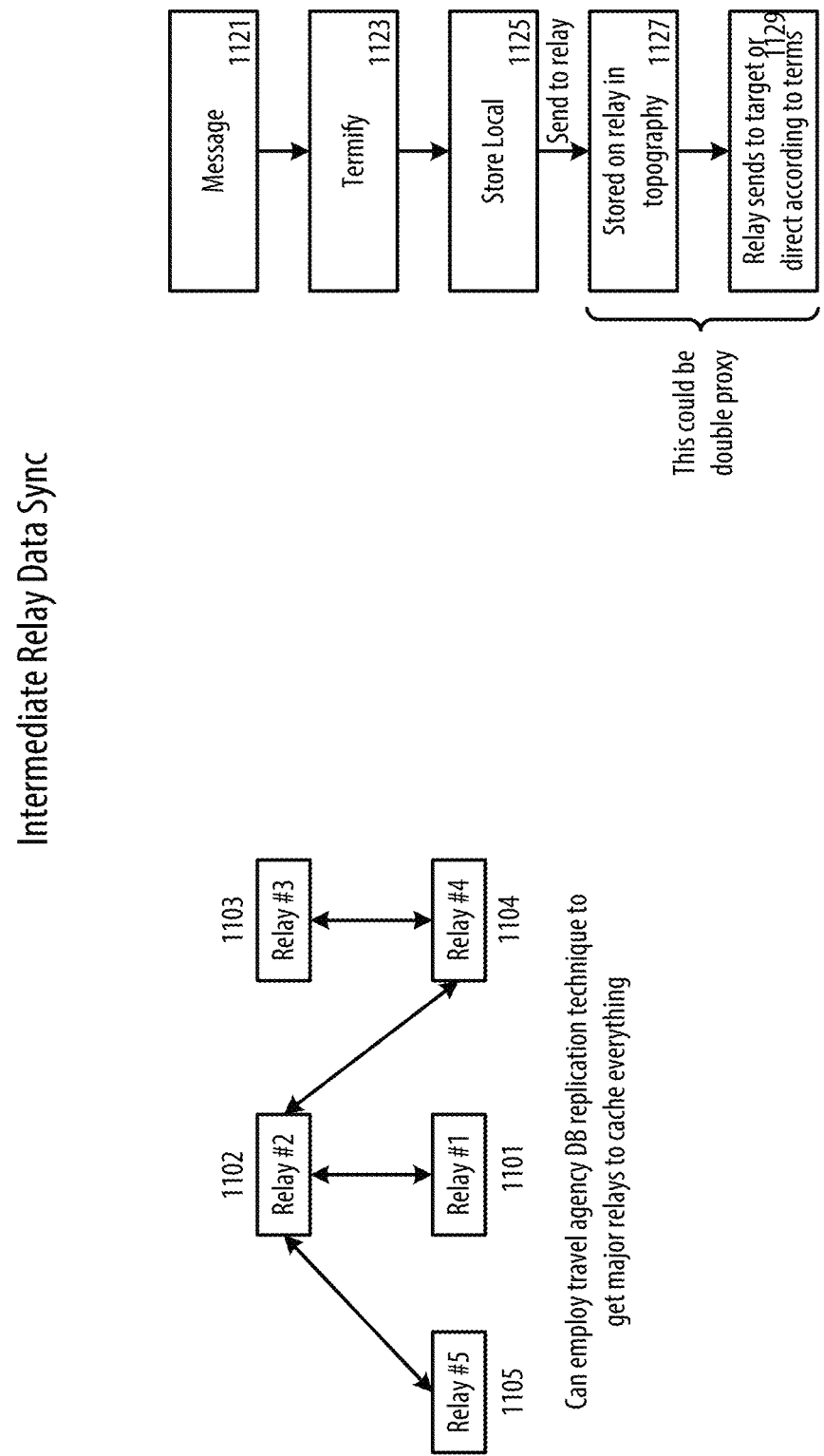
FIGURE 11: PSSS DATA STRUCTURE

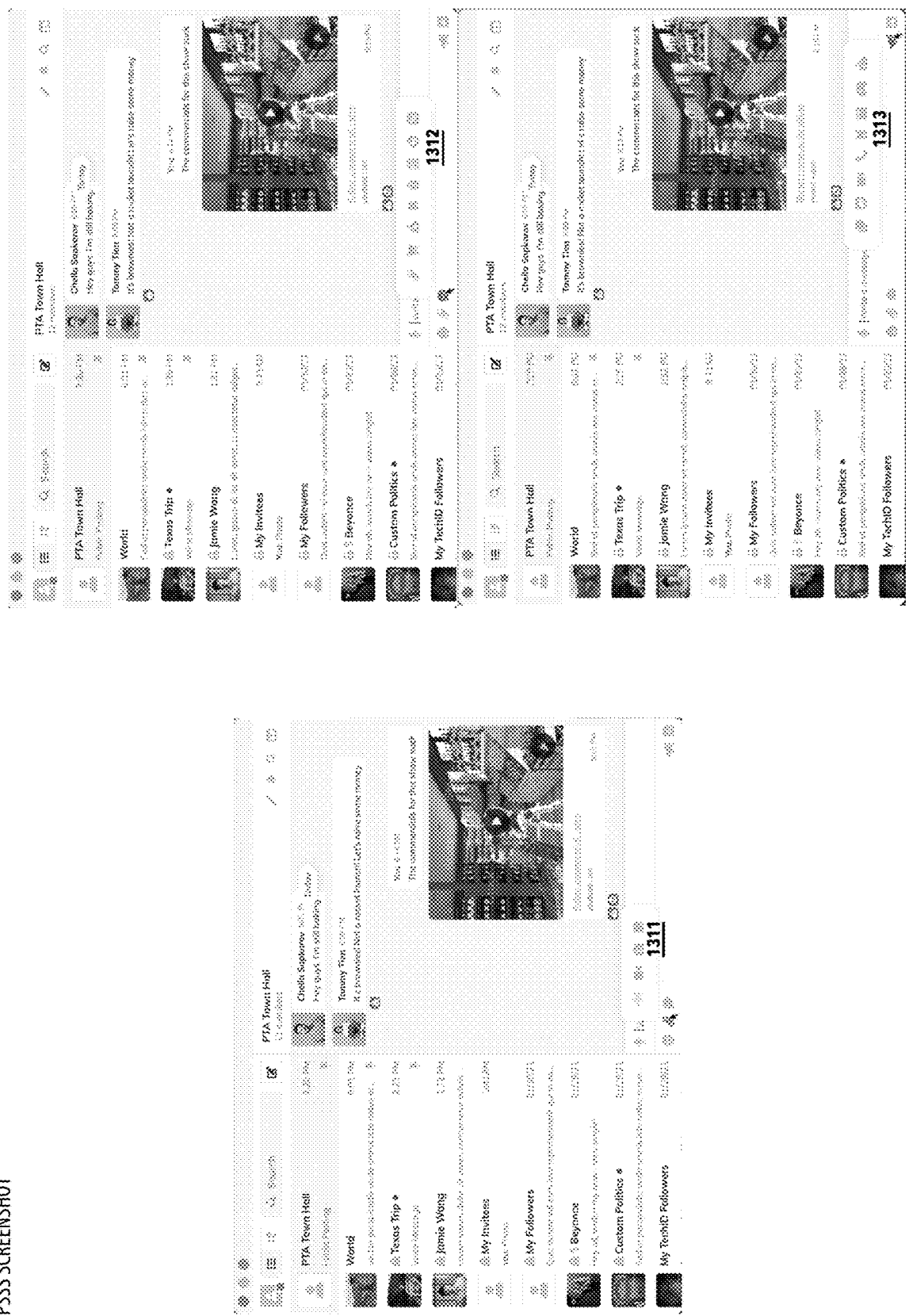
FIGURE 13: PSSS SCREENSHOT

FIGURE 14: PSSS SCREENSHOT

FIGURE 16: PSSS SCREENSHOT

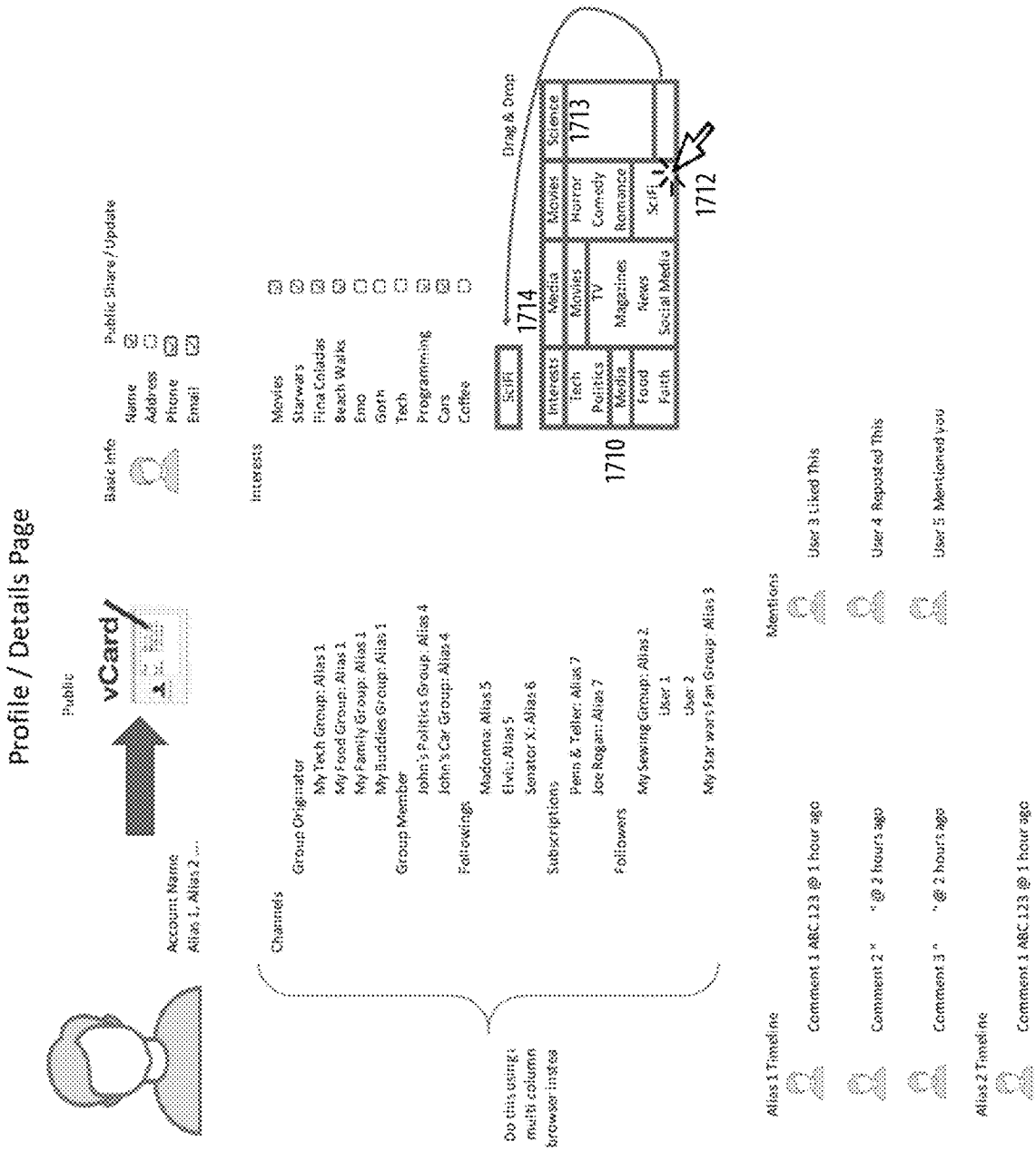
FIGURE 17: PSSS SCREENSHOT

FIGURE 18: PSSS SCREENSHOT

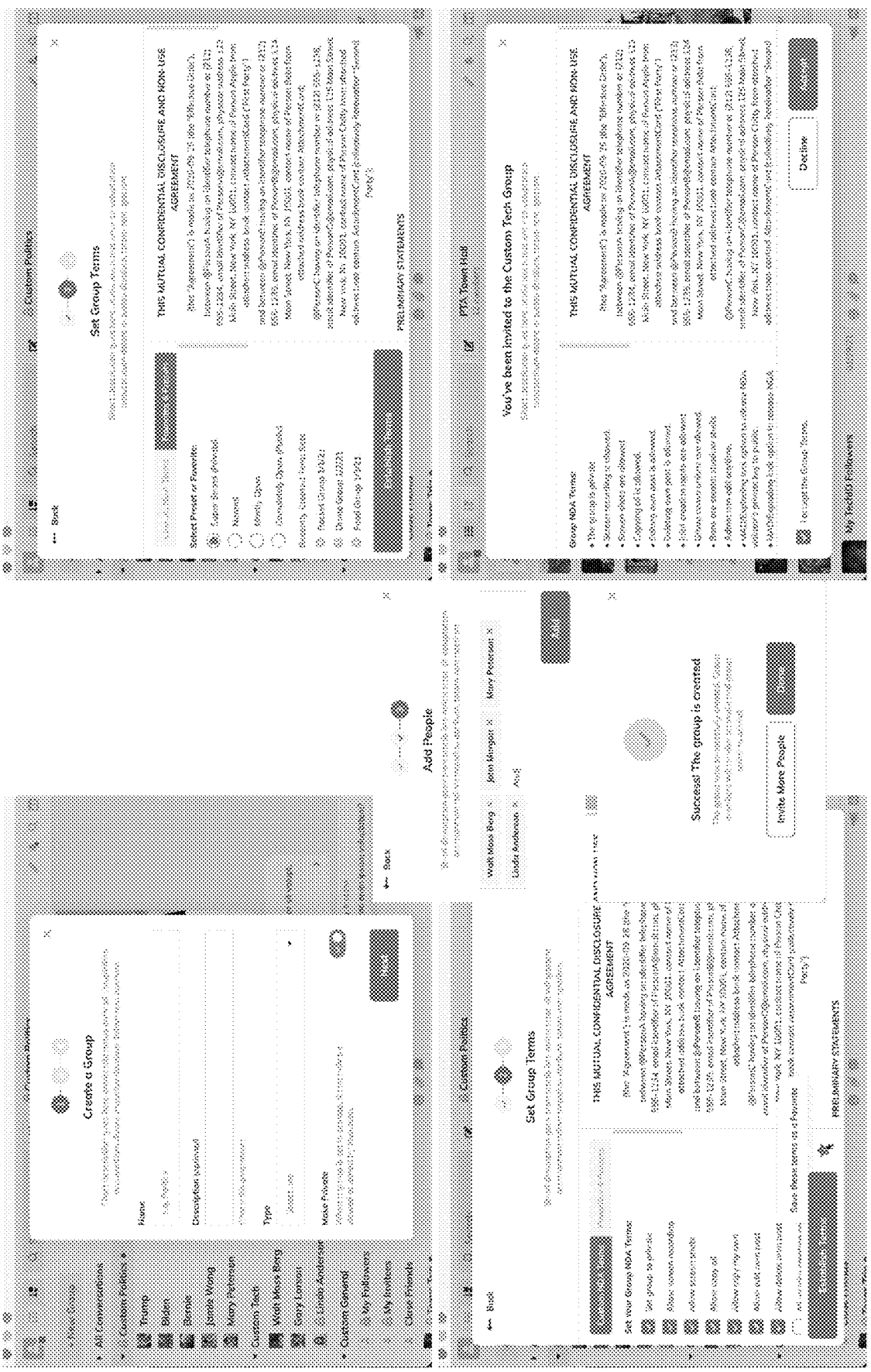
FIGURE 19: PSSS SCREENSHOT

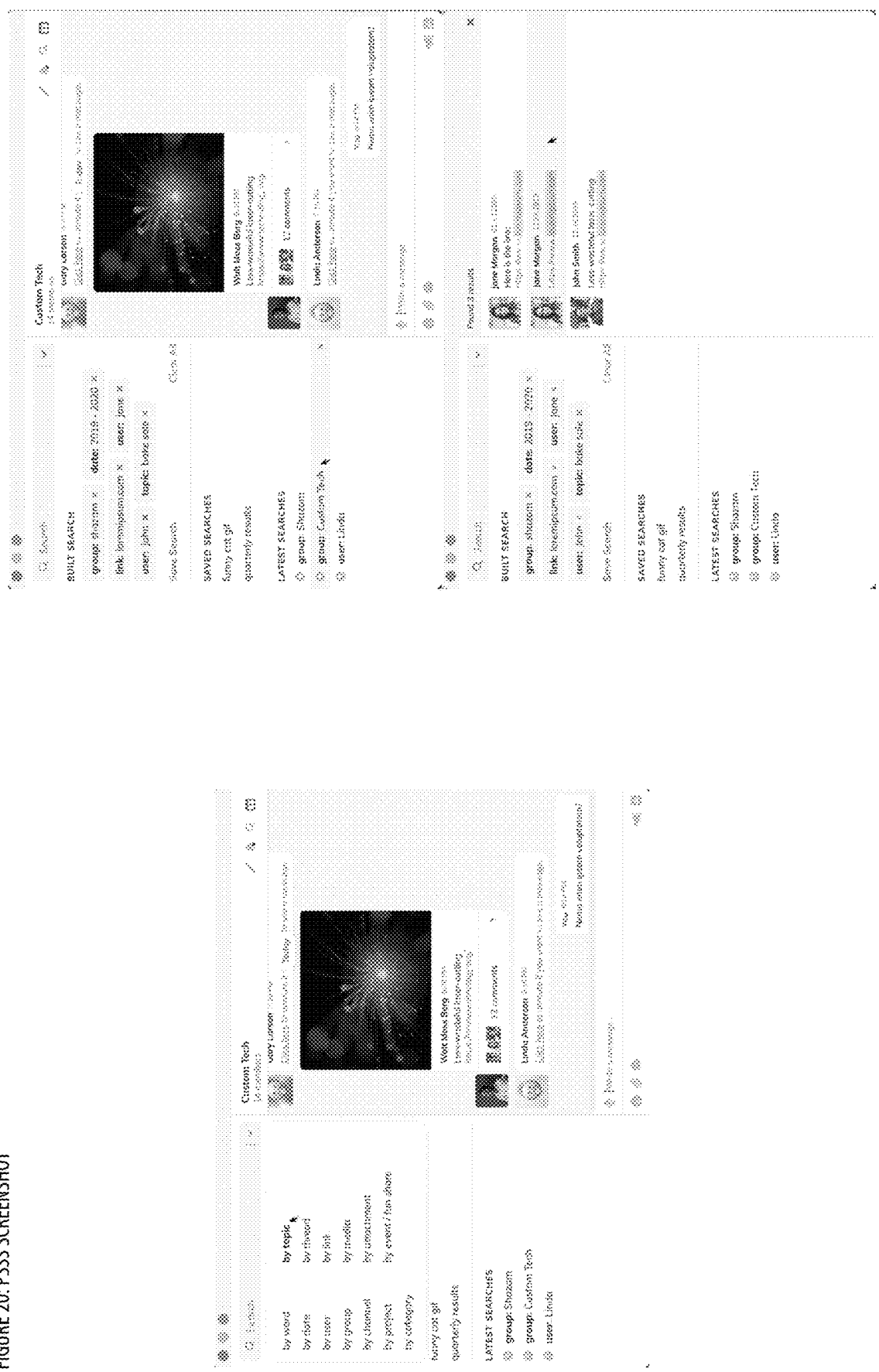
FIGURE 20: PSSS SCREENSHOT

FIGURE 21: PSSS SCREENSHOT

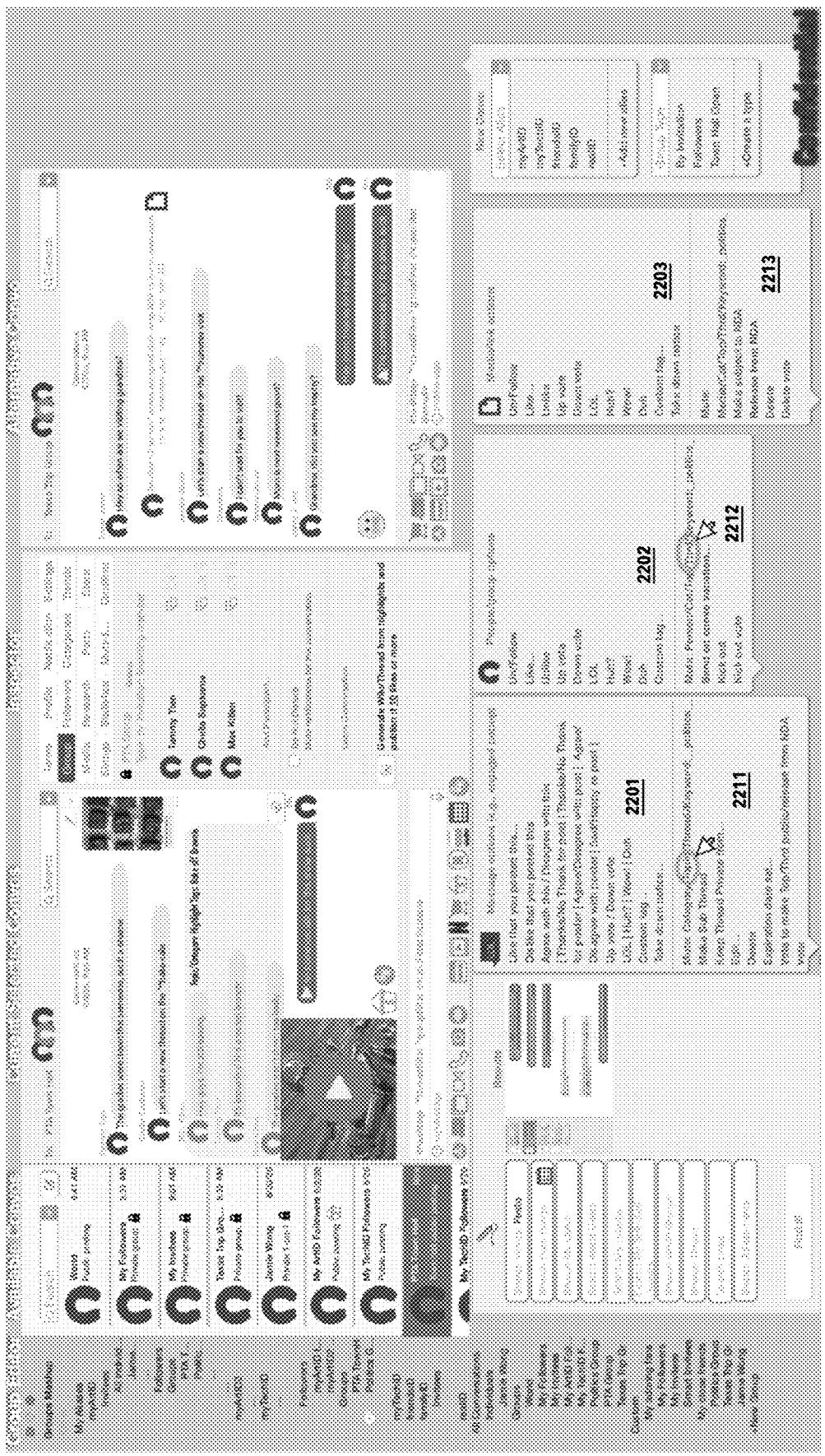
FIGURE 22: PSSS SCREENSHOT

FIGURE 23: PSSS SCREENSHOT

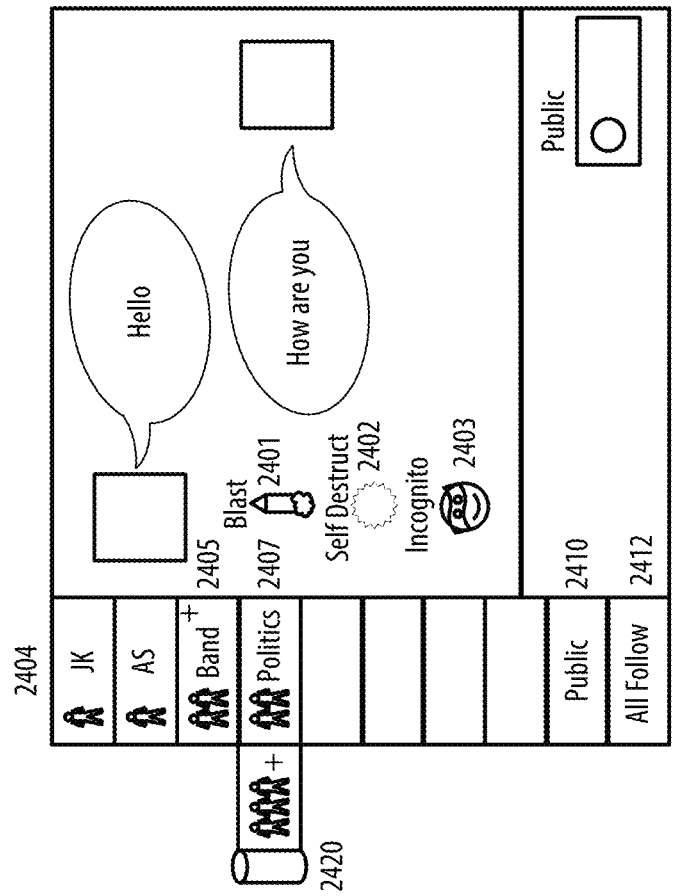
FIGURE 24: PSSS SCREENSHOT

FIGURE 25: PSSS SCREENSHOT
The left column that we used to select groups in messages is basically a filter
The top may be the entire world showing how many total people follow you
You could have 1 on 1 private, Or 1 on 1 public, Group private, Group public
Think about the voyeur value of public groups
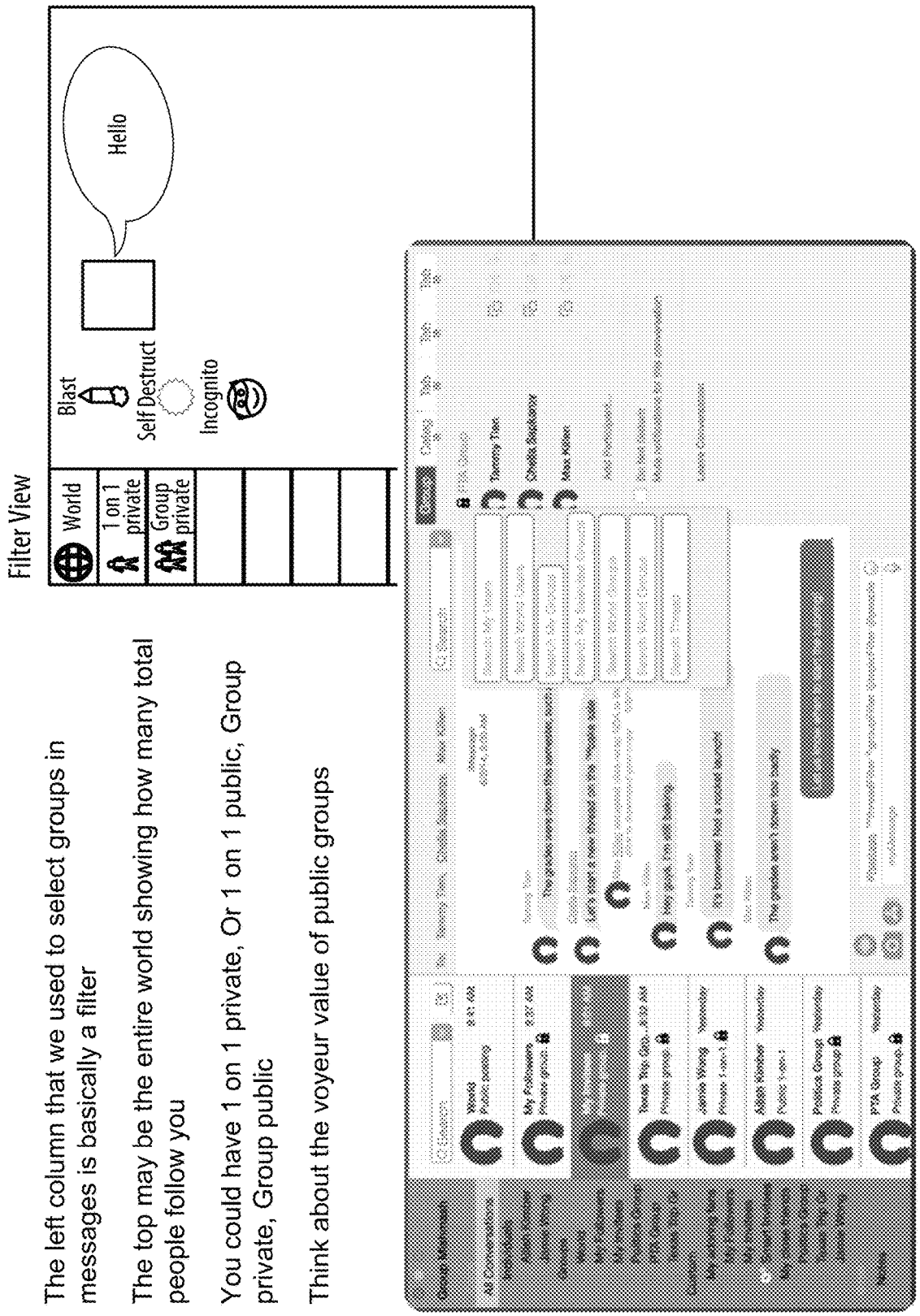

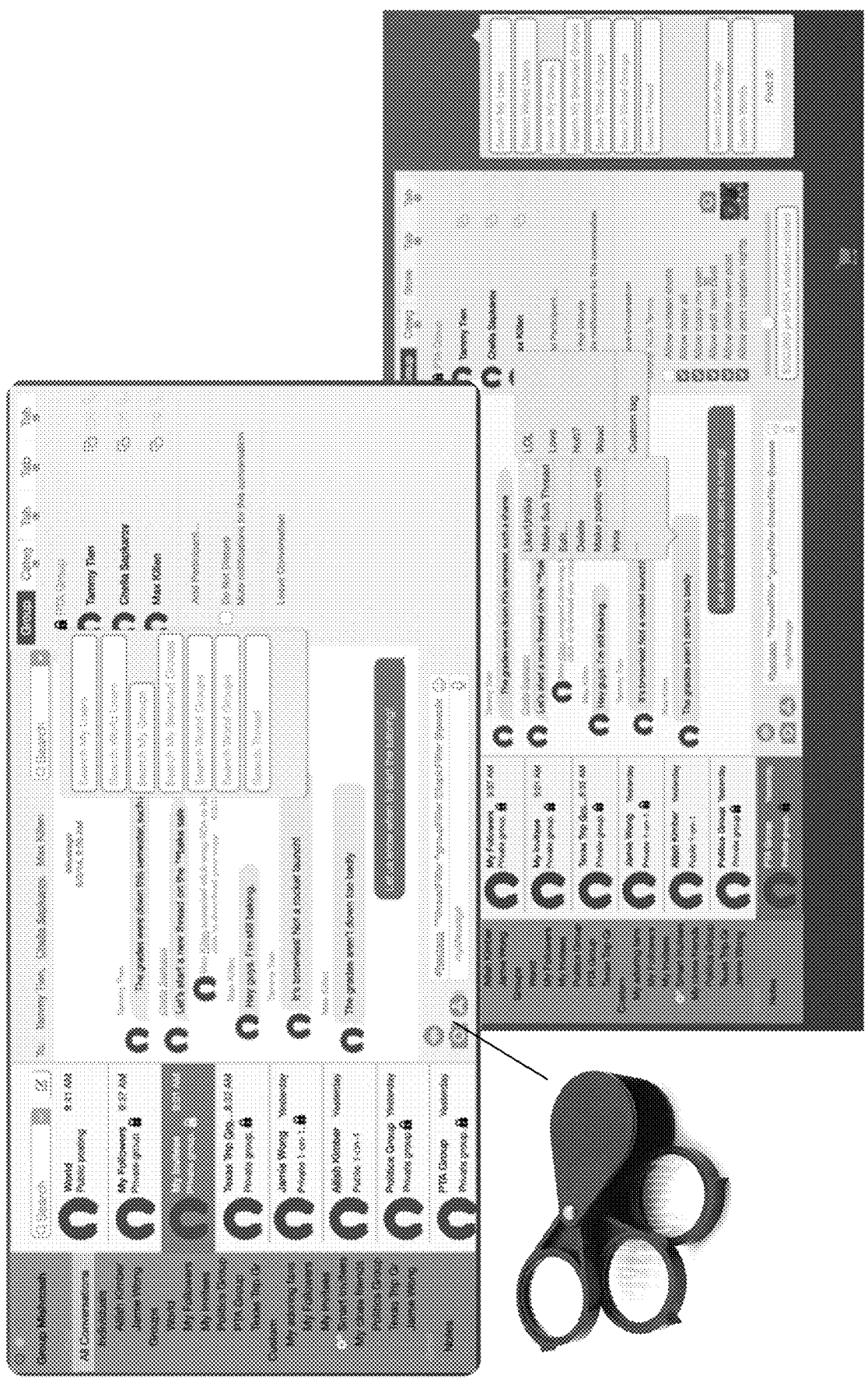
FIGURE 26: PSSS SCREENSHOT

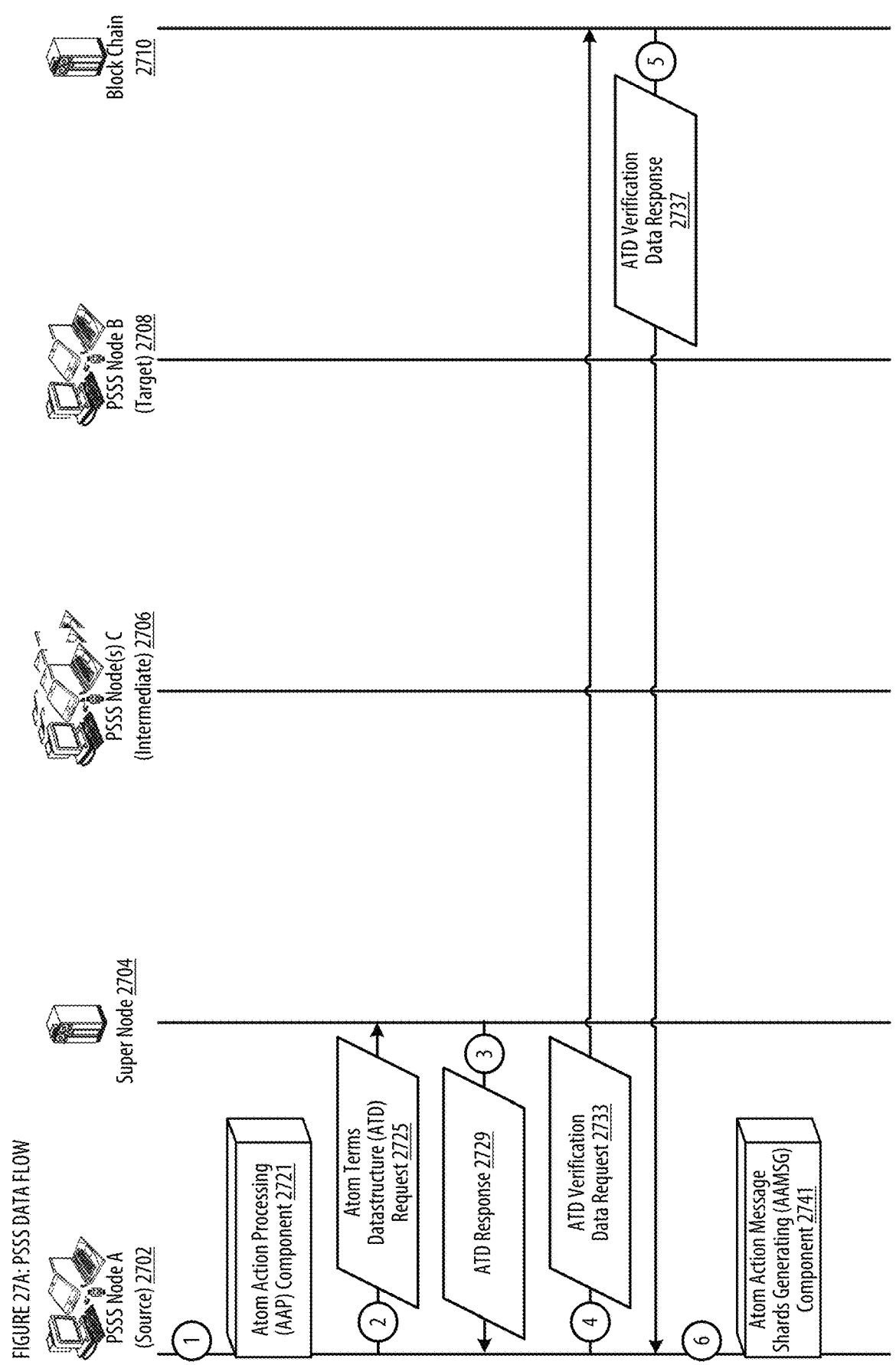

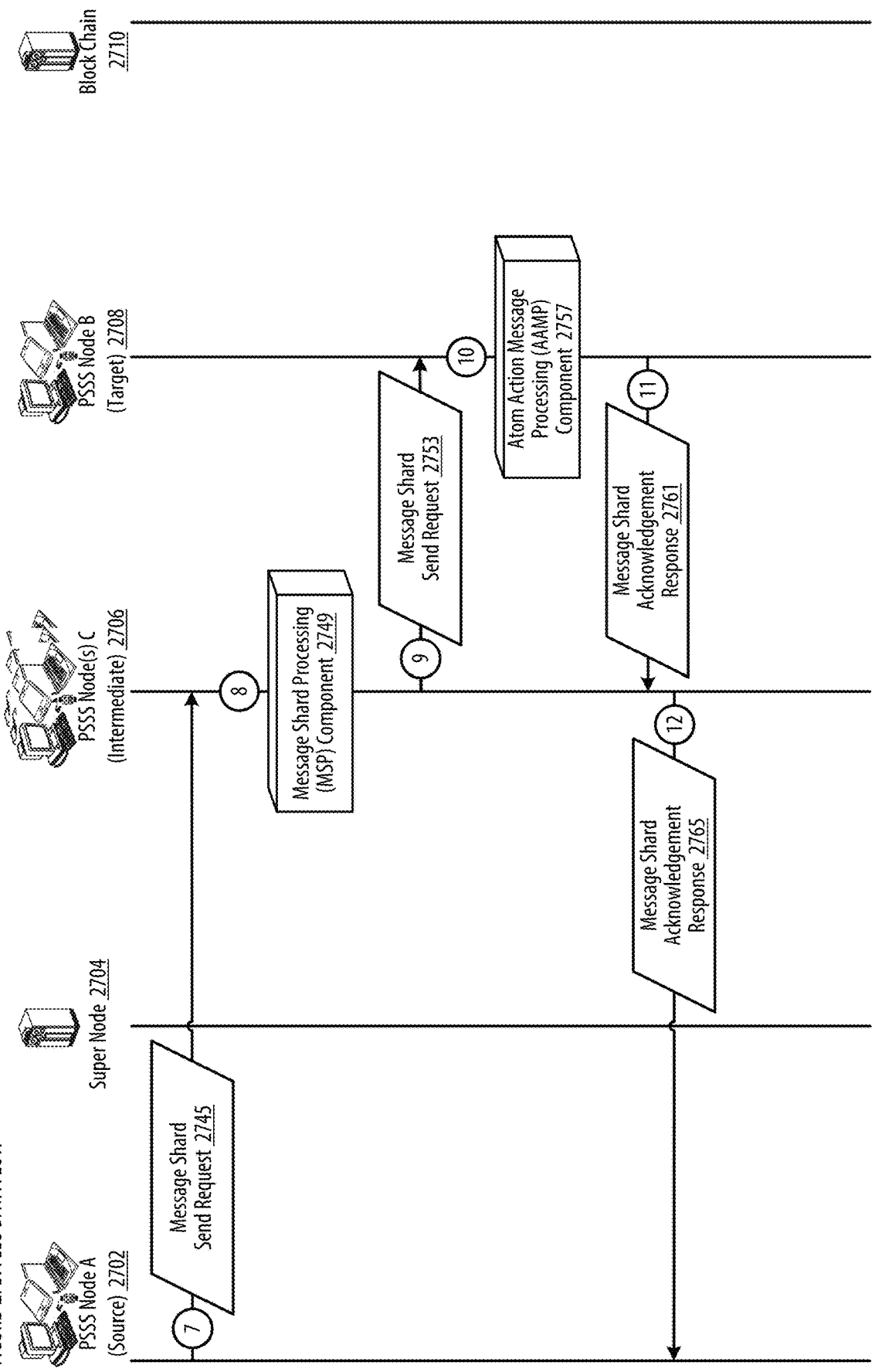

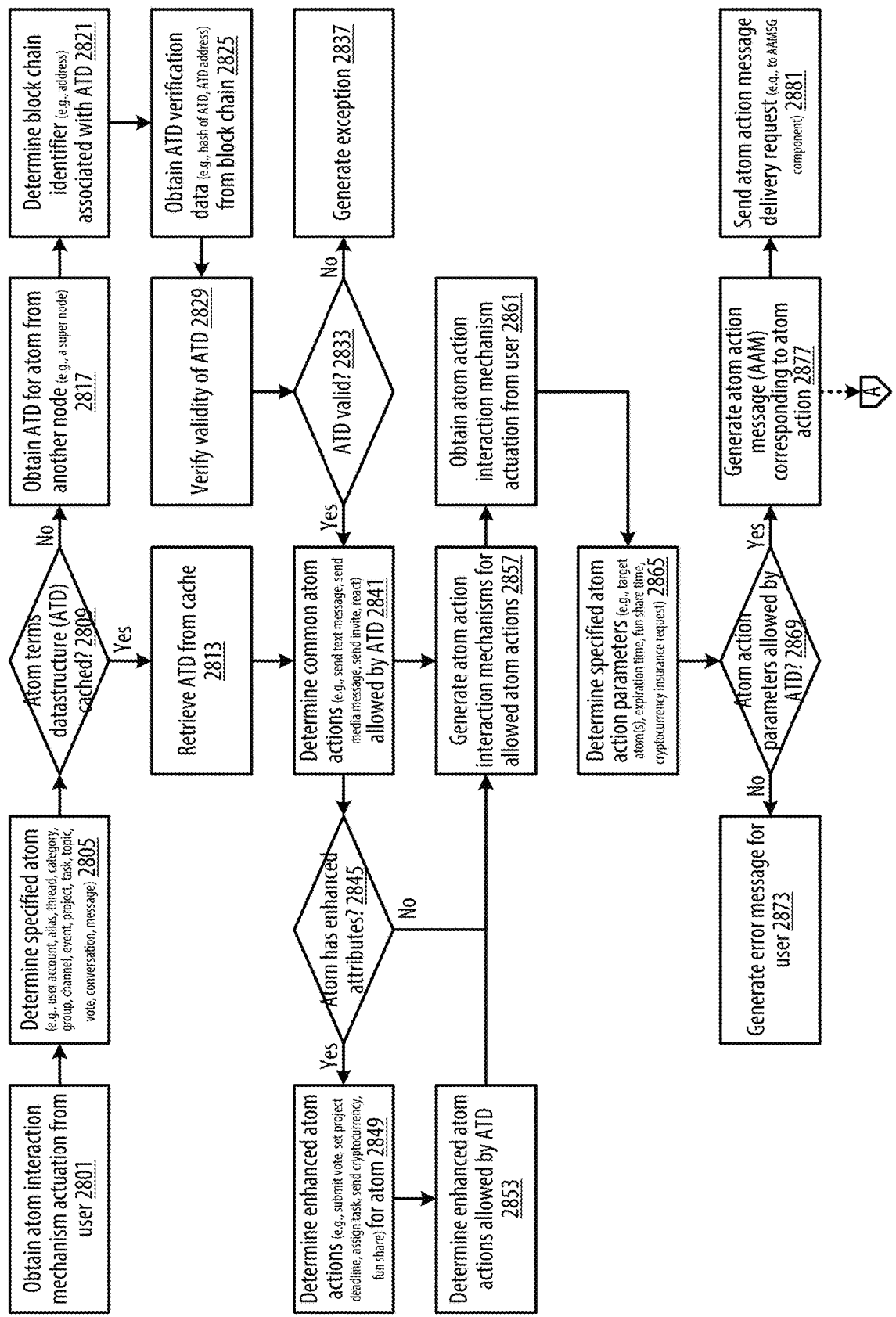

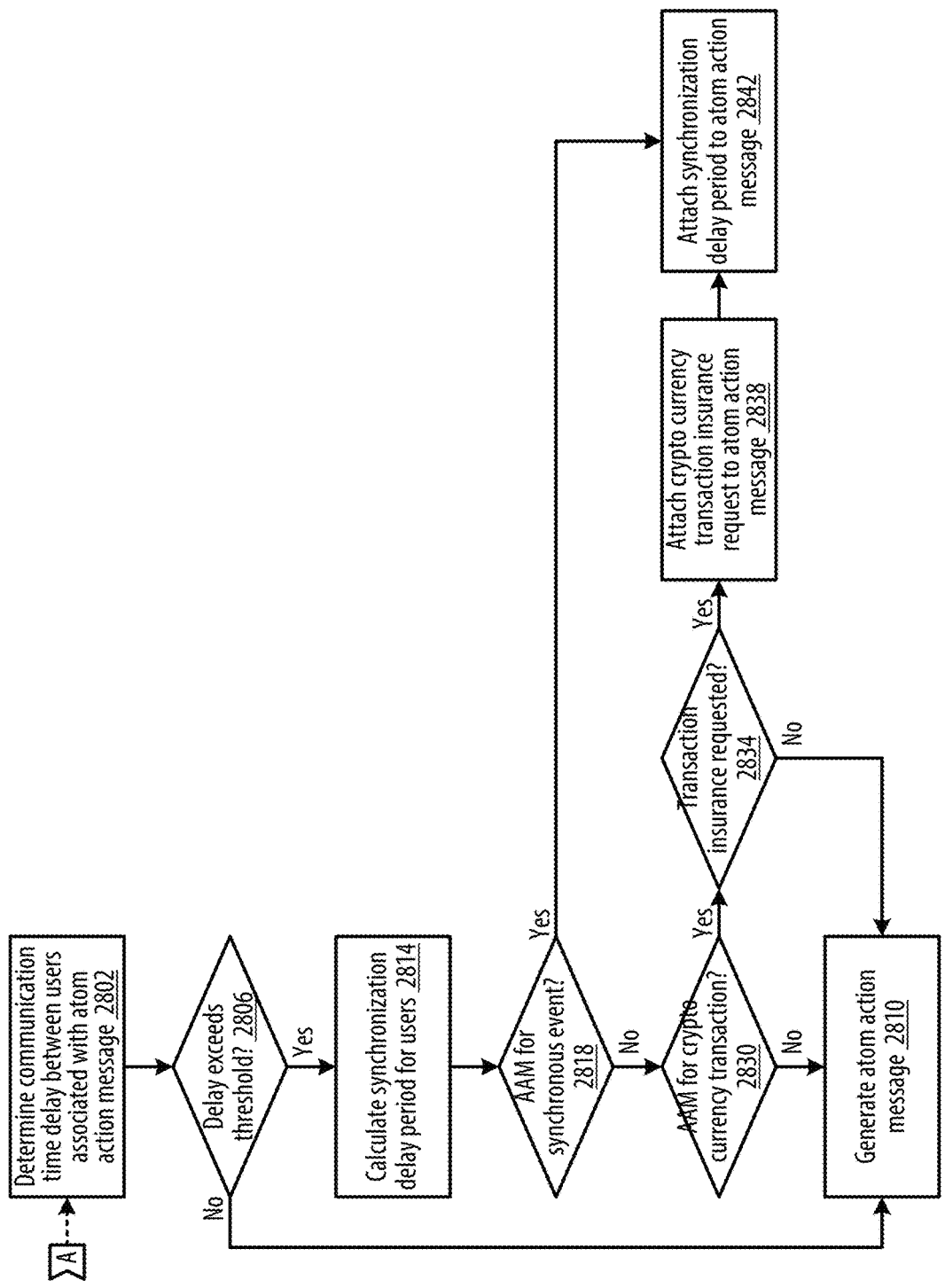
FIGURE 28B: PSSS AAP COMPONENT

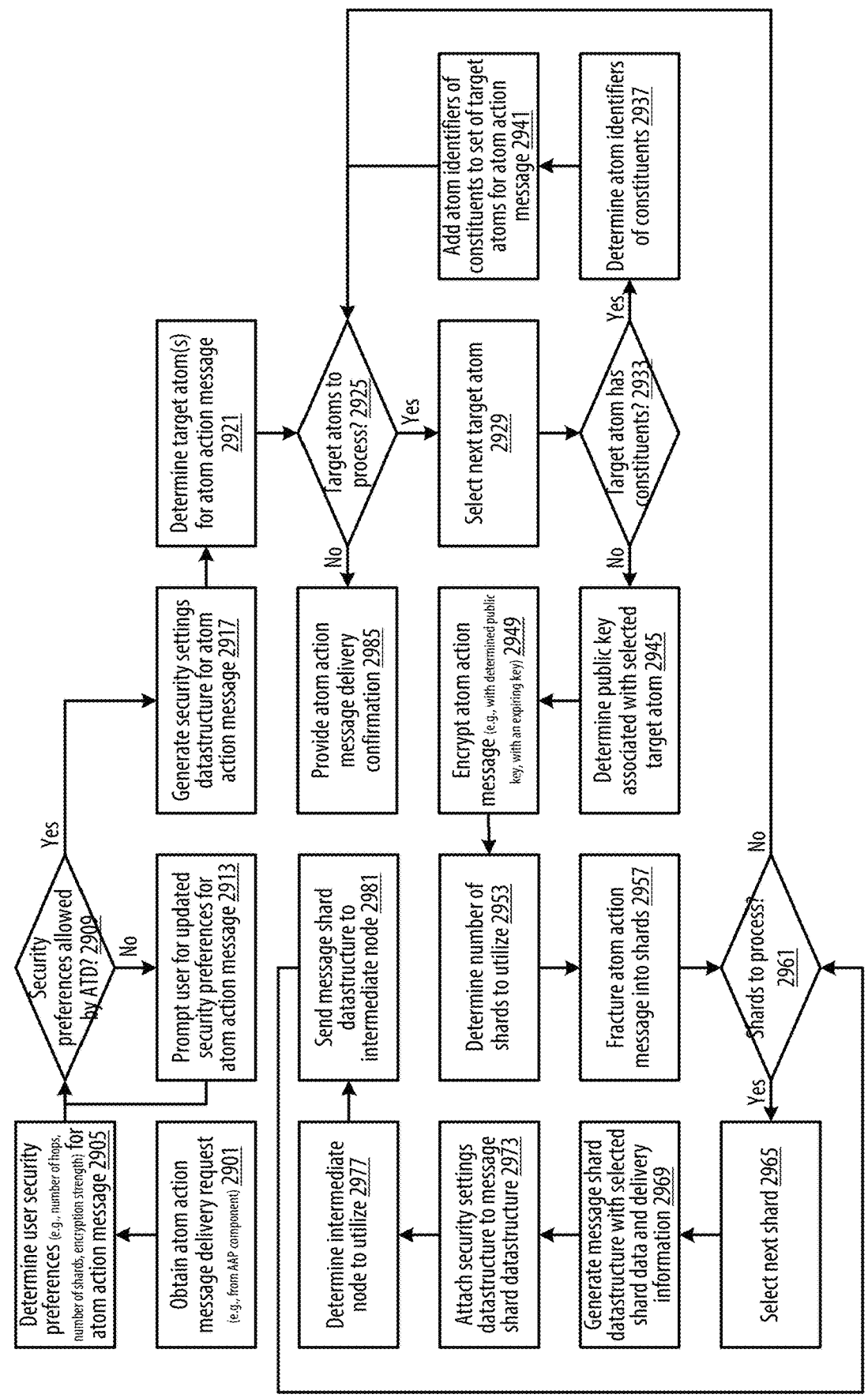
FIGURE 29: PSSS AAMSG COMPONENT

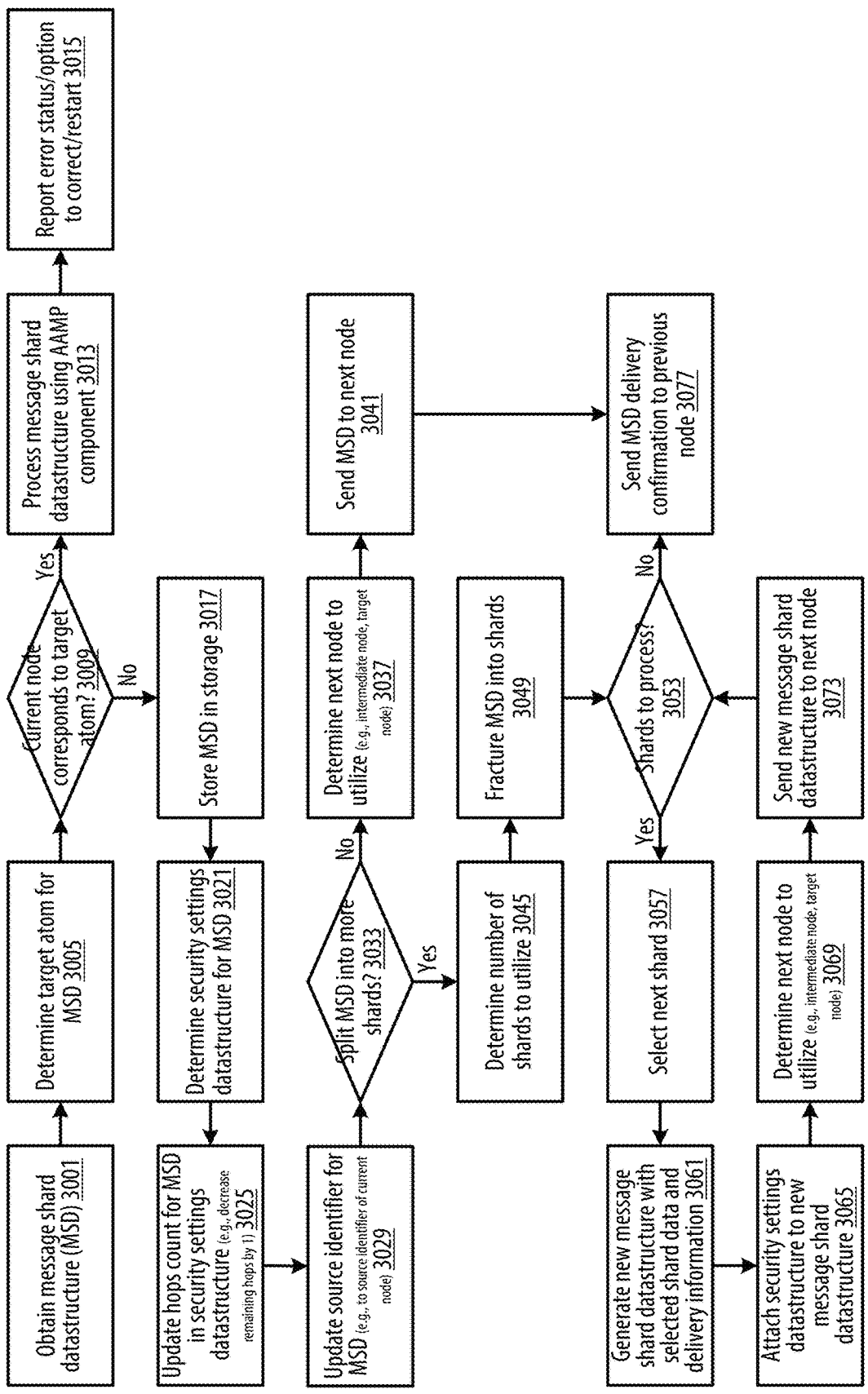

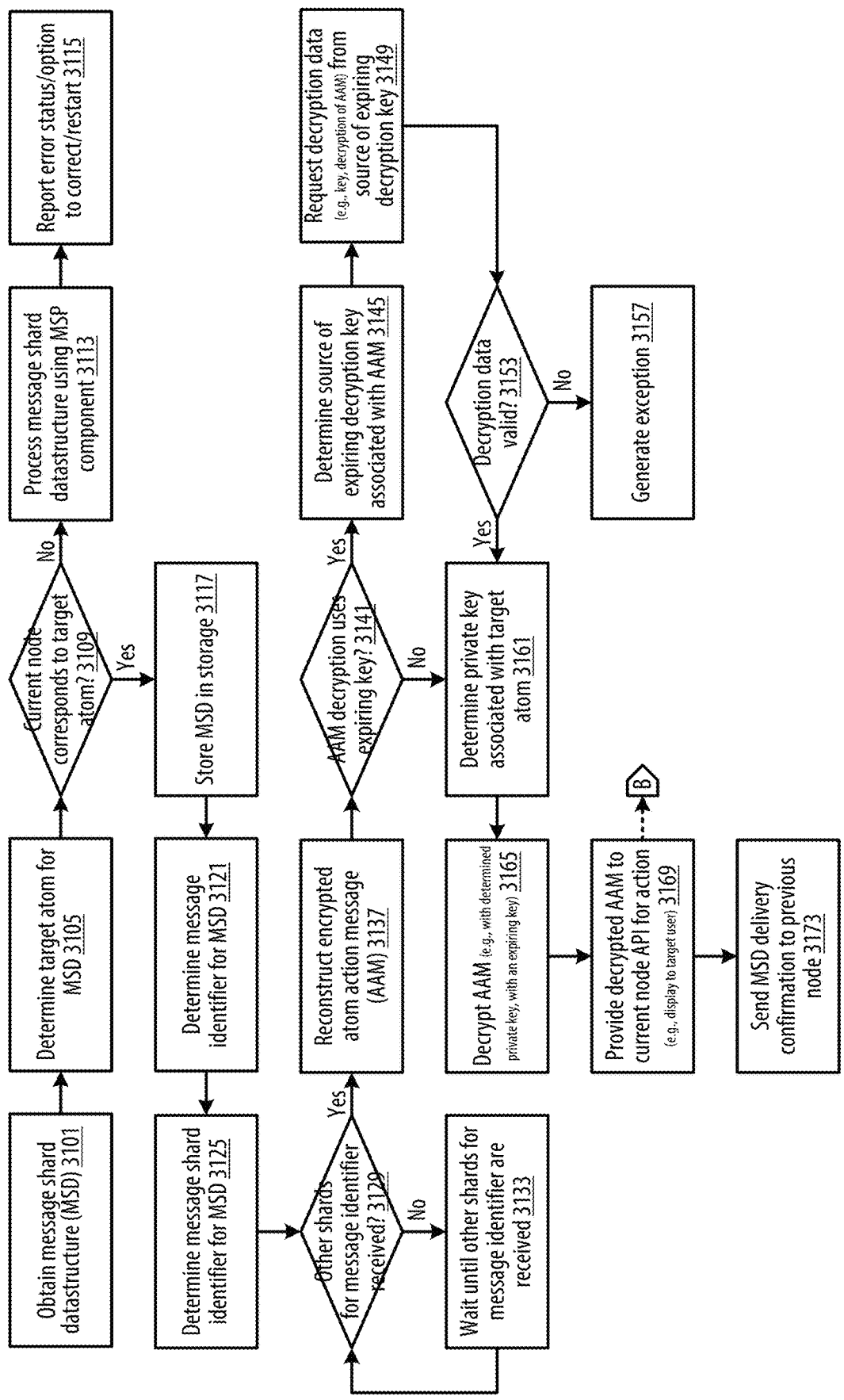

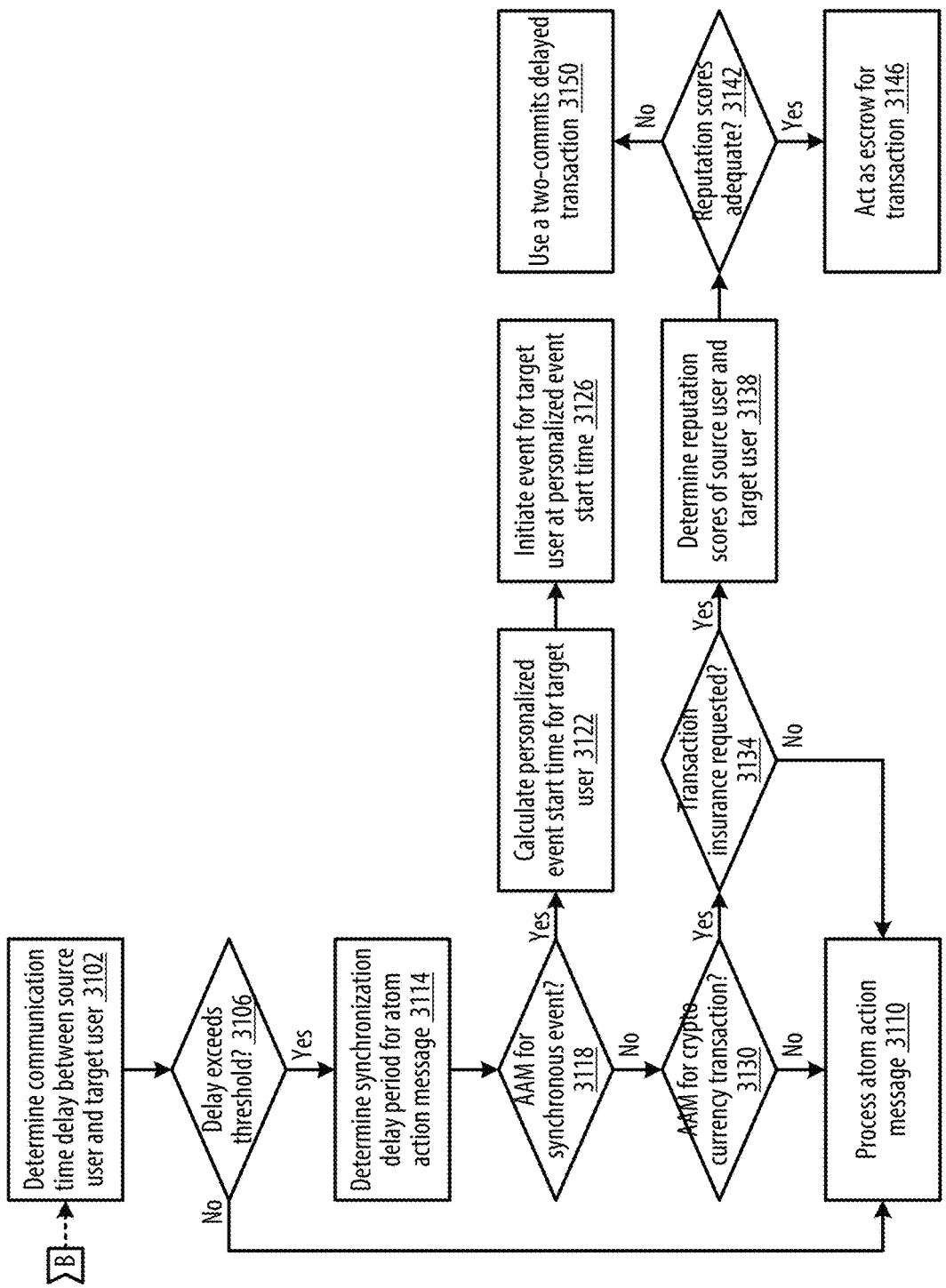
FIGURE 31B: PSSS AAMP COMPONENT

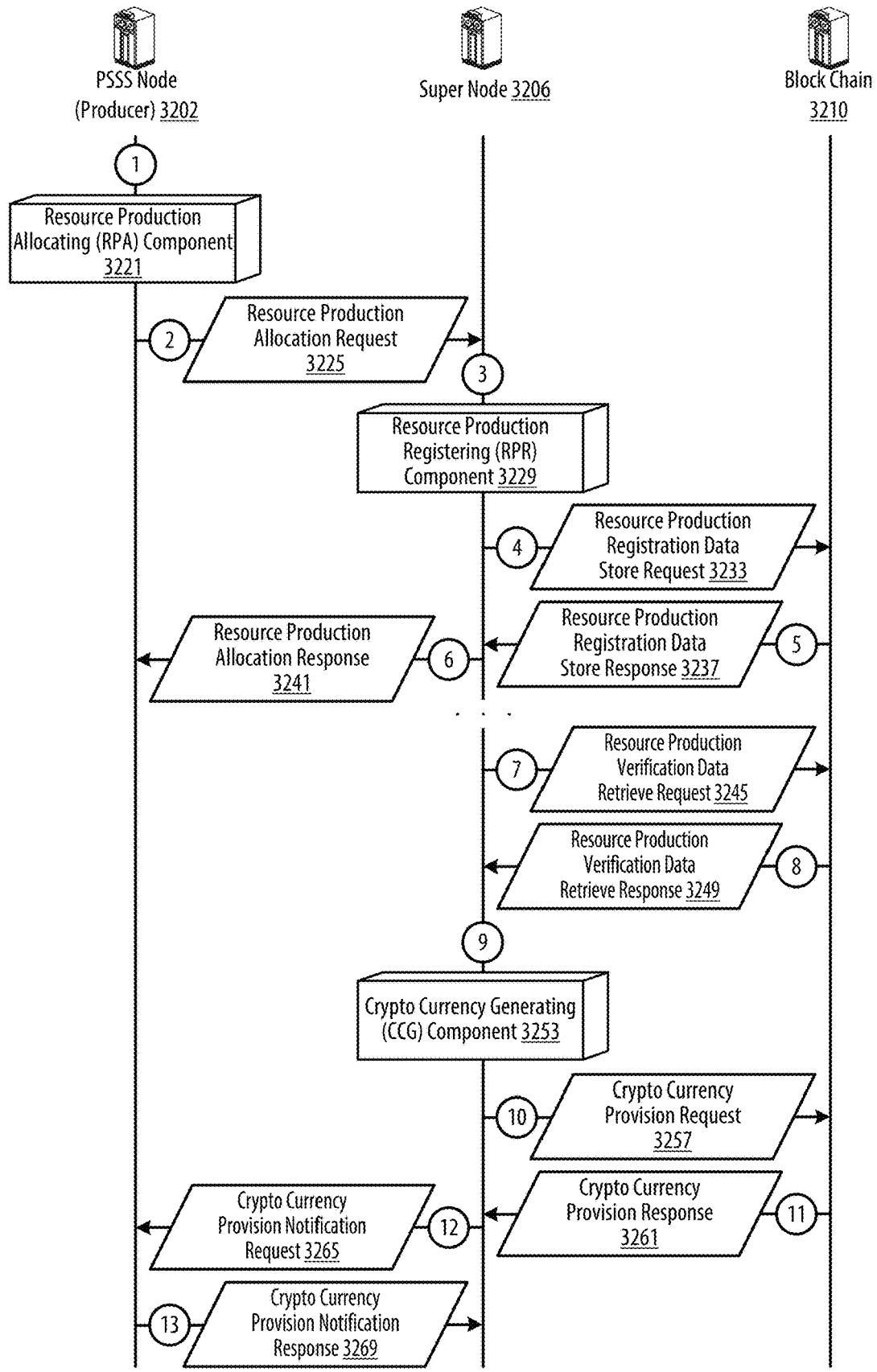
FIGURE 32: PSSS DATA FLOW

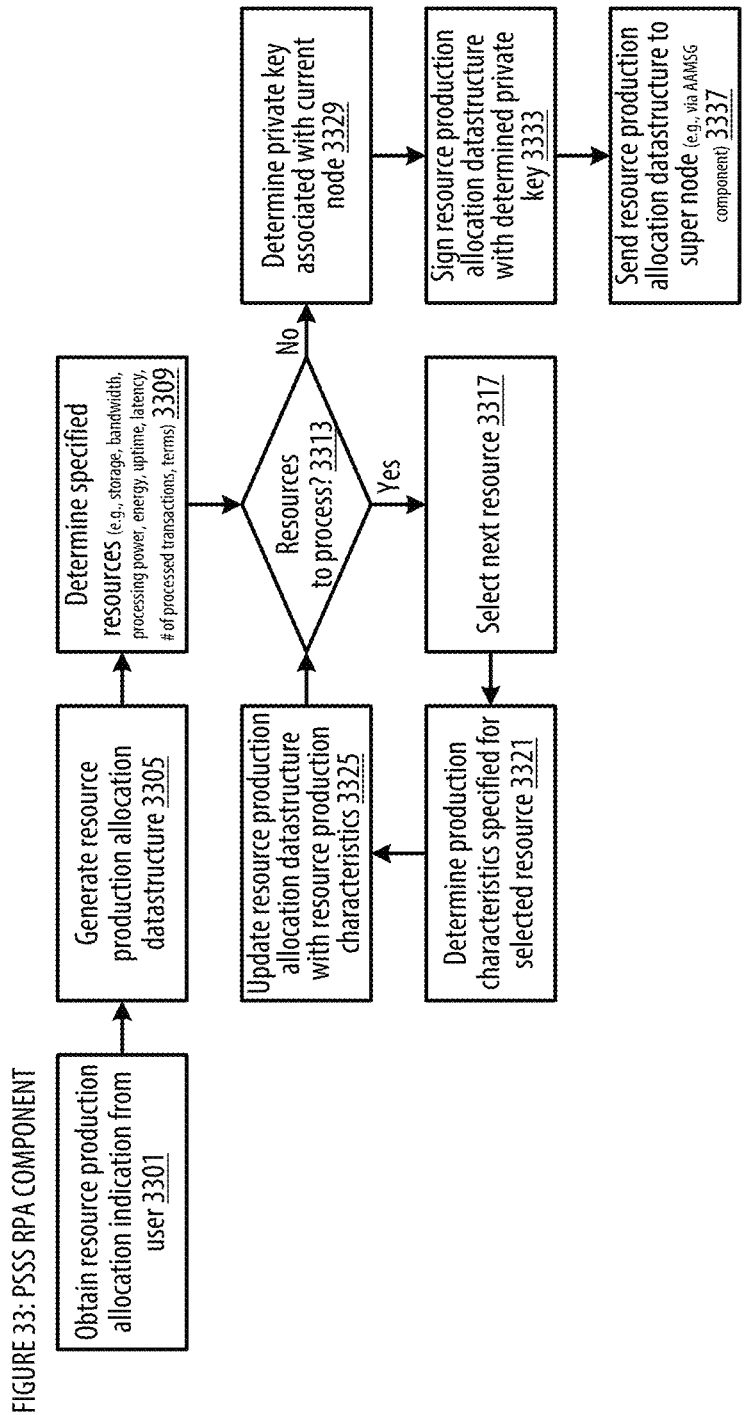

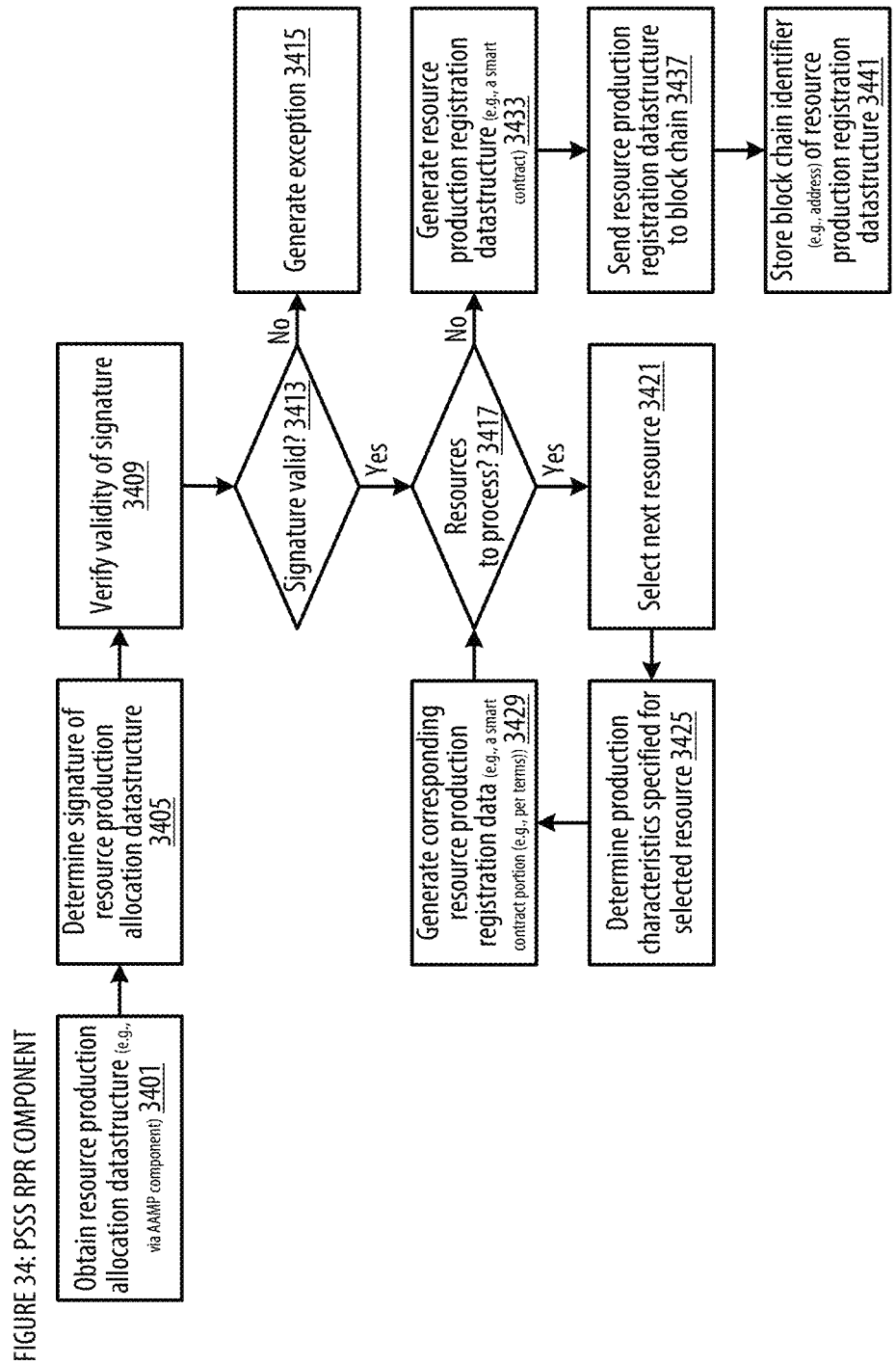

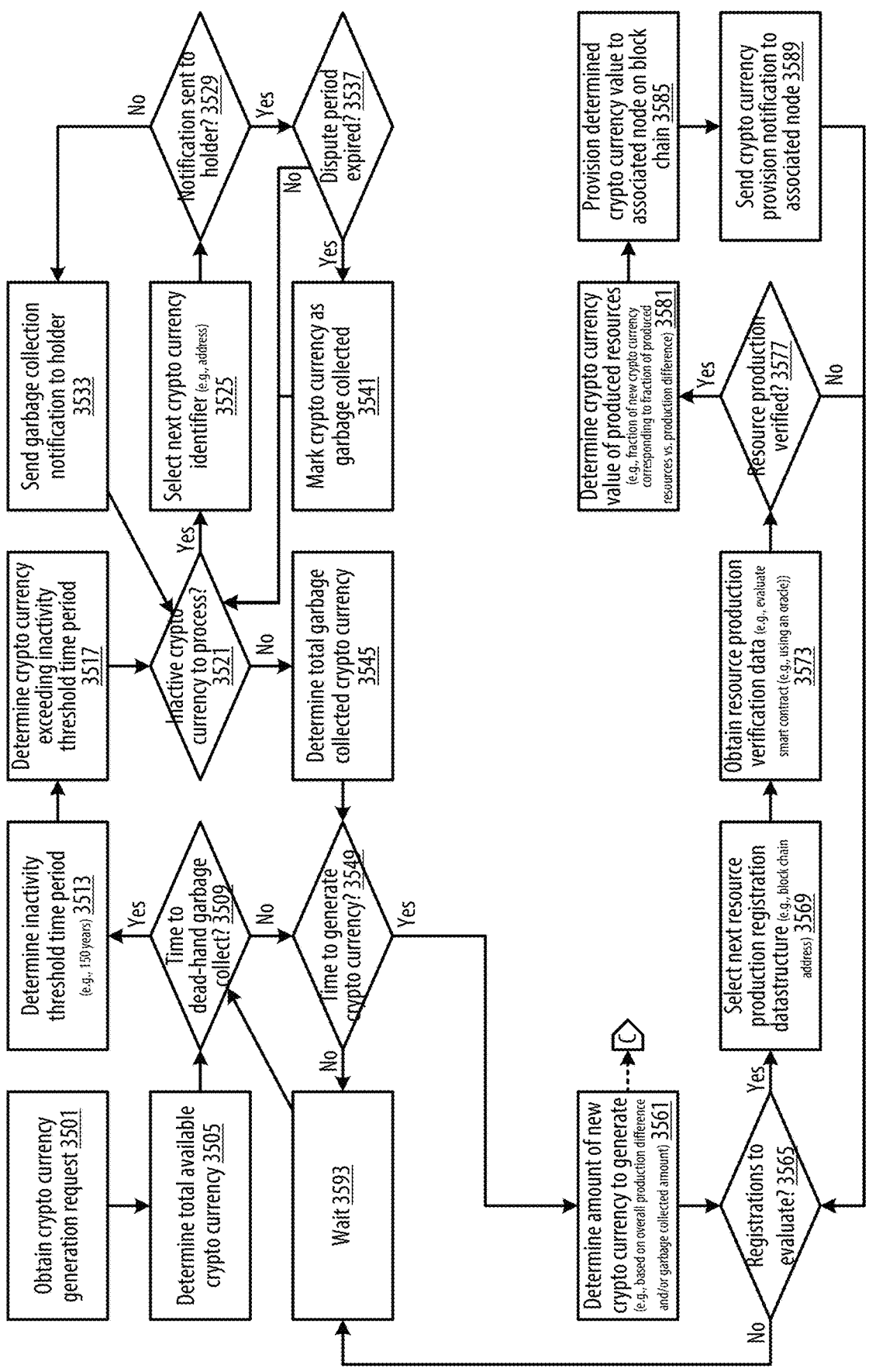

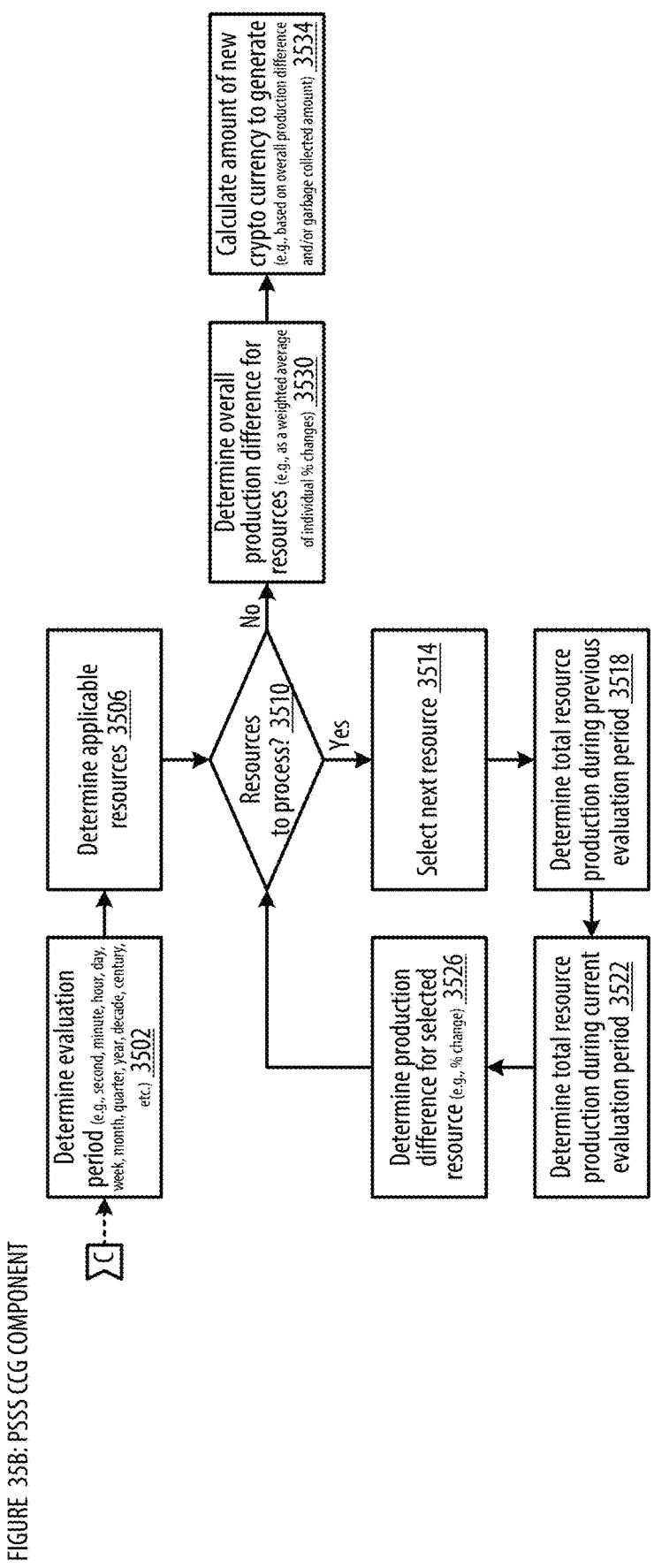
FIGURE 35B: PSSS CCG COMPONENT

FIGURE 36: PSSS Controller
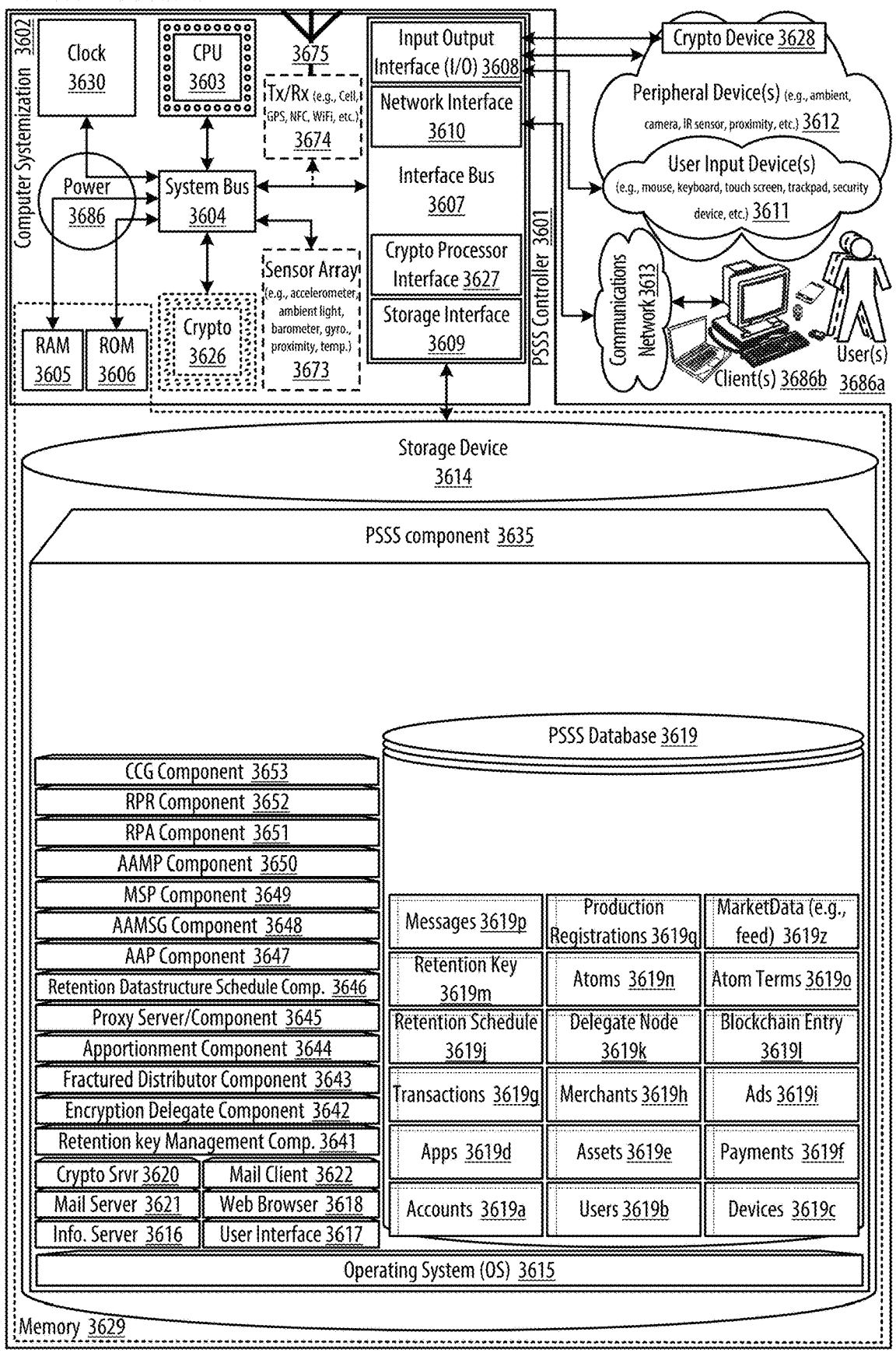

PRIVACY SECURE SOCIAL SET APPARATUSES, METHODS AND SYSTEMS

PRIORITY CLAIM

Applicant hereby claims benefit to priority under 35 USC § 120 as a continuation-in-part of U.S. patent application Ser. No. 15/296,019, filed Oct. 17, 2016, entitled "Delegated Expiring Encryption Wrapped Datastructures Apparatuses, Methods and Systems", and which in turn claims benefit to priority under 35 USC § 119 as a non-provisional conversion of: U.S. provisional patent application Ser. No. 62/242,264, filed Oct. 15, 2015, entitled "Delegated Expiring Encryption Wrapped Datastructures Apparatuses, Methods and Systems," and U.S. provisional patent application Ser. No. 62/242,270, filed Oct. 15, 2015, entitled "Delegated Expiring Encryption Wrapped Datastructures Apparatuses, Methods and Systems;"

Applicant also hereby claims benefit to priority under 35 USC § 119 as a non-provisional conversion US provisional patent application Ser. No. 63/084,560, filed Sep. 28, 2020, entitled "Privacy Secure Social Set Apparatuses, Methods and Systems", Ser. No. 63/115,567, filed Nov. 18, 2020, entitled "Privacy Secure Social Set Apparatuses, Methods and Systems", Ser. No. 63/128,833, filed Dec. 21, 2020, entitled "Privacy Secure Social Set Apparatuses, Methods and Systems", Ser. No. 63/135,741, filed Jan. 10, 2021, entitled "Privacy Secure Social Set Apparatuses, Methods and Systems"; Ser. No. 63/137,322, filed Jan. 14, 2021, entitled "Privacy Secure Social Set Apparatuses, Methods and Systems", Ser. No. 63/172,073, filed Apr. 7, 2021, entitled "Privacy Secure Social Set Apparatuses, Methods and Systems", Ser. No. 63/173,047, filed Apr. 9, 2021, entitled "Privacy Secure Social Set Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address cryptographic distributed communications, and more particularly, include Privacy Secure Social Set Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer systems allow people to communicate with one another. Popular platforms include Apple's Messages, AOL Instant Messenger, Facebook (both web-based wall and messenger), and Twitter (both public and direct messages).

BRIEF DESCRIPTION OF THE DRAWINGS

Appendices and/or drawings illustrating various, non-limiting, example, innovative aspects of the Privacy Secure Social Set Apparatuses, Methods and Systems (hereinafter "PSSS") disclosure, include:

FIG. 1 shows non-limiting, example embodiments of a datagraph illustrating embodiments of a datastructure retention policy for the PSSS;

FIG. 2 shows non-limiting, example embodiments of a logic flow illustrating embodiments of a retention key management, encryption delegate component for the PSSS;

FIG. 3 shows non-limiting, example embodiments of a datagraph illustrating embodiments of a datastructure delegation/fractured distribution for the PSSS;

FIG. 4 shows non-limiting, example embodiments of a logic flow illustrating embodiments of a delegate, fractured distribution, apportionment components for the PSSS;

FIG. 5 shows non-limiting, example embodiments of a screenshot illustrating embodiments of a retention key management, encryption delegate user interface for the PSSS;

FIG. 6 shows non-limiting, example embodiments of a screenshot illustrating embodiments of a delegate, fractured distribution, apportionment user interface for the PSSS;

FIG. 7 shows non-limiting, example embodiments of a datagraph illustrating data flow(s) for the PSSS;

FIGS. 8A-D show non-limiting, example embodiments of a datagraph illustrating data flow(s) for the PSSS;

FIG. 9 shows non-limiting, example embodiments of a data structure for the PSSS;

FIGS. 10A-C show non-limiting, example embodiments of a data structure for the PSSS;

FIG. 11 shows non-limiting, example embodiments of a data structure for the PSSS;

FIG. 12 shows non-limiting, example embodiments of a screenshot illustrating user interface(s) (e.g., alias, conversation/message editing) of the PSSS;

FIG. 13 shows non-limiting, example embodiments of a screenshot illustrating user interface(s) (e.g., clips, (a)synchronous app message attachments) of the PSSS;

FIG. 14 shows non-limiting, example embodiments of a screenshot illustrating user interface(s) (e.g., orthogonal atoms) of the PSSS;

FIG. 15 shows non-limiting, example embodiments of a screenshot illustrating user interface(s) (e.g., funshare) of the PSSS;

FIG. 16 shows non-limiting, example embodiments of a screenshot illustrating user interface(s) (e.g., inspectors) of the PSSS;

FIG. 17 shows non-limiting, example embodiments of a screenshot illustrating user interface(s) (e.g., profile) of the PSSS;

FIG. 18 shows non-limiting, example embodiments of a screenshot illustrating user interface(s) (e.g., terms) of the PSSS;

FIG. 19 shows non-limiting, example embodiments of a screenshot illustrating user interface(s) (e.g., new group) of the PSSS;

FIG. 20 shows non-limiting, example embodiments of a screenshot illustrating user interface(s) (e.g., search) of the PSSS;

FIG. 21 shows non-limiting, example embodiments of a screenshot illustrating user interface(s) (e.g., hybrid, multi-column threads) of the PSSS;

FIG. 22 shows non-limiting, example embodiments of a screenshot illustrating user interface(s) of the PSSS;

FIG. 23 shows non-limiting, example embodiments of a screenshot illustrating user interface(s) (e.g., inspectors, terms) of the PSSS;

FIG. 24 shows non-limiting, example embodiments of a screenshot illustrating user interface(s) of the PSSS;

FIG. 25 shows non-limiting, example embodiments of a screenshot illustrating user interface(s) of the PSSS;

FIG. 26 shows non-limiting, example embodiments of a screenshot illustrating user interface(s) of the PSSS;

FIGS. 27A-B show non-limiting, example embodiments of a datagraph illustrating data flow(s) for the PSSS;

FIGS. 28A-B show non-limiting, example embodiments of a logic flow illustrating an atom action processing (AAP) component for the PSSS;

FIG. 29 shows non-limiting, example embodiments of a logic flow illustrating an atom action message shards generating (AAMSG) component for the PSSS;

FIG. 30 shows non-limiting, example embodiments of a logic flow illustrating a message shard processing (NSP) component for the PSSS;

FIGS. 31A-B show non-limiting, example embodiments of a logic flow illustrating an atom action message processing (AAMP) component for the PSSS;

FIG. 32 shows non-limiting, example embodiments of a datagraph illustrating data flow(s) for the PSSS;

FIG. 33 shows non-limiting, example embodiments of a logic flow illustrating a resource production allocating (RPA) component for the PSSS;

FIG. 34 shows non-limiting, example embodiments of a logic flow illustrating a resource production registering (RPR) component for the PSSS;

FIGS. 35A-B show non-limiting, example embodiments of a logic flow illustrating a crypto currency generating (CCG) component for the PSSS;

FIG. 36 shows a block diagram illustrating non-limiting, example embodiments of a PSSS controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Privacy Secure Social Set Apparatuses, Methods and Systems (hereinafter "PSSS") transforms atom interaction mechanism actuations, atom action interaction mechanism actuations, message shard send request, resource production allocation indication inputs, via PSSS components (e.g., AAP, AAMSG, MSP, AAMP, RPA, RPR, CCG, etc. components), into message shard acknowledgement response, user interface display, message shard acknowledgement response, crypto currency provision notification request outputs. The PSSS components, in various embodiments, implement advantageous features as set forth below.

INTRODUCTION

Introduction to Advantages of Delegated Expiring Encryption Wrapped Communications The PSSS provides unconventional features (e.g., specifying terms surrounding the conversations and enforcement for violations for violating of agreed upon terms) that were never before available in cryptographic distributed communications. The PSSS allows a number of users to establish terms they all may agree to that binds all the conversation participants and conversations to a set of actionable terms. For example, participants may decide they want a conversation where no one can share the contents of the conversation for confidentiality purposes. The PSSS will then disable copying and pasting of conversation, and it may provide a mechanism where if participants violate the privacy of the conversation, they will be subject to a fee. As such, users can be properly compensated when their privacy is violated and charge an appropriate fee. In advance of conversations, participants may be presented with a click-wrap non-disclosure and licensing fee agreement where each user clicks to agree to be bound to the terms not to disclose and agrees to pay an appropriate fee if they violate their promise not to disclose. In one embodiment, users may pay in-advance to participate in the conversation via credit card charge.

In one embodiment, PSSS may be used for a document retention policy compliant email where emails are encrypted and one of the decryption keys is kept on the server and provided to decrypt. After an amount of time specified by user/admin, the encryption key at the server is deleted thereby making the emails unreadable even if backed up on tape. In another embodiment, the keys are generated so that they decrypt within a date range by obtaining time request from a specified time IP address stamp (e.g., of a time server, off a blockchain latest entry date/time, etc.). In addition, PSSS may be used for instant messages and social media systems where posts and messages have encrypted retention expirations. In one embodiment, a file (e.g., a JPG) will maintain metadata (e.g., EXIF) with a location link (e.g., http request) for a decryption key that may be pulled by the destination/recipient to decrypt the email for viewing, wherein the recipient client decrypts the data shows the data in a view (e.g., an overlay) but the underlying data remains in encrypted-later after the keys expire decryption of the underlying data will fail.

In one embodiment, PSSS may be used as a Bitcoin double proxy. Where two bitcoin proxies send bitcoin/transactions to each other and log entries, but the initiating and destination of the bit coins get them from a swarm effect. For example, if user1 sends $100 to user2, proxy1 receives the $100 in coins and logs it. Proxy1 may then initiate some random number of transactions (which may be executed in parallel, serious, synchronously, asynchronously, and/or the like) with at least Proxy2 (but may be 10 other proxies), and sends $5, 25, $30, $40 to the different proxies indicating a destination. These transactions can be over time and not at the same time. Then the other proxies may also send different amounts to the destination account in different amounts and times, yet totaling the original $100 value of transaction. Automated $ to dollar transaction with automated Bitcoin intermediary. Like a western union via anonymous Bitcoin.

In another embodiment, blockchain entries may be made via a double proxy for the email system with expiring keys so the information goes dead. It allows for expiring anonymized email.

In one embodiment, PSSS may be used for a document retention policy compliant email system for encrypting emails involves the following: (1) prior to transmission of the email, an email system plugin receives a public key from a server to encrypt that email, that server maintaining a decryption key; (2) a recipient also receives a public key from a server to decrypt the transmitted email to allow a recipient to read that particular email; (3) if, prior to the expiration of a specified time set by a user, administrator, and/or compliance program, a user wishes to retrieve and read a particular email, the server will provide the decryption key only if prior to an email expiration date. After amount of time specified by user/admin/compliance program, the encryption key at the server is deleted thereby making the emails unreadable by any user, even if backed up on tape. In other embodiments, any file(s) can similarly be encrypted, and any stored decryption key can be stored at a server—which can be deleted after an amount of time specified by user/admin/compliance program, thereby making the file(s) unreadable by any user, even if backed up on tape.

In one embodiment, PSSS may be used for a Bitcoin double proxy anonymization system. Where two bitcoin proxies send bitcoin/transactions to each other and log entries, but the initiating and destination of the bit coins get them from a swarm effect. The two bitcoin proxies routinely purge their log entries, thereby anonymizing the origin and destination of the funds transfer. For example, if user1 sends $100 to user2, proxy1 receives the $100 in coins and logs it. Proxy1 may then initiate some random number of transactions with at least Proxy2 (but may be 10 other proxies), and sends $5, 25, $30, $40 to the different proxies indicating a destination. These transactions can be over time and not at the same time, and any log of these transactions is routinely deleted. Then the other proxies may also send different amounts to the destination account in different amounts and times, yet totaling the original $100 value of transaction. Any logs maintained by proxy2 are also routinely deleted, further anonymizing the origin and destination of the funds transfer. In effect, this creates an automated dollar to dollar transaction with automated Bitcoin intermediary. Like a western union via anonymous Bitcoin.

In one embodiment, the PSSS includes a new revolutionary type of crypto currency: PSSS crypto. This currency is hyper secure, may be open sourced, includes anonymity and extended privacy, may be vetted by the crypto community of experts, completely decentralized (e.g., preventing oppression and tyranny of large stake holders), fast and highly scalable blockchain, prevents dead hand expiration of currency (e.g., when a currency owner dies and no one can obtain their wallet/passwords the coins essentially expire reducing the total amount of currency available), and solved with the currency being based on growing production value (e.g., mining work based on work (e.g., bandwidth of transactions and data being used, e.g., by PSSS messaging and storage), storage (e.g., PSSS nodes allotting storage of others' messaging/date), and energy (e.g., amount of kilowatt hours used to transact the currency, store the data, and power the bandwidth of transfers), and integrates oracles and smart contracts with the currency. As such, in one embodiment, this currency is produced as the PSSS allocates/generates more storage, and allocates/employs more bandwidth, allocates/employs more energy. In this way, this currency grows along with production of resources.

In one embodiment, the PSSS includes a storage service. This storage service is hyper secure, may be open sourced, includes anonymity and extended privacy, may be vetted by the crypto community of experts, completely decentralized (e.g., preventing oppression and tyranny of large stake holders), fast and highly scalable blockchain, prevents dead hand expiration of storage (e.g., when a storage owner dies and no one can obtain their wallet/passwords the storage essentially expires reducing the total amount of storage/date available), and solved with the storage being based on growing production value (e.g., mining work based on work (e.g., bandwidth of transactions and data being used, e.g., by PSSS messaging and storage), storage (e.g., PSSS nodes allotting storage of others' messaging/date), and energy (e.g., amount of kilowatt hours used to transact the currency, store the data, and power the bandwidth of transfers), and incorporates oracles and smart contracts with the currency.

Introduction to Advantages of PSSS Cryptographic Distributed Communications

In one embodiment, the PSSS may include features for cryptographic distributed communications with never before seen advantages including:
1. True free speech: (1) impartiality of speech, (2) resilient/robust and secure infrastructure, and (3) privacy
    1.1. Client-server app; distributed data so no control can be taken down/wrestled by any company or government
    1.2. Open Source
        1.2.1. Likely model is to release open source 1-2 years later to keep advantage for the company.
        1.2.2. Interworking with latest API
    1.3. Anti-Cancel-Culture Privacy with Terms Attachment & UI
        1.3.1. Terms (e.g., NDA) held to any atom type, e.g.: categories/groups/media/threads/topics/etc.
            1.3.1.1. New concept of a private giant public group
        1.3.2. Mutually Assured Destruction (MAD) feature to help ensure privacy
    1.4. End-to-end encryption
2. Cooperative interactive group media
    2.1. Surf together, watch videos together, shop together, buy together, gift together, raise money together, etc.
3. Plug-in architecture/UI, e.g., apps, games, financial systems, stickers, etc.; a huge sticky ecosystem
4. The "iPhone" of crypto
5. The "iPhone" of cloud storage
    5.1. Universal distributed storage, e.g., subsuming many sites like YouTube

PSSS

FIG. 1 shows non-limiting, example embodiments of a datagraph illustrating embodiments of a datastructure retention policy for the PSSS. A user 186a may employ various device clients 186 which may instantiate various components 187 allowing them to interact with other users 186b that may have similar device configurations. It should be noted that the component(s) 187 may be housed and/or execute at the client devices 186, at PSSS server(s) 199 and even as components at 3$^{rd}$ party servers 198 (e.g., see retention key management component 141, encryption delegate component 142). Initially a user 186*a* may be presented with a user interface display 100 allowing for the setting of retention/distribution value(s) for a designated target. The target may be a piece of data (e.g., an email, a message, a file, etc.). In at addition, various retention policy parameters may be set via the interface, which may then be packaged and sent as a set of retention parameters for the target data (e.g., via web browser interface; e.g., see FIG. 5) as a retention parameters message 102. In one embodiment, the client may provide the following example retention parameters request 102, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<retention_parameters_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA _</digital_certificate>
        </user_account_credentials>
    </user_accounts_details>
    <client_details> //iOS Client with App and Webkit
                //it should be noted that although several client details
                //sections are provided to show example variants of client
                //sources, further messages will include only on to save
                //space
        <client_IP>10.0.0.123</client_IP>
        <user_agent_string>Mozilla/5.0 (iPhone; CPU iphone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>PSSS.app</app_name>
        <app_version>1.0 </app_version>
        <app_ID>uniqueAppIdentifier</app_ID>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
```

-continued

```
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <retentionID>
        <targetDataPayload>Data</targetDataPayload>
        <targetDataID>machine_address_inode_filepath</targetDataID>
        <targetUser>userID</targetUser>
        <targetDevice>deviceID</targetDevice>
        <retentionPolicyID>policyMachineAddressAndUniquePolicyIdentifier</retentionPolicyID>
>
        <retentionExpirationTime>Date_Time</retentionExpirationTime>
        <retentionInteval>time</retentionDuration>
        <retentionRefresh>time</retentionRefresh>
        <retentionNum>uniqueIdentifier</retentionNum>
        <retentionCredentials>userID</retentionCredentials>
        <sendDeliveryConfirmation>TRUE</sendDeliveryConfirmation>
        <sendTargetSendConfirmation>TRUE</sendTargetSendConfirmation>
    </retentionID>
    //OPTIONAL <cookie>cookieID</cookie>
    //<fractureDelegate>
    //     <targetAssetID>assetID</targetAssetID>
    //     <targetAssetPayload>e.g.bitcoin</targetAssetPayload>
    //     <distributionValue>assetIDValue</distributionValue>
    //     <preferredFracturing>numberOfShards</preferredFracturing>
    //     <preferredNumProxyHops>numberOfHops</preferredNumProxyHops>
    //     <deliverBy>dateTime</deliverBy>
    //     <targetUser>userID</targetUser>
    //     <targetDevice>deviceID</targetDevice>
    //     <sendDeliveryConfirmation>TRUE</sendDeliveryConfirmation>
    //     <sendTargetSendConfirmation>TRUE</sendTargetSendConfirmation>
    //     <approveTransactionFee>TRUE</approveTransactionFee>
    //</fractureDelegate>
</retention_parameters_request>
```

The retention key management component may receive the retention parameters message 141 (e.g., See FIG. 1 for more details and see FIGS. 3 and 4 for optional proxy fracturing distribution of the data; see FIG. 5 for user interface embodiments for setting such parameters; etc.). Upon obtaining the retention parameters the retention key management component 141 may generate digital credentials with which to encode and/or encrypt data selected/targeted by the user. The generated credentials may be sent back to the user in a retention key message 103. This may include, for example, an X.509 certificate, public and/or private keys employing PGP encryption, and/or the like. In one embodiment, the Retention Key Management Component may also run on a $3^{rd}$ party server and it may augment and/or supplant a user supplied password used to generate and decode any key encrypted data. For example, in one embodiment public key may be provided to an NIST server for encoding time stamps. In one embodiment, the retention key message contains any generated PGP keys and/or digital certificates that may be stored on the client 186.

The user 186 may then generate messages such as emails, instant messages, or files for saving on the device 186 and tag such message for retention policy application via a user interface (e.g., see FIG. 5; it should be noted such an interface may be configured as a standalone app, a web browser page, a plugin to other applications, an automatic system service using default preset (e.g., retention policy) settings and applied automatically, etc.). The user can specify a file, folder and all contents, drive, message, etc. The user may also specify the time span for retention. Also, the client device 186 may subscribe to a retention policy set by administrations and/or organizations. For example, a company may specify a retention policy for all emails to be 400 days, and as such, that duration may be a default entry in the user interface. Upon specifying the duration and data target, the encryption delegate component 142 will use the received retention security credentials from the retention key message 103 to generate an encrypted version of the target data. The encrypted version may save metadata including a unique target data identifier and source for public decryption keys; this metadata can be used by any other user(s) 186*b* that try to access this data.

In one example embodiment, the encrypted data may then be acted upon (e.g., stored on a server, sent as a message/file/email, etc.). In one embodiment, the encrypted corpus may be sent as an encrypted message 105 to be received, e.g., by a $3^{rd}$ party 198 (e.g., via an email server component 121), 186*b*. In one embodiment, the PSSS Retention Key Management Component 141 is run on the $3^{rd}$ party server 198 and/or is integrated into the mail server component 121 as a plugin. In such an embodiment, the mail server component 121 may independently honor retention parameters.

Upon obtaining the encrypted message 105, the recipient user 186b may then attempt to view and/or otherwise access the message 106. The client software would employ the encryption delegate component 142 and use the metadata to access the public key by generating a key request 107, which could be sent to a retention key management component 141. The retention key management component may use the provided targetDataID to look up the proper public key and/or other security credentials. If the credentials have not yet expired (e.g., see FIG. 3) it could then provide the public key to the requesting user by way of key response 112, which may then be used by the encryption delegate component for decryption. Again, part of the security credentials in addition to a public key may be a key password augment as has already been described where a request to a time server may be made and required either by the retention key management component for release of the public key and/or required by the encryption delegate component in use in conjunction with the transient public key response 112 for proper decryption. This will prevent those that may retain a copy of the public key from later attempts at hacking open the data as the augmented password can only come from a digitally signed time server and only encoded with a proper public key to generate the augmented unlock password at the encryption delegate component 142. As such, this will prevent access to the encrypted data beyond the expiration period. In an alternative embodiment, the originating user may receive a key approval request 108 where the user may authorize a response 110 allowing for such access, and in alternative embodiment, even overriding a retention policy with authorization messages 111 (e.g., such overriding could occur when the data is encrypted with two sets of decryption keys and is not advised for most applications). The authorization message may be a key response message itself and/or a message to allow for the sending of the key response message 112. At this point, the key response and/or any augmented password responses along with any transient keys may be used by the encryption delegate to decrypt the message for display 113 and/or access.

FIG. 2 shows non-limiting, example embodiments of a logic flow illustrating embodiments of a retention key management, encryption delegate component for the PSSS. In one embodiment the retention key management component 242 may be instantiated 200 on a PSSS server 299, but as noted in FIG. 1 it may also be instantiated and/or interact with $3^{rd}$ party servers 298 and even on client devices 286. Similarly, the encryption delegate component 242b may generally be instantiated on a client device 286 but may also be run on PSSS 299 and $3^{rd}$ party 298 servers. In one embodiment, the user accesses a retention user interface 210 (e.g., see FIG. 5) and provides various user retention settings 215 that are then provided to the DEED server 299. The PSSS server obtains retention parameters messages (e.g., see 102 of FIG. 1) and processes each message received as a retention policy request 201. If there are no retention processing messages 205, processing may halt, and/or alternatively continue iterating and waiting for additional messages 201. Upon obtaining the retention parameter message 210, the PSSS server (i.e., via the retention key management component 242a) may parse out key parameters (e.g., credentials: usr/pass, userID, deviceID, appID; retention: targetData, targetDataID, expiration policy/time/interval/etc.; fracture: distrib value, valueID(s), fracturing, delay, targetDataID,etc.). For example, it may look for any credentials needed for access to data and/or assets, and for parameters relevant for retention and or fracture operations in the retention parameters message 102 (e.g., parsing/matching for user_account_credentials, retentionID, fractureDelegate XML fields and subsequent subfields, etc.).

Upon parsing the obtained parameters 210, the retention key management component 242 may then generate digital security credentials (e.g., hash/digital cert./public-private keys off password, userID, deviceID, appID, targetData, targetDataID, etc.). The retention key management component 242 may receive the retention parameters message (e.g., see 102 of FIG. 1 for more details and see FIGS. 3 and 4 for optional proxy fracturing distribution of the data; see FIG. 5 for user interface embodiments for setting such parameters; etc.). Upon obtaining the retention parameters the retention key management component 241 may generate digital credentials with which to encode and/or encrypt data selected/targeted by the user (e.g., hash/digital cert./public-private keys off password, userID, deviceID, appID, targetData, targetDataID, etc.) 215. This may include, for example, an X.509 certificate, public and/or private keys employing PGP encryption, and/or the like. In one embodiment. The Retention Key Management Component may also run on a $3^{rd}$ party server 298 and it make augment and/or supplant a user supplied password used to generate and decode any key encrypted data. For example, the PSSS server 299 would determine the time span for data retention that was provided by the user settings 215 and could request for the creation a password augmentation (e.g., 1 month then store www.nist-.gov IP address, time request, catenated/parsed response, compare to span and address stored in blockchain 232, encrypted request.) 220. In one embodiment, a generated public key may be provided to an NIST server 298 for encoding time stamps 224. So, if a user makes a selection that the retention policy is only for one year, e.g., 2017, the NIST server may parse out its time reporting only for the year, use the obtained public key provided to it to encode the parsed 2017 time stamp (e.g., see RFC-1305, RFC-867; (e.g., parsing YR out of JJJJJ YR-MO-DA HH:MM:SS TT L H msADV UTC(NIST) OTM so encryption would operate just on YR) 226. This augmented time stamp can be concatenated to any user supplied password to augment its validity as part of the generation process for the digital credentials. Therefore, when decoding data encrypted with the supplied credentials, a request can be made of the Retention Key Management Component at a time server, and the response returned will be made with the public key encoding of its generated time stamp. If the time frame is beyond the threshold, e.g., after 2017, and the key is available, it will generate a mismatch password augment and the file will not open, and also, if the public key is deleted after the time duration threshold, no key will exist to properly encode an password augment from the time server, and as such, any encoded data will not have the password needed to decode the encoded data. In one embodiment, the time server may have a digital certificate to authenticate its self, and the users encryption delegate component will only use a password obtained from a time server that properly authenticates itself with the complementary digital certificate. In yet another embodiment, it will also use the IP address to make sure it matches the original IP address that made the original password augment. In one embodiment, the retention key message contains any generated PGP keys and/or digital certificates that may be stored on the client 286. As such, any generated digital security credentials 215, 226 may be stored 230 (e.g., public/private keys off password, userID, deviceID, appID, targetData, targetDataID, etc.) to a PSSS server, e.g., database 219. The public key and/or and identifier (e.g., URL) to the public key and/or any of the supplied retention parameters (e.g., see 102 of FIG. 1)

may also be stored out to a bit coin blockchain (e.g., using digital credentials to hash/encrypt stored values.) 232; to the extent the credentials do not fit within the 80 byte header of the blockchain, a (e.g., shortened) URL to expanded data and/or a hash and/or unique identifier to the data may be stored).

Once the credentials are created 230, they may be provided to the originating user, and the user's device may encrypt the target data; alternatively, the user may have supplied a URL and/or location for the data, and the PSSS server 299 may use the credentials to encrypt the target data. In one embodiment, the credentials are supplied to the originating user 286, 250, and the user may select 260 a message (e.g., file, email, folders/drives, instant message(s), etc.) and apply retention parameters to that target data 255; see FIG. 5). For example, the user may supply a password that would be augmented by time password augmentation as discussed, or not supply and password and such time augmentation password may be used instead. These selections 260 may be used by the encryption delegate component 242 to prepare the message for storage (e.g., whereby the supplied credentials 250 are used to encrypt the target data) 265. In another embodiment, the original non-encrypted version of the file is destroyed. In one embodiment, the user 286 may indicate that they wish to share (e.g., send) the encrypted data to another user 270. Upon sending the encrypted data, the target user's device 286 may receive the message 275 and parse for metadata (e.g., unique targetData and/or credentials identifiers) 280. This metadata may then be used to request the decryption security credentials (e.g., public key obtained 282 from the PSSS database 219 and/or blockchain 232). Both the encryption delegate component 242 and/or the retention key management component 242 may first check to see if the requested credentials have expired (e.g., if they are past the specified retention period and/or have otherwise been deleted; e.g., in one embodiment, the PSSS server may delete public keys past their expiration period) 285. If the credentials are expired, an error message may be displayed that the target data has now expired and is no longer accessible 296. Otherwise, the credentials may be retrieved from the server 290, as well as any needed time password augment 290. The credentials may be sent to the client 286 (e.g., as well as any time based password augmentation) 286. These credentials may then be used to decrypt and/or provide access to the target data 295 and the data may otherwise be displayed 296 and/or accessed.

FIG. 3 shows non-limiting, example embodiments of a datagraph illustrating embodiments of a datastructure delegation/fractured distribution for the PSSS. A user 386a may employ various device clients that may instantiate various components 387 allowing them to interact with other users 386b that may have similar device configurations. It should be noted that the component(s) 387 may be housed and/or execute at the client devices 386a/b, at PSSS server(s) 399a/b and even as components at $3^{rd}$ party servers 398 (e.g., see fractured distributor component 343, apportionment component 344; see FIG. 4). Initially a user 386a may be presented with a user interface display 300 allowing for the setting of retention/distribution value(s) for a designated target (e.g., see FIG. 6). The user may specify assets, asset sources, asset targets, and fracturing/hop/timing delivery parameters within the user interface 301 (e.g., See FIG. 6). The user's device 386a may provide a fractured distribution parameters message (e.g., generate key w/params (e.g., store digital cert. and/or hash params on blockchain) (e.g., retention: expiration policy/time/interval/etc., password, userID, deviceID, appID; fracture: distribution value, valueID(s), fracturing, delay, targetID, etc.): see FIG. 1; see FIG. 4 for fractured distrib.) 302 to a fractured distributor component 343. In at addition, various retention policy parameters may be set via the interface, which may then be packaged and sent as a set of retention parameters for the target data (e.g., via web browser interface; e.g., see FIG. 6) as a fractured distribution parameters message 302. In one embodiment, the client may provide the following example fractured distribution parameters message request 302, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<fractured_distribution_parameters_request>
        <timestamp>2020-12-31 23:59:59</timestamp>
        <user_accounts_details>
                <user_account_credentials>
                        <user_name>JohnDaDoeDoeDoooe@gmail.com</account_name>
                        <password>abc123</password>
                        //OPTIONAL <cookie>cookieID</cookie>
                        //OPTIONAL <digital_cert_link>www.mydigitalcertificate.com/
JohnDoeDaDoeDoe@gmail.com/mycertifcate.dc</digital_cert_link>
                        //OPTIONAL <digital_certificate>_DATA _</digital_certificate>
                </user_account_credentials>
        </user_accounts_details>
        <client_details> //iOS Client with App and Webkit
                        //it should be noted that although several client details
                        //sections are provided to show example variants of client
                        //sources, further messages will include only on to save
                        //space
                <client_IP>10.0.0.123</client_IP>
                <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
                <client_product_type>iPhone6, 1</client_product_type>
                <client_serial_number>DNXXX1X1XXXX</client_serial_number>
                <client_UDID>3XXXXXXXXXXXXXXXXXXXXXXXXXD</client_UDID>
                <client_OS>iOS</client_OS>
                <client_OS_version>7.1.1</client_OS_version>
```

```
            <client_app_type>app with webkit</client_app_type>
            <app_installed_flag>true</app_installed_flag>
            <app_name>PSSS.app</app_name>
            <app_version>1.0 </app_version>
            <app_ID>uniqueAppIdentifier</app_ID>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6, 1</client_product_type>
            <client_serial_number>DNXXX1X1XXXX</client_serial_number>
            <client_UDID>3XXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    //OPTIONAL <cookie>cookieID</cookie>
    //<retentionID>
    //      <targetDataPayload>Data</targetDataPayload>
    //      <targetDataID>machine_address_inode_filepath</targetDataID>
    //      <targetUser>userID</targetUser>
    //      <targetDevice>deviceID</targetDevice>
    //<retentionPolicyID>policyMachineAddressAndUniquePolicyIdentifier</retentionPolicyID>
    //      <retentionExpirationTime>Date_Time</retentionExpirationTime>
    //      <retentionInteval>time</retentionDuration>
    //      <retentionRefresh>time</retentionRefresh>
    //      <retentionNum>uniqueIdentifier</retentionNum>
    //      <retentionCredentials>userID</retentionCredentials>
    //      <sendDeliveryConfirmation>TRUE</sendDeliveryConfirmation>
    //      <sendTargetSendConfirmation>TRUE</sendTargetSendConfirmation>
    //</retentionID>
    <fractureDelegate>
            <targetAssetID>assetID</targetAssetID>
            <targetAssetPayload>e.g.bitcoin</targetAssetPayload>
            <distributionValue>assetIDValue</distributionValue>
            <preferredFracturing>numberOfShards</preferredFracturing>
            <preferredNumProxyHops>numberOfHops</preferredNumProxyHops>
            <deliverBy>dateTime</deliverBy>
            <targetUser>userID</targetUser>
            <targetDevice>deviceID</targetDevice>
```

```
        <optionalConditions>blockchainConditionContract</optionalConditions>
        <sendDeliveryConfirmation>TRUE</sendDeliveryConfirmation>
        <sendTargetSendConfirmation>TRUE</sendTargetSendConfirmation>
        <approveTransactionFee>TRUE</approveTransactionFee>
    </fractureDelegate>
</fractured_distribution_parameters_request>
```

The fractured distributor component 343 may then determine how to best fracture an asset for staggered delivery. In one embodiment, a unix command like split or cat may be used to split:

split-bytes X-numeric-suffixes-suffix-length=3 assetIdentifier assetIdentifier.

Where X is the size in bytes to split the asset into. This may be specified by taking the total size of the asset in bytes and dividing it by the number of shards to be produced. Also, assetIdentifier may be a file name or a source asset. This will produce numbered shards, e.g., assetIdentifier.001, assetIdentifier.002, etc. The shards may then be reconstructed, in one embodiment, per the following cat command:

cat assetIdentifier.*>assetIdentifier reconstructed

The asset may be any kind of data (e.g., emails, messages, files, folders, drives, etc.). In another embodiment, the asset may be currency, e.g., digital currency such as bitcoin. In one embodiment, asset currency may be found on the user's device 386a and/or at some $3^{rd}$ party (e.g., a bitcoin wallet). In another embodiment, the user obtain money from their $3^{rd}$ party account (e.g., online bank account or money supplier) and in such an embodiment the $3^{rd}$ party may use and/or interact with an apportionment component 344. The user may supply credentials (e.g., login credentials to a bank account) that may in turn transact for specified amounts of funds to be turned into bit coins, for example. The user credentials may be used by the fractured distributor component 343 to generate an authorize apportionment request (e.g., userID, auth creds., authorize corpus access, provide corpus in apportioned amounts, provide identifiers to apportioned amounts (e.g., bitcoins), write authorization to blockchain, etc.: see FIG. 4) 303. In response, the apportionment component 344 may provide an apportionment response message 304 (e.g., having charged the user account for currency conversion to bitcoins and registered bitcoins to the blockchain in the name of the user, and provide the user with the blockchain reference).

The fractured Distributor component 343 may then generate a fractured distribution as specified by the fractured distribution parameters message 302 (e.g., minimum number of shards, minimum number of proxy hops, deliver by date/times, confirmation, transaction fee charges, etc.). For example, if a user specified sending 100 bitcoins, within 15 minutes, with a minimum number of 6 fractured shards and at least 2 proxy hops, the results may be seen in FIG. 3. In the first case, the fractured distributor component 343 splits the 100 bitcoins into 3 messages 305a/b/c where 55 bitcoins are sent 3 minutes after (e.g., delay) obtaining the original request 302 from the first proxy server 399a; 25 bitcoins are sent 1 minute from request 305b, and 20 bitcoins are sent 5 minutes from the request 305c. The messages have the targetID, and deliver by timings. It should be noted that these shards may be bitcoins registered as owned by the proxy server 399a and not the ones owned by the user 386a, 344. Since the user asked for at least 2 proxy hops, instead of being sent to the target user 386b for delivery, instead, they are sent to a $2^{nd}$ proxy server 3999 fractured distributor component 343. This component may itself further fracture each of the received shards 305a/b/c. In one embodiment it may directly fracture each of the shards (e.g., into 2 more shards so as to comply with the 6 minimum number of shards specified by the user) 306a2, 306a3; alternatively the second proxy server 399b may itself also use the apportionment component 344 by sending authorization apportionment request 303b and obtaining apportionment response 304b and providing the received fractured offset message 305a for further fracturing 306a0 and have the apportionment component deliver the fractured offset message 6a1 itself to the user 386b, 306a2, 306a3. As each of the shards generated by the $2^{nd}$ proxy server 399b are now registered to the target user identifier via the blockchain, the user will be able to display both authorization messages and/or their own wallet to see coins registered to them appear over time, and within the time interval specified in the fractured distribution parameters message 302, 307.

FIG. 4 shows non-limiting, example embodiments of a logic flow illustrating embodiments of a delegate, fractured distribution, apportionment components for the PSSS. It should be noted that delegate, fractured distribution, apportionment components may be apportioned in multiple ways from the described logic flow. In one embodiment, a user wishing to send an asset may engage with a user interface allowing for the setting of various distribution parameters 405 (e.g., see FIG. 6). Upon specifying the settings for distribution 410, the user's client device 486 may generate and provide a fractured distribution parameters message 415 (e.g., see 302 of FIG. 3) to a PSSS proxy server 499 (e.g., running the fractured distributor component). The fractured distributor component then obtains the parameters message 420 and parses out the parameters 422. For example, it may look for any credentials needed for access to data and/or assets, and for parameters relevant for retention and or fracture operations in the retention parameters message 102 (e.g., parsing/matching for user_account_credentials, retentionID, fractureDelegate XML fields and subsequent subfields, etc.; more specifically obtaining: targetUser, targetAssetID (e.g., amount/data), deliveryBy, optionalConditions, preferredNumProxyHops, preferredFracturing (e.g., number of asset shards), etc.).

Upon parsing the obtained parameters 422, the fractured distributor component may then determine how to fracture the target asset for delivery to the specified target user (e.g., credit option fracture goes out before corpus registered with proxy, splits, etc.) 424. In one embodiment, the total number of shards specified may be generated initially and that number of shards will pass through as many proxy hops as specified by the user. In another embodiment, the total number of shards is the number delivered to the last proxy hop, but varying numbers of shards would be sent to earlier proxy hops. For example, if 6 total shards are requested across 2 hops, initially 3 shards would be sent to the first proxy hop, and it would further split each of the 3 shards into two more shards so that the $2^{nd}$ proxy receives 6 shards in total over varying times for final distribution to the target user/device. Also, each shard would not have a delivery date greater than the maximum time specified by the user, however delay times from 0 to the maximum specified delay time may be randomly selected for delivery. Each shard generated may be a new version of the fractured distribution parameters message 302, however, now with fractured values and its source identifiers listing the proxy instead of the original user. Each such shard fractured distribution parameters message may be enqueued for distribution 426. In one embodiment, the Fractured distributor component may enqueue each shard in order of time delay for later dequeuing.

In one embodiment, the PSSS proxy server 499 may act as credit issuing entity. In such a scenario the PSSS proxy/server 499 would use its own bitcoin corpus to supply shards of value for delivery, extending the user credit that would have to be paid back later. In one example, the user may provide a credit card that would be charged (e.g., including any service fee). In yet another embodiment, the user may supply his own asset corpus, and those assets would not be transferred to the PSSS proxy until after the PSSS proxy/server issues its own shard values. This makes it much more difficult to try to reverse engineer and track how assets are moved from a source to a target as the proxy servers may fracture and deliver shards both before and after registering payments from the source of the asset transfer. If the user does not wish to employ credit, the users assets are registered as being owned by the proxy 430. In one embodiment, the specified assets' (e.g., 100 user bitcoins') ownership is registered to the proxy server's 499 bitcoin wallet and registered via the blockchain entry 432. Upon such registration the fractured distributor component may then determine if there are enqueued 426 shards that need processing 444, and if so, the next shard is looked at for processing 436. However, if the user did wish to employ proxy credit 428, the user's asset corpus (e.g., bitcoins the user wishes to transfer) are enqueued as a shard for processing so that the transfer of the user's assets may happen at any time as just another shard for processing, and/or alternatively, the server 499 may process the users credit card for payment, etc.) 434.

The fractured distributor component then examines its queue of shards, and processes each shard request 436. The fractured distributor component determines if it is time to process the next shard as each shard may have a specified delay/execution time 438. If no shards are ready, the server 499 may continue waiting for the next shard 436. When it is time to process a shard 438, the fractured distributor component may then dequeue the next shard 440. In one embodiment, the fractured distributor component may determine if any retention policies should be honored on that asset 442 (e.g., that the underlying asset may be encrypted and/or beyond its retention span) and if so, execution may move to 215 of FIG. 2, 443*a*. If no retention policy is to be applied 442 or upon application 443*b*, the shard may have an asset (e.g., bitcoin) registered 432 as owned by the proxy 430 if such a shard owned asset has not yet already been apportioned to the proper size. At this point a shard will properly reference a fractured asset and may be used for further distribution towards the recipient target (e.g., another proxy and/or the target user). The PSSS proxy/server 499 may then determine if there are more shards 444 ready for distribution in the queue and continue processing 436 if so, or then determine if the shards need to be forwarded to additional proxies 446 to satisfy the minimum number of proxy hops specified in the distribution message 415. If there are more proxies, the fractured distributor component generates and provides the updated shard, including updated fractured distribution parameters (e.g., shard fractured distribution parameters message is modified decrementing the number of remaining proxies required for that fragment shard by 1, and includes a further fractional asset value) 448 as a message to the next proxy 420, 499; e.g., each PSSS proxy server 499 may have a list of IP addresses of other PSSS proxy servers for furthering such shard fracture distribution parameter messages). If this is the last hop for the shard and there are no more proxy hops 446, any specified (e.g., see FIG. 6) confirmation messages may be generated and sent to source and target clients 486, 460.

FIG. 5 shows non-limiting, example embodiments of a screenshot illustrating embodiments of a retention key management, encryption delegate user interface for the PSSS. In one embodiment, the retention UI (e.g., as used in FIGS. 1 and 2) may be provided in a web browser (as described herein FIG. 5), app, plugin, service. The UI allows a user to browse for target data 502 on their computing device (e.g., to a email, message, file, folder, drive, network location, etc.). In this example, the user dragged an email to be identified as the target data 502. In this embodiment, the user may specify user account identifier 503 and/or digital credentials 504 for use in helping to encode the target data. The UI allows for searching 510 a list of contacts (e.g., in an address book) that include users and groups 506 that may be specified to have access to the data. The UI also allows a user to provide a period of time to retain the target data 505. In an alternative embodiment, rather than specifying an expiration/duration explicitly, organization-wide retention polices may be pulled from an organization server (e.g., emails active for 700 days, instant messages active 400 days for group A, and 500 days for group B, etc.). Additionally, the user may specify a request to obtain confirmations of delivery of the target data, and provide confirmation of any sent data to targets, as well as require any $3^{rd}$ parties wishing to access the target data to generate an authentication request (e.g., 108 of FIG. 1) for such access 515. The user may interact with this UI and when happy with the retention settings, apply the retention policy to the target data 520.

FIG. 6 shows non-limiting, example embodiments of a screenshot illustrating embodiments of a delegate, fractured distribution, apportionment user interface for the PSSS.

In one embodiment, the delegate UI (e.g., as used in FIGS. 3 and 4) may be provided in a web browser (as described herein FIG. 6), app, plugin, service. The UI allows a user to browse for target (e.g., wallet) data 602 on their computing device. The user may then specify the corpus amount to be transferred (e.g., 100 bitcoins) 611, and/or if credit is to be used, account credentials 603, and the amount to be used (e.g., converted to bitcoin) 612. In one embodiment, the user may specify that they wish to use proxy credit (e.g., 428 of FIG. 4) and charge the entire corpus to their credit card 636 (e.g., including any service fees).

The UI allows for searching 621 a list of contacts (e.g., in an address book) that include users and groups 620 that may be specified as target/recipients of specified assets. The UI also allows a user to provide a period of time by which the assets must be delivered 615 or 605. In addition, the user may specify the minimum number of fractured shards to be generated 613, the minimum number of proxy hops to be used 614.

Additionally, the user may specify a request to obtain confirmations of delivery of the target data, and provide confirmation of any sent data to targets 635. The user may interact with this UI and when happy with the retention settings, apply the retention policy to the target data 630.

Cryptographic Distributed Communications

Jumping to FIGS. 27-35, the PSSS includes details of, for example, a social set platform. FIGS. 27A-B show non-limiting, example embodiments of a datagraph illustrating data flow(s) for the PSSS. In FIGS. 27A-B, an atom action processing (AAP) component 2721 may generate an atom action message corresponding to an atom action (e.g., send a text message) associated with an atom (e.g., a group) specified by a user (e.g., via PSSS GUI). See FIG. 28 for additional details regarding the AAP component. In one embodiment, an atom messaging object type (i.e., also referred to as "atom type") is instantiateable into an atom messaging object datastructure (i.e., also referred to as "atom") and operable by any number of actions (i.e., atom actions; e.g., see non-limiting examples: 1211 of FIG. 12, 1311-1313 of FIG. 13, 1411-1413 of FIG. 14, 1511-1512 of FIG. 15, 1611-1613 of FIG. 16, 2211-2213 of FIG. 22, etc.) orthogonally. Atom messaging object types may include owners, conversation containers, content, hybrid content, resources, and/or the like. Owners may include atom types including any of: account, alias, people, etc. Conversation containers may include atom types including any of: channel, following, lurk (follow but not participate), organization, team, group, 1-to-1, topic, category, thread, hybrids, etc. Content may include atom types including any of: message, media, link, attributes, interests, terms, etc. Hybrid container content may include atom types including any of: project, goal, milestone, events, tasks, attribute, etc. An attribute may include any of: like, dislike upvote, downvote, LOL, Huh?, Wow!, Duh, Awww, Thanks, custom tags, (e.g., see non-limiting examples: 1401 of FIG. 14, 2201-2203 of FIG. 22), etc. Some examples of measured production resources may include resource atom types including any of: crypto currency (e.g., SiDough aka PSSS crypto currency, Bitcoin, Ethereum, etc.), SiSpace, storage, energy, an attribute, bandwidth, uptime, latency, greater geographic/topological interconnectivity access, lower likelihood of intervention of services, fewer outages, etc. In one example, likes and/or reputation growth and influence received by a user may be considered production such that they may earn SiDough crypto currency over time. These are examples of resources whose production the PSSS may evaluate when determining production differences between resource production evaluation periods. In one embodiment, atom messaging object types may be implemented as object-oriented classes (e.g., inheriting from a common (i.e., shared) base class that specifies common attributes, common atom actions, etc.) that may be instantiated. In an alternative embodiment, a multi-dimensional graph topology may be used to subclass instances of atom messaging object datastructures from parent nodes on the graph topology. In some embodiments, an atom action may generate a commensurate atom attribute.

A PSSS node A (e.g., a source node associated with the atom action message) 2702 may send an atom terms datastructure (ATD) request 2725 to a SuperNode 2704 to obtain atom terms for the atom. In an alternative embodiment, the ATD may be immediately stored on PSSS node A itself and then sent directly for registration to the blockchain obviating any need to interact with the SuperNode 2704. In one embodiment, SuperNodes may be a PSSS node that enjoys greater access to resources (e.g., it enjoys long contiguous uptimes, greater access to bandwidth, greater storage availability, lower latency, greater energy resources, greater interconnectivity geographically and/or topologically, lower likelihood of intervention of services, fewer outages, greater failover and fault tolerance resources, etc.). In one implementation, the atom terms datastructure request may include data such as a request identifier, an atom identifier, a user identifier, and/or the like. For example, such an ATD may be formed when a user creates a new group and specifies and establishes terms through the PSSS user interface (e.g., see FIGS. 18-19). It should be noted that while we use SuperNodes here to express details and illustrative variations of the PSSS, that the PSSS requires no SuperNodes for the platform to work, and all nodes on the platform may, instead, be peer nodes, and as such regular PSSS nodes (e.g., having access to fewer resources) and SuperNodes may be used interchangeably. In one embodiment, the PSSS node A may provide the following example ATD request, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA _</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
```

-continued

```
            <client_OS>iOS</client_OS>
            <client_OS_version>7.1.1</client_OS_version>
            <client_app_type>app with webkit</client_app_type>
            <app_installed_flag>true</app_installed_flag>
            <app_name>PSSS.app</app_name>
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial number>
            <client_UDID>3XXXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5, 1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <ATD_request>
        <atom_terms_identifier>ID_atom_terms_1</atom_terms_identifier>
            <specified_terms>
                <terms_name>My Rocket Tech Group Terms</terms_name>
                <public_visibility>PRIVATE</public_visibility>
                <allow_screen_recording>FALSE</allow_screen_recording>
                <allow_screenshots>FALSE</allow_screenshots>
                <allow_copy_others>FALSE</allow_copy_others>
                <allow_copy_my_own>TRUE</allow_copy_my_own>
                <allow_edit_own_posts>TRUE</allow_edit_own_posts>
                <allow_delete_own_posts>TRUE</allow_delete_own_posts>
                <allow_joint_creation_rights>FALSE</allow_joint_creation_rights>
                <bans_are_stealth_shadow_shells>TRUE</bans_are_stealth_shadow_shells>
                <allow_group_unions>FALSE</allow_group_unions>
                <MyGroupMyRules>TRUE</MyGroupMyRules>
                <allow_ads>TRUE</allow_ads>
                    <ads_per_hour>5</ads_per_hour>
                    <ad_revenue_shared>prorata</ad_revenue_shared>
                    <additional_ad_revenue_share_participants>Red Cross,ID12345678;Cancer
Research,ID98765432</additional_ad_revenue_share>
                <group_vote_to_eject>TRUE</group_vote_to_eject>
                    <group_vote_eject_threshold>80%</group_vote_eject_threshold>
                    <group_vote_quorum_threshold>51%</group_vote_quorum_threshold>
                    <group_vote_censure_threshold>51%</group_vote_censure_threshold>
                    <censure_period>3 days</censure_period>
                <term_NDA_required>TRUE</term_NDA_required>
                    <term_NDA_violation_amount>$200, 000</term_NDA_violation_amount>
```

```
            <term_NDA_MAD>TRUE</term_NDA_MAD>
            <standard_message_expire_time>30 days</standard_message_expire_time>
            <standard_media_expire_time>NEVER</standard_media_expire_time>
            <subscription_to_group>TRUE</subscription_to_group>
                <subscription_fee>$2 per month</subscription_fee>
                    <subscription_revenue_shared>FALSE</ad_revenue_shared>
                    <additional_subscription_revenue participants> Red Cross,ID12345678</additional_subscription_revenue participants>
            </specified_terms>
        <request_identifier>ID_request_1</request_identifier>
        <atom_identifier>ID_atom_group_1</atom_identifier>
        <user_identifier>ID_user_1</user_identifier>
    </ATD_request>
</auth_request>
```

The SuperNode 2704 may send an ATD response 2729 to the PSSS node A 2702 with the requested ATD. In one implementation, the ATD response may include data such as a response identifier, the requested ATD, and/or the like. Again, in an alternative embodiment, there is no interaction with the SuperNode and instead, the PSSS node A creates the ATD, stores it itself, and interacts with the blockchain 2710 directly; as such, the ATD response may be generated upon completion of parsing/processing the ATD request itself. In one embodiment, the SuperNode may provide the following example ATD response, substantially in the form of a HTTP(S) POST message including XML-formatted data, as provided below:

```
POST /ATD_response.php HTTP/1.1
Host: www.server.com
Content-Type: Application/XML
Content-Length: 667
<?XML version = "1.0" encoding = "UTF-8"?>
<ATD_response>
    <response_identifier>ID_response_1</response_identifier>
    <ATD>
        <atom_terms_identifier>ID_atom_terms_1</atom_terms_identifier>
        <atom_identifier>ID_atom_group_1</atom_identifier>
        <user_identifier>ID_user_1</user_identifier>
        <atom_terms_name>ID_atom_terms_1</atom_terms_name>
            <specified_terms>
                <terms_name>My Rocket Tech Group Terms</terms_name>
                <public_visibility>PRIVATE</public_visibility>
                <allow_screen_recording>FALSE</allow_screen_recording>
                <allow_screenshots>FALSE</allow_screenshots>
                <allow_copy_others>FALSE</allow_copy_others>
                <allow_copy_my_own>TRUE</allow_copy_my_own>
                <allow_edit_own_posts>TRUE</allow_edit_own_posts>
                <allow_delete_own_posts>TRUE</allow_delete_own_posts>
                <allow_joint_creation_rights>FALSE</allow_joint_creation_rights>
                <bans_are_stealth_shadow_shells>TRUE</bans_are_stealth_shadow_shells>
                <allow_group_unions>FALSE</allow_group_unions>
                <MyGroupMyRules>TRUE</MyGroupMyRules>
                <allow_ads>TRUE</allow_ads>
                    <ads_per_hour>5</ads_per_hour>
                    <ad_revenue_shared>prorata</ad_revenue_shared>
                    <additional_ad_revenue_share_participants>Red Cross,ID12345678;Cancer Research,ID98765432</additional_ad_revenue_share>
                    <group_vote_to_eject>TRUE</group_vote_to_eject>
                        <group_vote_eject_threshold>80%</group_vote_eject_threshold>
                        <group_vote_quorum_threshold>51%</group_vote_quorum_threshold>
                        <group_vote_censure_threshold>51%</group_vote_censure_threshold>
                        <censure_period>3 days</censure_period>
                    <term_NDA_required>TRUE</term_NDA_required>
                        <term_NDA_violation_amount>$200,000</term_NDA_violation_amount>
                    <term_NDA_MAD>TRUE</term_NDA_MAD>
                    <standard_message_expire_time>30 days</standard_message_expire_time>
                    <standard_media_expire_time>NEVER</standard_media_expire_time>
                    <subscription_to_group>TRUE</subscription_to_group>
                        <subscription_fee>$2 per month</subscription_fee>
                            <subscription_revenue_shared>FALSE</ad_revenue_shared>
                            <additional_subscription_revenue participants> Red Cross,ID12345678</additional_subscription_revenue participants>
            </specified_terms>
            <cryptographic_signature>user's signature</cryptographic_signature>
            <blockchain_identifier>ID_blockchain_address_1</blockchain_identifier>
            <atom_terms_identifier>ABC123_2025_12_31_12:59:59</atom_terms_identifier>
```

```
    <URL_to_terms_PDF>http://abc.def.com/>ABC123_2025_12_31_12:59:59_BlockchainID_ID_bl
ockchain_address_1_Terms.PDF</URL_to_termps_PDF>
    </ATD>
    <ATD_hash>SHA-512-hash</ATD_hash>
</ATD_response>
```

The PSSS node A 2702 may send an ATD verification data request 2733 to a blockchain 2710 to obtain verification data that allows the PSSS node A to verify validity of the ATD (e.g., a hash of the ATD cryptographically signed by the user). In one implementation, the ATD verification data request may include data such as a request identifier, a blockchain identifier, and/or the like. In one embodiment, the PSSS node A may provide the following example ATD verification data request, substantially in the form of a HTTP(S) POST message including XML-formatted data, as provided below:

```
POST /ATD_verification_data_request.php HTTP/1.1
Host: www.server.com
Content-Type: Application/XML
Content-Length: 667
<?XML version = "1.0" encoding = "UTF-8"?>
<ATD_verification_data_request>
    <request_identifier>ID_request_2</request_identifier>
    <blockchain_identifier>ID_blockchain_address_
        1</blockchain_identifier>
</ATD_verification_data_request>
```

The blockchain 2710 may send an ATD verification data response 2737 to the PSSS node A 2702 with the requested ATD verification data. In one implementation, the ATD verification data response may include data such as a response identifier, the requested ATD verification data, and/or the like. In one embodiment, the blockchain may provide the following example ATD verification data response, substantially in the form of a HTTP(S) POST message including XML-formatted data, as provided below:

```
POST /ATD_verification_data_response.php HTTP/1.1
Host: www.server.com
Content-Type: Application/XML
Content-Length: 667
```

```
<?XML version = "1.0" encoding = "UTF-8"?>
<ATD_verification_data_response>
    <response_identifier>ID_response_2</response_identifier>
    <ATD_verification_data>hash of signed
        ATD</ATD_verification_data>
</ATD_verification_data_response>
```

An atom action message shards generating (AAMSG) component 2741 may encrypt the atom action message, split the atom action message into message shards, and/or send message shards to intermediate nodes. See FIG. 29 for additional details regarding the AAMSG component.

The PSSS node A 2702 may send a message shard send request 2745 to a PSSS node C (e.g., an intermediate node facilitating delivery of a message shard to a target node) 2706. In one implementation, the message shard send request may include data such as a request identifier, message shard datastructure, and/or the like. In one embodiment, the PSSS node A may provide the following example message shard send request, substantially in the form of a HTTP(S) POST message including XML-formatted data, as provided below:

```
POST /message_shard_send_request.php HTTP/1.1
Host: www.server.com
Content-Type: Application/XML
Content-Length: 667
<?XML version = "1.0" encoding = "UTF-8"?>
<message_shard_send_request>
    <request_identifier>ID_request_3</request_identifier>
    <message_shard_datastructure>
        <message_identifier>ID_message_1</message_identifier>
        <message_shard_identifier>ID_message_shard_1</message_shard_identifier>
        <source_node_identifier>ID_node_1</source_node_identifier>
        <target_node_identifier>ID_node_50</target_node_identifier>
        <security_settings>
            <number_of_hops>3 (e.g., make 3 more hops)</number_of_hops>
            <number_of_shards>1 (e.g., # shards to split shard into)</number_of_shards>
        </security_settings>
        <last_shard_indicator>FALSE</last_shard_indicator>
        <shard_encrypted_data>encrypted shard data</shard_encrypted_data>
    </message_shard_datastructure>
</message_shard_send_request>
```

A message shard processing (MSP) component 2749 may obtain a message shard, store the message shard, and/or forward the message shard to the next node (e.g., another intermediate node, the target node). See FIG. 30 for additional details regarding the MSP component.

The PSSS node C 2706 may send a message shard send request 2753 to a PSSS node B (e.g., the target node associated with the atom action message) 2708. In one implementation, the message shard send request may include data such as a request identifier, message shard datastructure, and/or the like. In one embodiment, the PSSS node C may provide the following example message shard send request, substantially in the form of a HTTP(S) POST message including XML-formatted data, as provided below:

```
POST /message_shard_send_request.php HTTP/1.1
Host: www.server.com
Content-Type: Application/XML
Content-Length: 667
<?XML version = "1.0" encoding = "UTF-8"?>
<message_shard_send_request>
    <request_identifier>ID_request_4</request_identifier>
    <message_shard_datastructure>
        <message_identifier>ID_message_1</message_identifier>
        <message_shard_identifier>ID_message_shard_1</message_shard_identifier>
        <source_node_identifier>
            ID_node_20 (e.g., intermediate node)
        </source_node_identifier>
        <target_node_identifier>ID_node_50</target_node_identifier>
        <security_settings>
            <number_of_hops>3 (e.g., make 3 more hops)</number_of_hops>
            <number_of_shards>1 (e.g., # shards to split shard into)</number_of_shards>
        </security_settings>
        <last_shard_indicator>FALSE</last_shard_indicator>
        <shard_encrypted_data>encrypted shard data</shard_encrypted_data>
    </message_shard_datastructure>
</message_shard_send_request>
```

An atom action message processing (AAMP) component 2757 may obtain a message shard, store the message shard, reconstruct the atom action message, and/or decrypt the atom action message to facilitate an action associated with the atom action message (e.g., show the text message to a group member). See FIGS. 31A-B for additional details regarding the AAMP component.

The PSSS node B 2708 may send a message shard acknowledgement response 2761 to the PSSS node C 2706 to confirm that the message shard was processed successfully. In one implementation, the message shard acknowledgement response may include data such as a response identifier, a status, and/or the like. In one embodiment, the PSSS node B may provide the following example message shard acknowledgement response, substantially in the form of a HTTP(S) POST message including XML-formatted data, as provided below:

```
POST /message_shard_acknowledgement_response.php HTTP/1.1
Host: www.server.com
Content-Type: Application/XML
Content-Length: 667
<?XML version = "1.0" encoding = "UTF-8"?>
<message_shard_acknowledgement_response>
    <response_identifier>ID_response_4</response_identifier>
    <status>OK</status>
</message_shard_acknowledgement_response>
```

The PSSS node C 2706 may send a message shard acknowledgement response 2765 to the PSSS node A 2702 to confirm that the message shard was processed successfully. In one implementation, the message shard acknowledgement response may include data such as a response identifier, a status, and/or the like. In one embodiment, the PSSS node C may provide the following example message shard acknowledgement response, substantially in the form of a HTTP(S) POST message including XML-formatted data, as provided below:

```
POST /message_shard_acknowledgement_response.php HTTP/1.1
Host: www.server.com
Content-Type: Application/XML
Content-Length: 667
<?XML version = "1.0" encoding = "UTF-8"?>
<message_shard_acknowledgement_response>
```

-continued

```
    <response_identifier>ID_response_3</response_identifier>
    <status>OK</status>
</message_shard_acknowledgement_response>
```

FIGS. 28A-B show non-limiting, example embodiments of a logic flow illustrating an atom action processing (AAP) component for the PSSS. In FIG. 28A, an atom interaction mechanism actuation from a user may be obtained at 2801. In one embodiment, the atom interaction mechanism actuation may be obtained as a result of the user utilizing PSSS GUI to interact with an atom. An example actuation may be, the user may tap on a group to which the user wishes to send a text message. Another example actuation may be, the user may right click on a task that the user wishes to assign to another user. Another example actuation may be, the user may right click on a message that the user wishes to share or react to (e.g., Like).

The specified atom (e.g., user account, alias, thread, category, group, channel, event, project, task, topic, vote, conversation, message, and/or the like) may be determined at 2805. In one implementation, the user's actuation of the atom interaction mechanism may generate an event datastructure with an identifier of the atom associated with the atom interaction mechanism, and the event datastructure may be parsed (e.g., using PHP commands, JSON, XML, and/or the like—see Distributed PSSSs section for additional details regarding parsing) to determine the identifier of the atom.

A determination may be made at 2809 whether an atom terms datastructure (ATD) associated with the specified atom is cached by the current node. If so, the ATD may be retrieved (e.g., based on the atom terms identifier associated with the atom identifier and/or the user's identifier) from cache at 2813. In one embodiment, the ATD may specify terms by which the user agreed to abide in return for being allowed to interact with the atom (e.g., terms that the user cryptographically signed to be allowed to join a group).

If the ATD associated with the atom is not already cached, the ATD may be obtained (e.g., and later cached if valid) from another node (e.g., a SuperNode) at 2817. In one implementation, an ATD request may be sent to the SuperNode to obtain the ATD. In another implementation, an address (e.g., in a distributed file system, such as an IPFS address) associated with the ATD may be determined (e.g., retrieved from a database based on the atom identifier) and used to obtain the ATD.

A blockchain identifier (e.g., a blockchain address) associated with the ATD may be determined at 2821. In one implementation, the blockchain identifier associated with the ATD may be retrieved from a database based on the atom terms identifier. In another implementation, the blockchain identifier associated with the ATD may be a data field in the ATD, and the ATD may be parsed (e.g., using PHP commands, JSON, XML, and/or the like—see Distributed PSSSs section for additional details regarding parsing) to determine the blockchain identifier (e.g., based on the value of the blockchain_identifier field).

ATD verification data may be obtained from a blockchain using the blockchain identifier associated with the ATD at 2825. For example, the ATD verification data may be a hash of the ATD (e.g., cryptographically signed by the user). In another example, the ATD verification data may be the immutable IPFS address of the ATD. In one implementation, an ATD verification data request may be sent to the blockchain to obtain the ATD verification data.

Validity of the ATD may be verified at 2829. In one embodiment, verifying validity of the ATD prevents the use of a forged ATD. In one implementation, the cryptographic signature of the ATD may be verified (e.g., using the user's private key) and the ATD may be hashed and compared to the hash of the ATD provided in the ATD verification data to ensure that the two hashes match. In another implementation, the IPFS address retrieved from the database based on the atom identifier may be compared to the IPFS address provided in the ATD verification data to ensure that the two addresses match, and, if they do, the cryptographic signature of the ATD stored at the IPFS address may be verified (e.g., using the user's private key).

A determination may be made at 2833 whether the ATD is valid. If the ATD is invalid, an exception may be generated at 2837. For example, the exeception may be used to notify the PSSS that an error occurred. In one implementation, the exeception may cause the PSSS to cancel further processing of the atom interaction mechanism actuation and/or to generate an error notification for the user.

If the ATD is valid, common atom actions (e.g., send text message, send media message, send invite, react, etc.) allowed by the ATD for the atom may be determined at 2841. In one embodiment, a wide variety of different atom types (e.g., user account, alias, thread, category, group, channel, event, project, task, topic, vote, conversation, message, and/or the like) with different attributes may be utilized, and atom objects of different atom types may be orthogonal with regard to operation allowing any atom object to be operated on, subject to terms, by various common actions. In one implementation, the ATD may comprise a set of allowed and/or disallowed activities for the atom, and common actions corresponding to allowed and/or not disallowed activities may be determined. For example, activities may correspond to actions (e.g., 1 to 1). In another example, activities may be mapped (e.g., via a map datastructure) to actions (e.g., 1 to many).

A determination may be made at 2845 whether the atom has enhanced attributes. In one embodiment, orthogonality of atoms allows for additional enhanced attributes for some atoms, and these attributes allow additional enhanced actions to manipulate those atoms. If the atom has enhanced attributes, enhanced atom actions (e.g., submit vote, set project deadline, assign task, send cryptocurrency, schedule a synchronous event (e.g., funshare), etc.) for the atom may be determined at 2849. In one implementation, the atom object may be queried to determine available enhanced atom actions.

Enhanced atom actions for the atom that are allowed by the ATD may be determined at 2853. In one implementation, the ATD may comprise a set of allowed and/or disallowed activities for the atom, and enhanced actions corresponding to allowed and/or not disallowed activities may be determined. For example, activities may correspond to actions (e.g., 1 to 1). In another example, activities may be mapped (e.g., via a map datastructure) to actions (e.g., 1 to many).

Atom action interaction mechanisms for allowed atom actions (e.g., common atom actions and/or enhanced atom actions) may be generated at 2857. For example, if the atom is a group, and the ATD allows the user to send text messages to the group, a text input field GUI widget for inputting text messages may be generated. In another example, if the atom is a task, and the ATD allows the user to assign tasks to other users, a menu GUI widget with "assign" button and/or buttons for other allowed atom actions may be generated. In another example, if the atom is a message, and the ATD (e.g., for the message, for the parent (e.g., group) atom) allows the user to share, reply, and react to the message, a menu GUI widget with "share", "reply", and "react" (e.g., "like") buttons may be generated.

An atom action interaction mechanism actuation from the user may be obtained at 2861. In one embodiment, the atom action interaction mechanism actuation may be obtained as a result of the user utilizing one of the generated atom action interaction mechanisms for the atom to perform an allowed atom action. For example, the user may type in a text message and press the "Enter" key to send the text message to the group. In another example, the user may click on "assign" button to assign the task to another user. In another example, the user may click on "share" button to share the message with another user.

Specified atom action parameters for the performed atom action may be determined at 2865. For example, atom action parameters may include target atom(s), message text, due date, expiration time, funshare time, cryptocurrency amount, cryptocurrency transaction insurance request, and/or the like parameters associated with the performed atom action. In one implementation, the user's actuation of the atom action interaction mechanism may generate an event datastructure that may be parsed (e.g., using PHP commands, JSON, XML, and/or the like—see Distributed PSSSs section for additional details regarding parsing) to determine the specified atom action parameters.

A determination may be made at 2869 whether the specified atom action parameters are allowed by the ATD. For example, the user may be allowed to assign tasks to subordinate employees, but not to other employees. In another example, the user may be allowed to share a message posted in a group with some users (e.g., other family members who are not in the group but who should be invited to a surprise birthday party) but not with others (e.g., person for whom a surprise birthday party is being planned). If the specified atom action parameters are not allowed by the ATD, an error message may be generated for the user at 2873. For example, the error message may inform the user why the specified atom action parameters are not allowed by the ATD (e.g., "you are not allowed to share this message with that user").

If the specified atom action parameters are allowed by the ATD, an atom action message (AAM) corresponding to the atom action may be generated at 2877. In one implementation, the atom action message may be a set of parameters that specify the performed atom action and/or the specified atom action parameters for an API call. In another implementation, the atom action message may be a datastructure (e.g., XML-formatted data) similar to the following:

```
<atom_action_message>
    <message_identifier>ID_message_1</message_identifier>
    <atom_action>SEND_MESSAGE</atom_action>
    <atom_action_parameters>
        <message_text>"Hello!"</message_text>
        <message_target>ID_group_1</message_target>
        <message_source>ID_user_1</message_source>
    </atom_action_parameters>
</atom_action_message>
```

See FIG. 28B for additional examples of how the AMM may be generated.

An atom action message delivery request may be sent (e.g., to the AAMSG component) at 2881. In one implementation, the atom action message delivery request may be an API call that includes the atom action message (e.g., as one or more parameters).

In FIG. 28B, a communication time delay between users associated with the atom action message may be determined at 2802. For example, different users may be located in distant parts of the PSSS network (e.g., one user may be on Earth while another user may be on Mars) resulting in high communication delays (e.g., 1 hour) between the users. In one embodiment, the (e.g., longest) communication time delay between the user generating the AAM and any target user may be determined. In another embodiment, the (e.g., longest) communication time delay between any two users associated with the AAM may be determined. In another embodiment, the (e.g., longest) communication time delay between any user associated with the AAM and a content source (e.g., a YouTube/Netflix media server, a blockchain server) associated with the AAM may be determined. In one implementation, the communication time delay between users may be determined based on analysis of time delays of previous communications (e.g., the expected time delay associated with 95$^{th}$ percentile of (e.g., recent) messages (e.g., 95% of messages arrive within the time delay or faster)) between users (e.g., the two users, other users in the two user's network neighborhoods) and/or content sources. In another implementation, the communication time delay between users may be determined based on a distance (e.g., geographic, topological, etc.) between network neighborhoods (e.g., Earth, Mars, network subnets, etc.) of the users and/or content sources.

A determination may be made at 2806 whether the determined communication time delay exceeds a threshold. For example, the threshold (e.g., 1 minute) may be set to detect conditions under which synchronization between users (e.g., for a synchronized event, to avoid race conditions in crypto currency transactions, smart contracts, and/or the like, etc.) becomes an issue. If the determined communication time delay does not exceed the threshold, the atom action message may be generated without additional modifications at 2810.

If the determined communication time delay exceeds the threshold, a synchronization delay period for the users associated with the atom action message may be calculated at 2814. In one embodiment, the synchronization delay period (e.g., 1 hour) may be calculated to allow sufficient time for synchronization between users. In one implementation, the synchronization delay period may be calculated for a synchronized event (e.g., funshare). For example, the synchronization delay period may be calculated as the amount of time it would take for the user with the highest communication time delay to a media server to request shared content and/or to download and/or buffer streamed shared content sufficiently to participate in the synchronized event. In another implementation, the synchronization delay period may be calculated for a crypto currency transaction. For example, the synchronization delay period may be calculated as the amount of time it would take for a blockchain transaction to travel between and/or propagate through the two user's network neighborhoods.

A determination may be made at 2818 whether the AAM is for a synchronous event. If so, the calculated synchronization delay period for the synchronous event may be attached to the atom action message at 2842. In one implementation, the calculated synchronization delay period may be added as a field (e.g., containing the number of hours, minutes, seconds, and/or the like) in the atom action message (e.g., in the atom_action_parameters field).

A determination may be made at 2830 whether the AAM is for a crypto currency transaction. If so, a determination may be made at 2834 whether transaction insurance was requested by the user. If so, a crypto currency transaction insurance request may be attached to the atom action message at 2838. In one implementation, the crypto currency transaction insurance request may be added as a field (e.g., containing a Boolean value) in the atom action message (e.g., in the atom_action_parameters field). The calculated synchronization delay period for the crypto currency transaction may be attached to the atom action message at 2842. In one implementation, the calculated synchronization delay period may be added as a field (e.g., containing the number of hours, minutes, seconds, and/or the like) in the atom action message (e.g., in the atom_action_parameters field).

FIG. 29 shows non-limiting, example embodiments of a logic flow illustrating an atom action message shards generating (AAMSG) component for the PSSS. In FIG. 29, an atom action message delivery request (e.g., from the AAP component) may be obtained at 2901. For example, the atom action message delivery request may be obtained as a result of the user performing an atom action.

User security preferences for the atom action message may be determined at 2905. For example, message security preferences may include number of hops, number of shards, encryption strength, number of redundant messages, number of redundant shards per message, and/or the like settings utilized to send the atom action message. For example, the number of redundant messages may mean the same message is to be sent and housed/stored in at least, e.g., 10, different nodes/paths. So if nodes on the PSSS platform become unavailable, other nodes will still store/provide access to the message. Further, since each message is broken up in to shards, similarly, a number of redundant shards, e.g., may be specified for similar redundancy and resilience. As such, if 1 message is sent and the system and/or user specifies that 10 message redundancy, with 2 shards per message, but a 3 shard redundancy, the PSSS would create 10*2*3=60 shards for distribution. As such, if nodes become unavailable on the PSSS platform, redundant messages and/or shards may be obtained from nodes storing the redundant information. In one embodiment, the missing messages may be obtained by a node with incomplete data by sending out a request of missing message identifiers to currently active and interconnected nodes that will do self-queries to see if house such message identifiers and/or shards with that message identifier. The nodes may further relay the request system wide and/or be limited to a proximity (e.g., number of hops, a geographical area of nodes, a topological and/or logical set of nodes, nodes that are known to house users with whom the requesting user frequently corresponds and intermediate nodes thereto, a specified number of hops from those 'known to house' users, etc.). In one embodiment, senders may pay more for greater redundancy resilience of information stored on the PSSS platform. It should be noted the redundant shards may all be generated and sent from the originating node (e.g., simultaneously, in parallel, serially, with staggered delays, and/or combinations therein, etc.), or, the redundant messages and/or shards may be generated at intermediate nodes, and/or some combination of both. In one implementation, the user's default (e.g., for any atom action, for a specific type of atom actions) message security preferences may be determined (e.g., retrieved from a database). In another implementation, the user may specify message security preferences for the atom action message as part of executing the atom action, and/or the message security preferences for the atom action message may be a part of the atom action message and may be determined by parsing the atom action message (e.g., using PHP commands, JSON, XML, and/or the like—see Distributed PSSSs section for additional details regarding parsing).

A determination may be made at 2909 whether the user's security preferences for the atom action message are allowed by the ATD. For example, the ATD may specify the minimum number of hops and/or shards to utilize when sending messages to a group. If the user's security preferences for the atom action message are not allowed by the ATD, the user may be prompted for updated security preferences for the atom action message at 2913. For example, the user may be informed why the user's security preferences are not allowed by the ATD and asked to modify the security preferences.

If the user's security preferences for the atom action message are allowed by the ATD, a security settings datastructure for the atom action message may be generated at 2917. In one implementation, the security settings datastructure may be a datastructure (e.g., XML-formatted data) similar to the following:

(e.g., using PHP commands) to determine the one or more target atoms (e.g., based on the value of the message_target field).

A determination may be made at 2925 whether there remain target atoms to process. In one implementation, each of the target atoms may be processed. If there remain target atoms to process, the next target atom may be selected for processing at 2929.

A determination may be made at 2933 whether the selected target atom has constituents. If the selected target atom has constituents, atom identifiers of the constituents may be determined at 2937. In one implementation, the selected target atom may be queries to determine the atom identifiers of the constituents. For example, the atom identifiers of the constituents may be determined via a MySQL database command similar to the following:
SELECT atomConstituents
FROM Atoms
WHERE atomID=identifier of the seLected target atom;
The atom identifiers of the constituents may be added to the set of target atoms for the atom action message at 2941. Accordingly, in one implementation, atom identifiers of atoms with constituents may be replaced by atom identifiers of the constituents (e.g., iteratively).

If the selected target atom does not have constituents, a public key associated with the selected target atom may be determined at 2945. In one implementation, the public key associated with the selected target atom may be retrieved from a database based on the identifier of the selected target atom.

The atom action message may be encrypted at 2949. In one embodiment, the atom action message may be encrypted with the determined public key of the selected target atom. In another embodiment, the atom action message may be (e.g., further) encrypted with an expiring key (e.g., to prevent the atom action message from being readable after a certain period of time). In an alternative embodiment, the atom action message may be encrypted with a symmetric key pre-shared with the selected target atom using public-

```
<security_settings>
   <number_of_hops>3</number_of_hops>
   <number_of_shards>2</number_of_shards>
   <number_of_redundant_messages>10</number_of_redundant_messages>
   <number_of_redundant_shards_per_message>3</number_of_redundant_shards_per_message>
   <time_to_intermediate_node_ledger_clear>2 hours</time_to_intermediate_node_ledger_clear>
   ...
</security_settings>
```

In one embodiment, the security settings may be encrypted for the next intermediate node so no other nodes have access.

One or more target atoms for the atom action message may be determined at 2921. For example, a target atom may represent an intended recipient of the atom action message. In another example, the target atom may also include data fields identifying an atom (e.g., a message) on which the action (e.g., Like, Dislike, Upvote, copy, paste, reply, etc.) associated with the atom action message is performed. In one embodiment, a target atom (e.g., user account, alias, etc.) may correspond to a user. In another embodiment, a target atom (e.g., thread, category, group, channel, event, etc.) may correspond to a set of constituent users. In another embodiment, a target atom may correspond to a node. In one implementation, the atom action message may be parsed key cryptography. In one implementation, a cryptography library, such as OpenSSL, may be used to encrypt the atom action message.

The number of shards to utilize to send the atom action message may be determined at 2953. For example, each shard may comprise a portion of the atom action message. In one implementation, the security settings datastructure for the atom action message may be parsed (e.g., using PHP commands) to determine the number of shards to utilize (e.g., based on the value of the number_of_shards field). In another implementation, the security settings datastructure may specify a function that specifies how to calculate the number of shards to utilize for the atom action message and/or for each shard (e.g., split into 6 shards and then have intermediate nodes split every second shard into 2 more shards).

The atom action message may be fractured into the determined number of shards at 2957. In one implementation, the encrypted atom action message may be split into the determined number of shards (e.g., of equal size, of variable size). In an alternative implementation, the atom action message may be split into the determined number of shards and then each shard may be encrypted separately. The number of shards may be broken up as specified in the security settings datastructure 2917, including redundancy messages and redundancy shards (also, e.g., see 343 of FIG. 3 for examples for fracturing the asset into specified number of shards).

A determination may be made at 2961 whether there remain shards to process. In one implementation, each of the generated shards may be processed. If there remain shards to process, the next shard may be selected for processing at 2965.

A message shard datastructure with the selected encrypted shard data and delivery information may be generated at 2969. For example, the delivery information may include the identifier of the selected target atom (e.g., a node identifier (e.g., IP address) of the target node associated with the selected target atom), a specified delivery path, a message identifier, a message shard identifier, an indicator of whether the selected shard is the last of the shards that make up the atom action message, and/or the like.

Security settings specified in the security settings datastructure may be attached to the generated message shard datastructure at 2973. For example, the security settings may include the number of hops to make before delivering the message shard datastructure to the selected target atom, the number of shards to utilize (e.g., by intermediate nodes to split the message shard datastructure into more shards) when delivering the message shard datastructure, redundancy messages, redundancy shards, terms, and/or the like. The security settings may then be decremented as each intermediate node processes and furthers the shards (e.g., decrementing the number of hops, the number of redundante messages and redundant shards to be made (e.g., in one embodiment all the redundant messages may be made at the initial sending node and sent from that node, but in alternative embodiments, the redundant messages and redundant nodes may be crated at intermediate nodes in lie of and/or in addition to the initial sending node).

An intermediate node to utilize for delivering the message shard datastructure may be determined at 2977. In one implementation, the intermediate node may be predetermined by a delivery path (e.g., use the following intermediate nodes to deliver the atom action message to the selected target atom) specified by the user. In another implementation, the intermediate node may be selected by the current node (e.g., with assistance from a SuperNode and/or DNS server). For example, the intermediate node may be selected randomly. In another example, the intermediate node may be selected based on performance characteristics (e.g., based on network speed, based on latency, based on uptime) to facilitate quick and/or reliable message transmission to the selected target atom. In another embodiment, nodes that constitute users that are friends to the originating node may be used. For example, if a user has 3 groups on his account, and group one has users A, B and C, group two, has users D, E and F, and group 3 has users G, H and I, then users A-I may constitute initial seed nodes. Those nodes in turn may have additional associated 'friend' nodes. If a message is to go from the initial user to user C, an initial node A or B may be chosen in which to start the path. Alternatively, if users A and B each, respectively, also have 'friend' nodes J and K, and L and M, those nodes J, K, L and M may be chosen as initial nodes, e.g., for when 2 hops are specified (e.g., some shards hopping from node J to A and then eventually to node C).

The message shard datastructure may be sent to the intermediate node at 2981. In one implementation, the message shard datastructure may be sent to the intermediate node via a message shard send request.

An atom action message delivery confirmation may be provided (e.g., to the AAP component) at 2985. For example, the atom action message delivery confirmation may confirm that the atom action message was sent and/or delivered to the one or more target atoms. In one implementation, the atom action message delivery confirmation may be sent upon sending message shard datastructures. In another implementation, the atom action message delivery confirmation may be sent upon receiving message shard datastructure delivery confirmations for sent message shard datastructures from intermediate nodes.

FIG. 30 shows non-limiting, example embodiments of a logic flow illustrating a message shard processing (MSP) component for the PSSS. In FIG. 30, a message shard datastructure (MSD) may be obtained at 3001. For example, the message shard datastructure may be obtained as a result of receiving a message shard send request (e.g., from a source node, from an intermediate node).

A target atom for the MSD may be determined at 3005. For example, the target atom may be specified as a user universally unique identifier (UUID), a client UUID, a node UUID, and/or the like. In one implementation, the message shard datastructure may be parsed (e.g., using PHP commands, JSON, XML, and/or the like—see Distributed PSSSs section for additional details regarding parsing) to determine the target atom (e.g., based on the value of the target_node_identifier field).

A determination may be made at 3009 whether the current node corresponds to the target atom. If the current node corresponds to the target atom (e.g., the current node is the target node), then the message shard datastructure may be processed using the AAMP component at 3013, and an error status may be reported and/or an option to correct and/or restart transmission of the MSD may be utilized at 3015.

If the current node does not correspond to the target atom (e.g., the current node is an intermediate node), then the MSD may be stored in storage at 3017. In various embodiments, the MSD may be stored in storage to provide caching, backup, (e.g., distributed) storage, and/or the like functionality. In various implementations, the MSD may be stored in storage via a MySQL database command, by adding a file to IPFS, and/or the like.

A security settings datastructure for the MSD may be determined at 3021. In one implementation, the message shard datastructure may be parsed (e.g., using PHP commands, JSON, XML, and/or the like—see Distributed PSSSs section for additional details regarding parsing) to determine the security settings datastructure (e.g., based on the value of the security_settings field).

The hops count for the MSD in the security settings datastructure may be updated at 3025. In one embodiment, the number of remaining hops may be decreased by 1 to account for the hop that brought the MSD to the current node. In one implementation, the message shard datastructure (MSD) may be parsed (e.g., using PHP commands, JSON, XML, and/or the like—see Distributed PSSSs section for additional details regarding parsing) to update the hops count (e.g., based on the value of the number_of_hops field) and/or the number of redundant messages and/or number of redundant shards to be further produced and/or stored.

The source identifier for the MSD may be updated at 3029. In one embodiment, the source identifier for the MSD may be modified to be the identifier of the current node to hide the true source of the MSD to facilitate user privacy. In one implementation, the message shard datastructure (MSD) may be parsed (e.g., using PHP commands, JSON, XML, and/or the like—see Distributed PSSSs section for additional details regarding parsing) to update the source identifier (e.g., based on the value of the source_node_identifier field). When the source is removed, in one embodiment, the message is resent as if originating from the intermediate node and an entry is maintained for such resending for a specified amount of time (e.g., an intermediate node ledger cache clear time setting, e.g., 3 hours (e.g., may be seconds, minutes, hours, days, weeks, months, quarters, years, decades, etc.) such that any communications back may be resolved via ledger entry lookup.

A determination may be made at 3033 whether to split the MSD into more shards. In one implementation, the security settings datastructure may specify whether and/or into how many more shards the MSD should be split. If the MSD should not be split into more shards, the next node to utilize (e.g., intermediate node, target node) for delivering the message shard datastructure may be determined at 3037. In one implementation, the next node may be predetermined by the delivery path specified by the user. In another implementation, the intermediate node may be selected by the current node (e.g., with assistance from a SuperNode and/or DNS server). For example, the next node may be selected randomly. In another example, the next node may be selected based on performance characteristics (e.g., based on network speed, based on latency, based on uptime) to facilitate quick and/or reliable message transmission to the target atom. The MSD may be sent to the next node at 3041. In one implementation, the message shard datastructure may be sent to the next node via a message shard send request.

If the MSD should be split into more shards, the number of shards to utilize may be determined at 3045. For example, each shard may comprise a portion of the MSD. In one implementation, the security settings datastructure for the MSD may be parsed (e.g., using PHP commands, JSON, XML, and/or the like—see Distributed PSSSs section for additional details regarding parsing) to determine the number of shards to utilize (e.g., based on the value of the number_of_shards field). In another implementation, the security settings datastructure may specify a function that specifies how to calculate the number of shards to utilize for the MSD.

The MSD may be fractured into the determined number of shards at 3049. In various implementations, the encrypted shard data of the MSD may be fractured into shards of equal size, shards of variable size (e.g., randomized within a range), and/or the like. In some implementations, each shard may be encrypted further to facilitate user privacy and make tracking and/or reconstructing the atom action message computationally more difficult.

A determination may be made at 3053 whether there remain shards to process. In one implementation, each of the generated shards may be processed. If there remain shards to process, the next shard may be selected for processing at 3057.

A new message shard datastructure with the selected shard data and delivery information may be generated at 3061. In one implementation, the delivery information may include fields specified in the delivery information of the MSD (e.g., target atom identifier, source identifier, etc.). In another implementation, the delivery information may include fields specific to the new message shard datastructure (e.g., message shard identifier, last shard indicator, etc.).

Security settings may be attached to the new message shard datastructure at 3065. In one implementation, the security settings may include fields specified in the security settings datastructure of the MSD (e.g., number of hops). In another implementation, the security settings may include fields specific to the new message shard datastructure (e.g., the number of shards to utilize).

The next node to utilize for delivering the new message shard datastructure may be determined at 3069. In one implementation, the next node may be predetermined by the delivery path specified by the user. In another implementation, the intermediate node may be selected by the current node (e.g., with assistance from a SuperNode and/or DNS server). For example, the next node may be selected randomly. In another example, the next node may be selected based on performance characteristics (e.g., based on network speed, based on latency, based on uptime) to facilitate quick and/or reliable message transmission to the target atom.

The new message shard datastructure may be sent to the next node at 3073. In one implementation, the new message shard datastructure may be sent to the next node via a message shard send request.

A message shard datastructure delivery confirmation may be sent to the previous node (e.g., the node that sent the MSD) at 3077. For example, the MSD delivery confirmation may confirm that the MSD was received and/or processed by the current node. In one implementation, the MSD delivery confirmation may be sent upon receiving the MSD. In another implementation, the MSD delivery confirmation may be sent upon sending the MSD and/or new message shard datastructures. In another implementation, the MSD delivery confirmation may be sent upon receiving MSD delivery confirmation(s) for sent MSD and/or new message shard datastructures from next node(s).

FIGS. 31A-B show non-limiting, example embodiments of a logic flow illustrating an atom action message processing (AAMP) component for the PSSS. In FIG. 31A, a message shard datastructure (MSD) may be obtained at 3101. For example, the message shard datastructure may be obtained as a result of receiving a message shard send request (e.g., from a source node, from an intermediate node).

A target atom for the MSD may be determined at 3105. For example, the target atom may be specified as a user universally unique identifier (UUID), a client UUID, a node UUID, and/or the like. In one implementation, the message shard datastructure may be parsed (e.g., using PHP commands) to determine the target atom (e.g., based on the value of the target_node_identifier field).

A determination may be made at 3109 whether the current node corresponds to the target atom. If the current node does not correspond to the target atom (e.g., the current node is an intermediate node), then the message shard datastructure may be processed using the MSP component at 3113, and an error status may be reported and/or an option to correct and/or restart transmission of the MSD may be utilized at 3115.

If the current node corresponds to the target atom (e.g., the current node is the target node), then the MSD may be stored in storage at 3117. In various embodiments, the MSD may be stored in storage to provide caching, backup, (e.g., distributed) storage, and/or the like functionality. In various implementations, the MSD may be stored in storage via a MySQL database command, by adding a file to IPFS, and/or the like.

A message identifier for the MSD may be determined at 3121. For example, the message identifier may identify the atom action message. In one embodiment, the message identifier may be used to identify MSDs that make up the atom action message. In one implementation, the message shard datastructure may be parsed (e.g., using PHP commands, JSON, XML, and/or the like—see Distributed PSSSs section for additional details regarding parsing) to determine the message identifier (e.g., based on the value of the message_identifier field).

A message shard identifier for the MSD may be determined at 3125. For example, the message shard identifier may distinguish the MSD from other MSDs that make up the atom action message. In one embodiment, message shard identifiers of MSDs that make up the atom action message may be sequential (e.g., going from 1 to n), to facilitate determining when MSDs that make up the atom action message have been received. In one implementation, the message shard datastructure may be parsed (e.g., using PHP commands,JSON, XML, and/or the like—see Distributed PSSSs section for additional details regarding parsing) to determine the message shard identifier (e.g., based on the value of the message_shard_identifier field).

A determination may be made at 3129 whether other shards associated with the message identifier have been received. In one implementation, the last MSD that makes up the atom action message (e.g., with message shard identifier n) may have a set last shard indicator flag (e.g., a Boolean last_shard_indicator field set to TRUE). Accordingly, if MSDs with message shard identifiers from 1 to n have been received, then the shards associated with the message identifier have been received. In various alternative implementations, other schemes for determining when the shards associated with the message identifier have been received may be used. For example, instead of starting with 1 (or 0) message shard identifiers may start with an arbitrary number, and a first shard indicator flag may be used to identify the first MSD that makes up the atom action message. In another example, nonsequential and/or nonnumeric message shard identifiers may be used, and a count of the total number of shards that make up the atom action message may be included in at least one MSD to facilitate determining whether the shards associated with the message identifier have been received.

If some of the other MSDs have not been received yet, the PSSS may wait until other shards associated with the message identifier have been received at 3133. In some implementations, waiting may be nonblocking.

If the MSDs associated with the message identifier have been received, the encrypted atom action message (AAM) may be reconstructed at 3137. In one embodiment, the encrypted shard data carried by the MSDs associated with the message identifier may be merged to reconstruct the encrypted atom action message. In one implementation, each MSD associated with the message identifier may be parsed (e.g., using PHP commands, JSON, XML, and/or the like—see Distributed PSSSs section for additional details regarding parsing) to determine the encrypted shard data carried by that MSD (e.g., based on the value of the shard_encrypted_data field).

A determination may be made at 3141 whether AAM decryption uses an expiring key. In one implementation, security setting associated with the atom action message (e.g., included in at least one MSD) may be checked to determine whether AAM decryption uses an expiring key. If AAM decryption uses an expiring key, a source of an expiring decryption key associated with the AAM may be determined at 3145. In one embodiment, the use of an expiring key may prevent the target user from decrypting and/or viewing the atom action message outside of a specified retention period. In one implementation, the source of the expiring decryption key associated with the AAM may be the retention key management component.

Decryption data may be requested from the source of the expiring decryption key associated with the AAM at 3149. In one implementation, the decryption data may comprise the expiring decryption key associated with the AAM, which may be used to decrypt the encrypted AAM. In another implementation, the decryption data may comprise the AMM decrypted with the expiring decryption key associated with the AAM.

A determination may be made at 3153 whether the decryption data valid (e.g., whether the expiring decryption key associated with the AAM is provided by the retention key management component, whether the AMM decrypted with the expiring decryption key associated with the AAM is provided by the retention key management component). If the decryption data is invalid, an exception may be generated at 3157. For example, the exception may be used to notify the PSSS that an error occurred. In one implementation, the exception may cause the PSSS to cancel further processing of the AAM and/or to generate an error notification for the target user.

If the decryption data is valid or if AAM decryption does not use an expiring key, a private key associated with the target atom may be determined at 3161. In one implementation, the private key associated with the target atom may be retrieved from a database (e.g., a secure database, a trusted platform module (TPM), a hardware security module (HSM)) based on the identifier of the target atom.

The encrypted atom action message may be decrypted at 3165. In one embodiment, the encrypted atom action message may be decrypted with the determined private key of the target atom. In another embodiment, the encrypted atom action message may be (e.g., further) decrypted with the expiring decryption key associated with the AAM. In an alternative embodiment, the encrypted atom action message may be decrypted with a symmetric key pre-shared with the source atom using public-key cryptography. In one implementation, a cryptography library, such as OpenSSL, may be used to decrypt the encrypted atom action message.

The decrypted AAM may be provided to the current node's API for action at 3169. For example, the decrypted AAM may instruct the current node's API to display a text message to the target user. In another example, the decrypted AAM may instruct the current node's API to issue a notification that a task was assigned to the target user. See FIG. 31B for additional examples of how the decrypted AMM may be processed.

A message shard datastructure delivery confirmation may be sent to the previous node (e.g., the node that sent the MSD) at 3173. For example, the MSD delivery confirmation may confirm that the MSD was received and/or processed by the current node. In one implementation, the MSD delivery confirmation may be sent upon receiving the MSD. In another implementation, the MSD delivery confirmation may be sent upon processing the MSD.

In FIG. 31B, a communication time delay between the source user and the target user may be determined at 3102. For example, different users may be located in distant parts of the PSSS network (e.g., the source user may be on Earth while the target user may be on Mars, or the source user may be in a remote location with laggy/low-bandwidth communications while the remote user is in a well connected area (or vice-versa)) resulting in high communication delays (e.g., 1 hour) between the users. In one implementation, the communication time delay between the source user and the target user may be determined based on the time delay associated with transmitting the AAM and/or analysis of time delays of previous communications between users and/or content sources associated with the AAM. In another implementation, the communication time delay between the source user and the target user may be determined based on a distance (e.g., geographic, topological, etc.) between network neighborhoods (e.g., Earth, Mars, network subnets, etc.) of the users and/or content sources associated with the AAM.

A determination may be made at 3106 whether the determined communication time delay exceeds a threshold. For example, the threshold (e.g., 1 minute) may be set to detect conditions under which synchronization between users (e.g., for a synchronized event, to avoid race conditions in crypto currency transactions, smart contracts, and/or the like, etc.) becomes an issue. If the determined communication time delay does not exceed the threshold, the atom action message may be processed without additional modifications at 3110.

If the determined communication time delay exceeds the threshold, a synchronization delay period for the atom action message may be determined at 3114. In one embodiment, the synchronization delay period (e.g., 1 hour) may be configured to allow sufficient time for synchronization between users. In one implementation, the atom action message may be parsed (e.g., using PHP commands, JSON, XML, and/or the like—see Distributed PSSSs section for additional details regarding parsing) to determine the synchronization delay period for the AAM (e.g., based on the value of the atom_action_parameters field).

A determination may be made at 3118 whether the AAM is for a synchronous event. If so, a personalized event start time for the target user may be calculated at 3122. In various implementations, the personalized event start time for the target user may be calculated based on the start time of the synchronous event, the synchronization delay period, the communication time delay, and/or the like. For example, if the source user schedules a funshare to view a YouTube/ Netflix video at time T, and the synchronization delay period is S, the personalized event start time for the target user may be calculated as: T−S (e.g., the target user's node may start caching the video at time (T−S), and then start playing the video at time T). In another example, if the source user initiates a funshare livestream event at time T, the synchronization delay period is S, and the communication time delay is C, the personalized event start time for the target user may be calculated as: T+S−C (e.g., the target user's node may initiate streaming of the livestream event at a time that is C units of time before a user with the highest communication time delay may view the livestream event at time (T+S)). The synchronous event may be initiated (e.g., start caching, start playing) for the target user at the personalized event start time at 3126.

A determination may be made at 3130 whether the AAM is for a crypto currency transaction. If so, a determination may be made at 3134 whether transaction insurance was requested for the crypto currency transaction. In one implementation, the atom action message may be parsed (e.g., using PHP commands, JSON, XML, and/or the like—see Distributed PSSSs section for additional details regarding parsing) to determine whether transaction insurance was requested for the crypto currency transaction (e.g., based on the value of the atom_action_parameters field). If so, reputation scores of the source user and/or of the target user may be determined at 3138. For example, a reputation score may indicate trustworthiness of a user (e.g., based on the outcomes and/or quantity of the user's previous transactions, based on how long the user has been a member of the PSSS, etc.). In one embodiment, the reputation scores may determine whether the PSSS is sufficiently confident that the source user and/or the target user are not going to engage in a fraudulent transaction to act as an escrow proxy for the crypto currency transaction. In one implementation, a user's reputation score may be retrieved from a database (e.g., via a MySQL database select command) based on the user's identifier.

SELECT reputationScore
FROM Users
WHERE userID=identifier of the user;

If it is determined at 3142 that the reputation scores are adequate, the PSSS may act as an escrow for the crypto currency transaction at 3146. In one embodiment, the PSSS may act as an escrow during the synchronization delay period. In one implementation, the PSSS may provide the recipient of the crypto currency transaction with funds issued off a (e.g., local to that user) reserve account that may be clawed back by the PSSS (e.g., using a smart contract). Accordingly, the recipient may get funds without an additional delay. If it is determined at 3142 that the reputation scores are not adequate, a two-commits delayed transaction may be used for the crypto currency transaction at 3150. In one embodiment, an extra layer of terms may be added to the crypto currency transaction that specify that the transaction is not valid (e.g., puts a hold on any assets being exchanged) until two commits to a blockchain have been performed. In one implementation, after the first commit is performed, a time delay equal to at least the synchronization delay period is used to make sure there is no race condition (e.g., the sender spent the funds a second time), and then a second commit is performed to release the funds.

FIG. 32 shows non-limiting, example embodiments of a datagraph illustrating data flow(s) for the PSSS. In FIG. 32, a resource production allocating (RPA) component 3221 may generate a resource production allocation datastructure corresponding to a resource production allocation indication specified by a user (e.g., via PSSS GUI). See FIG. 33 for additional details regarding the RPA component.

A PSSS node (e.g., a producer node associated with the resource production allocation datastructure) 3202 may send a resource production allocation request 3225 to a SuperNode 3206 to register the specified resource production allocation (e.g., with the SuperNode and/or on a blockchain). In one implementation, the resource production allocation request may include data such as a request identifier, the resource production allocation datastructure, and/ or the like. In one embodiment, the PSSS node may provide the following example resource production allocation request, substantially in the form of a HTTP(S) POST message including XML-formatted data, as provided below:

POST /resource_production_allocation_request.php HTTP/1.1
Host: www.server.com
Content-Type: Application/XML
Content-Length: 667
<?XML version = "1.0" encoding = "UTF-8"?>

```
<resource_production_allocation_request>
    <request_identifier>ID_request_11</request_identifier>
    <resource_production_allocation_datastructure>
        <user_identifier>ID_user_11</user_identifier>
        <producer_node_identifier>ID_node_11</producer_node_identifier>
        <allocated_resource>
            <resource_identifier>ID_STORAGE</resource_identifier>
            <production_characteristics>100TB</production_characteristics>
        </allocated_resource>
        <allocated_resource>
            <resource_identifier>ID_UPTIME</resource_identifier>
            <production_characteristics>99%</production_characteristics>
        </allocated_resource>
        ...
        <cryptographic_signature>user's signature</cryptographic_signature>
    </resource_production_allocation_datastructure>
</resource_production_allocation_request>
```

A resource production registering (RPR) component 3229 may utilize data provided in the resource production allocation request to generate a resource production registration datastructure and/or to store the resource production registration datastructure on a blockchain. See FIG. 34 for additional details regarding the RPR component.

The SuperNode 3206 may send a resource production registration data store request 3233 to a blockchain 3210 to store the resource production registration datastructure on the blockchain. In one implementation, the resource production registration data store request may include data such as a request identifier, a blockchain identifier, the resource production registration datastructure, and/or the like. In one embodiment, the SuperNode may provide the following example resource production registration data store request, substantially in the form of a HTTP(S) POST message including XML-formatted data, as provided below:

```
POST /resource_production_registration_data_store_request.php HTTP/1.1
Host: www.server.com
Content-Type: Application/XML
Content-Length: 667
<?XML version = "1.0" encoding = "UTF-8"?>
<resource_production_registration_data_store_request>
    <request_identifier>ID_request_12</request_identifier>
    <blockchain_identifier>ID_blockchain_address_11</blockchain_identifier>
    <resource_production_registration_datastructure>
        <user_identifier>ID_user_11</user_identifier>
        <producer_node_identifier>ID_node_11</producer_node_identifier>
        <allocated_resource>smart contract portion for storage</allocated_resource>
        <allocated_resource>smart contract portion for uptime</allocated_resource>
        ...
        <cryptographic_signature>user's signature</cryptographic_signature>
    </resource_production_registration_datastructure>
</resource_production_registration_data_store_request>
```

The blockchain 3210 may send a resource production registration data store response 3237 to the SuperNode 3206 to confirm that the resource production registration datastructure was stored on the blockchain successfully. In one implementation, the resource production registration data store response may include data such as a response identifier, a status, and/or the like. In one embodiment, the blockchain may provide the following example resource production registration data store response, substantially in the form of a HTTP(S) POST message including XML-formatted data, as provided below:

```
POST /resource_production_registration_data_store_response.php HTTP/1.1
Host: www.server.com
Content-Type: Application/XML
Content-Length: 667
<?XML version = "1.0" encoding = "UTF-8"?>
<resource_production_registration_data_store_response>
    <response_identifier>ID_response_12</response_identifier>
    <status>OK</status>
</resource_production_registration_data_store_response>
```

The SuperNode 3206 may send a resource production allocation response 3241 to the PSSS node 3202 to confirm that the resource production allocation indication was registered successfully. In one implementation, the resource production allocation response may include data such as a response identifier, a status, and/or the like. In one embodiment, the SuperNode may provide the following example resource production allocation response, substantially in the form of a HTTP(S) POST message including XML-formatted data, as provided below:

```
POST /resource_production_allocation_response.php HTTP/1.1
Host: www.server.com
Content-Type: Application/XML
Content-Length: 667
<?XML version = "1.0" encoding = "UTF-8"?>
<resource_production_allocation_response>
    <response_identifier>ID_response_11</response_identifier>
    <status>OK</status>
</resource_production_allocation_response>
```

At some later time (e.g., when it is time to generate PSSS crypto currency), the SuperNode 3206 may send a resource production verification data retrieve request 3245 to the blockchain 3210 to verify that the PSSS node produced resources that were specified in the resource production registration datastructure. In one implementation, the resource production verification data retrieve request may include data such as a request identifier, a blockchain identifier, and/or the like. In one embodiment, the SuperNode may provide the following example resource production verification data retrieve request, substantially in the form of a HTTP(S) POST message including XML-formatted data, as provided below:

```
POST /resource_production_verification_data_retrieve_request.php HTTP/1.1
Host: www.server.com
Content-Type: Application/XML
Content-Length: 667
<?XML version = "1.0" encoding = "UTF-8"?>
<resource_production_verification_data_retrieve_request>
    <request_identifier>ID_request_13</request_identifier>
    <blockchain_identifier>ID_blockchain_address_11</blockchain_identifier>
</resource_production_verification_data_retrieve_request>
```

The blockchain 3210 may send a resource production verification data retrieve response 3249 to the SuperNode 3206 with the requested resource production verification data (e.g., the result of evaluating the stored smart contract to determine whether the promised resources were produced by the producer node). In one implementation, the resource production verification data retrieve response may include data such as a response identifier, the requested resource production verification data, and/or the like. In one embodiment, the blockchain may provide the following example resource production verification data retrieve response, substantially in the form of a HTTP(S) POST message including XML-formatted data, as provided below:

```
POST /resource_production_verification_data_retrieve_response.php
HTTP/1.1
Host: www.server.com
Content-Type: Application/XML
Content-Length: 667
<?XML version = "1.0" encoding = "UTF-8"?>
<resource_production_verification_data_retrieve_response>
    <response_identifier>ID_response_13</response_identifier>
    <resource_production_verification_data>TRUE</
    resource_production_verification_data>
</resource_production_verification_data_retrieve_response>
```

A crypto currency generating (CCG) component 3253 may generate PSSS crypto currency and/or provision PSSS crypto currency to producers of resources based on a measure of their resource contribution to the PSSS. See FIGS. 35A-B for additional details regarding the CCG component.

The SuperNode 3206 may send a crypto currency provision request 3257 to the blockchain 3210 to provision PSSS crypto currency to the producer node (e.g., to the user associated with the producer node) on the blockchain. In one implementation, the crypto currency provision request may include data such as a request identifier, transaction data, and/or the like. In one embodiment, the SuperNode may provide the following example crypto currency provision request, substantially in the form of a HTTP(S) POST message including XML-formatted data, as provided below:

```
POST /crypto_currency_provision_request.php HTTP/1.1
Host: www.server.com
Content-Type: Application/XML
Content-Length: 667
<?XML version = "1.0" encoding = "UTF-8"?>
<crypto_currency_provision_request>
    <request_identifier>ID_request_14</request_identifier>
    <transaction_data>
        <source_address>address controlled by SuperNode</source_address>
        <destination_address>address controlled by producer node</
        destination_address>
        <value>10 PSSS crypto coins</value>
        <authorization_data>
            data proving SuperNode authorized transaction
            (e.g., crypto signature)
        </authorization_data>
    </transaction_data>
</crypto_currency_provision_request>
```

The blockchain 3210 may send a crypto currency provision response 3261 to the SuperNode 3206 to confirm that the crypto currency provision request was processed successfully. In one implementation, the crypto currency provision response may include data such as a response identifier, a status, and/or the like. In one embodiment, the blockchain may provide the following example crypto currency provision response, substantially in the form of a HTTP(S) POST message including XML-formatted data, as provided below:

```
POST /crypto_currency_provision_response.php HTTP/1.1
Host: www.server.com
Content-Type: Application/XML
Content-Length: 667
<?XML version = "1.0" encoding = "UTF-8"?>
<crypto_currency_provision_response>
    <response_identifier>ID_response_14</response_identifier>
    <status>OK</status>
</crypto_currency_provision_response>
```

The SuperNode 3206 may send a crypto currency provision notification request 3265 to the PSSS node 3202 to inform the user regarding the provisioned PSSS crypto currency. In one implementation, the crypto currency provision notification request may include data such as a request identifier, the destination address, the value, and/or the like. In one embodiment, the SuperNode may provide the following example crypto currency provision notification request, substantially in the form of a HTTP(S) POST message including XML-formatted data, as provided below:

```
POST /crypto_currency_provision_notification_request.php HTTP/1.1
Host: www.server.com
Content-Type: Application/XML
Content-Length: 667
<?XML version = "1.0" encoding = "UTF-8"?>
<crypto_currency_provision_notification_request>
    <request_identifier>ID_request_15</request_identifier>
    <destination_address>address controlled by producer node</
    destination_address>
    <value>10 PSSS crypto coins</value>
</crypto_currency_provision_notification_request>
```

The PSSS node 3202 may send a crypto currency provision notification response 3269 to the SuperNode 3206 to confirm that the crypto currency provision notification request was received. In one implementation, the crypto currency provision notification response may include data such as a response identifier, a status, and/or the like. In one embodiment, the PSSS node may provide the following example crypto currency provision notification response, substantially in the form of a HTTP(S) POST message including XML-formatted data, as provided below:

```
POST /crypto_currency_provision_notification_response.php HTTP/1.1
Host: www.server.com
Content-Type: Application/XML
Content-Length: 667
<?XML version = "1.0" encoding = "UTF-8"?>
<crypto_currency_provision_notification_response>
    <response_identifier>ID_response_15</response_identifier>
    <status>OK</status>
</crypto_currency_provision_notification_response>
```

FIG. 33 shows non-limiting, example embodiments of a logic flow illustrating a resource production allocating (RPA) component for the PSSS. In FIG. 33, a resource production allocation indication may be obtained from a user at 3301. For example, the resource production allocation indication may be obtained as a result of the user utilizing PSSS GUI to specify resources that the user promises to produce using a node controlled by the user.

A resource production allocation datastructure may be generated at 3305. For example, the resource production allocation datastructure may specify a user identifier of the user, a node identifier of the node (producer node), and/or the like. In one implementation, the user's interaction with PSSS GUI may generate an event datastructure, which may be parsed to determine the user identifier, the node identifier, and/or the like.

Resources specified in the resource production allocation indication may be determined at 3309. For example, resource may include storage, bandwidth, processing power, energy, uptime, latency, number of processed transactions, terms, and/or the like. In one implementation, the user's interaction with PSSS GUI may generate an event datastructure, which may be parsed to determine resources (e.g., based on resource identifiers) specified by the user.

A determination may be made at 3313 whether there remain resources to process. In one implementation, each of the resources specified by the user may be processed. If there remain resources to process, the next resource may be selected (e.g., based on its resource identifier) for processing at 3317.

Production characteristics specified for the selected resource may be determined at 3321. In one embodiment, production characteristics may specify a type of resource to be produced, an amount of resource to be produced, a timeframe for resource production (e.g., in the next 30 days), and/or the like. In another embodiment, production characteristics may specify terms associated with producing a resource (e.g., the resource is going to be produced by the user along with three other members of a group with reward for producing the resource split equally (alternatively, in proportion to produced resource amounts) between the four users). In one implementation, the user's interaction with PSSS GUI may generate an event datastructure, which may be parsed to determine the production characteristics associated with the selected resource.

The resource production allocation datastructure may be updated with the resource production characteristics specified for the selected resource at 3325. In one implementation, the resource production allocation datastructure may be updated to include a resource identifier of the selected resource and the associated production characteristics of the selected resource.

A private key associated with the current node (e.g., a private key of the user) may be determined at 3329. In one implementation, the private key associated with the current node may be retrieved from a database (e.g., a secure database, a trusted platform module (TPM), a hardware security module (HSM)) based on the identifier of the current node (e.g., user identifier of the user).

The resource production allocation datastructure may be signed with the determined private key at 3333. In one embodiment, the resource production allocation datastructure may be signed to confirm authenticity (e.g., that the current node actually promised to produce the specified resources, which may be used to evaluate trustworthiness of the current node's promises). In one implementation, a hash of the resource production allocation datastructure may be cryptographically signed using the determined private key.

The resource production allocation datastructure may be sent to a SuperNode at 3337. In one implementation, the resource production allocation datastructure may be sent to the SuperNode via a resource production allocation request. In one embodiment, the resource production allocation datastructure may be sent to the SuperNode as an atom action message (e.g., via the AAMSG component).

FIG. 34 shows non-limiting, example embodiments of a logic flow illustrating a resource production registering (RPR) component for the PSSS. In FIG. 34, a resource production allocation datastructure may be obtained at 3401. For example, the resource production allocation datastructure (e.g., 3225 of FIG. 32) may be obtained (e.g., via the AAMP component) as a result of the user providing the resource production allocation indication.

A cryptographic signature associated with the resource production allocation datastructure may be determined at 3405. In one implementation, the resource production allocation datastructure may be parsed (e.g., using PHP commands, JSON, XML, and/or the like—see Distributed PSSSs section for additional details regarding parsing) to determine the cryptographic signature (e.g., based on the value of the cryptographic_signature field).

Validity of the cryptographic signature may be verified at 3409. In one embodiment, verifying validity of the cryptographic signature prevents the use of a forged resource production allocation datastructure. In one implementation, the cryptographic signature of the production allocation datastructure may be verified using the public key of the node (e.g., a public key of the user) associated with the resource production allocation datastructure. For example, a hash may be obtained by decrypting the cryptographic signature using the public key of the node and compared to a hash of the resource production allocation datastructure to ensure that the two hashes match.

A determination may be made at 3413 whether the cryptographic signature is valid. If the cryptographic signature is invalid, an exception may be generated at 3415. For example, the exception may be used to notify the PSSS that an error occurred. In one implementation, the exception may cause the PSSS to cancel further processing of the resource production allocation datastructure and/or to generate an error notification for the user.

A determination may be made at 3417 whether there remain resources to process. In one implementation, each of the resources specified in the resource production allocation datastructure may be processed. If there remain resources to process, the next resource may be selected (e.g., based on its resource identifier) for processing at 3421.

Production characteristics specified for the selected resource may be determined at 3425. In one implementation, the resource production allocation datastructure may be parsed (e.g., using PHP commands, JSON, XML, and/or the like—see Distributed PSSSs section for additional details regarding parsing) to determine the production characteristics associated with the selected resource (e.g., based on the value of the production_characteristics field).

Resource production registration data corresponding to the selected resource and the production characteristics associated with the selected resource may be generated at 3429. In one implementation, the resource production registration data may be a smart contract portion that pertains to the selected resource and the production characteristics associated with the selected resource. For example, the smart contract portion may include clauses that correspond to the type of resource, the amount of resource to be produced, the timeframe for resource production, terms associated with producing the resource, and/or the like. In another example, the smart contract portion may reference an oracle (e.g., that provides oracle data (e.g., uptime percentage for the node) that facilitates establishing whether the selected resource was produced).

A resource production registration datastructure may be generated at 3433. In one implementation, the resource production registration datastructure may be a smart contract corresponding to the resource production allocation datastructure. For example, the smart contract may specify a user identifier of the user, a node identifier of the node (producer node), the generated smart contract portions, and/or the like. In various implementations, the smart contract may be generated using a smart contract language such as Solidity, Vyper, Yul, Bitcoin Script, Miniscript, DAML, and/or the like. See FIG. 32 at 3233 for an example of a resource production registration datastructure.

The resource production registration datastructure may be sent to a blockchain at 3437. For example, the resource production registration datastructure may be stored at a newly generated blockchain address. In one implementation, the resource production registration datastructure may be stored via a resource production registration data store request.

A blockchain identifier (e.g., blockchain address) of the resource production registration datastructure may be stored at 3441. In one implementation, a completion timeframe (e.g., date and/or time after which the smart contract may be evaluated to determine whether the smart contract was fulfilled (e.g., determined based on the longest resource production timeframe associated with the smart contract)) may also be stored. For example, the blockchain identifier of the resource production registration datastructure may be stored via a MySQL database command similar to the following:

INSERT INTO productionRegistrations (nodeID, userID, blockChainID, completionTimeframe)
VALUES (ID_user_11, ID_node_11, ID_blockchain_address_11, 30 days from now);

In some implementations, the resource production registration datastructure may also be stored (e.g., via a MySQL database command, by adding a file to IPFS, and/or the like).

FIGS. 35A-B show non-limiting, example embodiments of a logic flow illustrating a crypto currency generating (CCG) component for the PSSS. In FIG. 35A, a crypto currency generation request may be obtained at 3501. For example, the crypto currency generation request may be obtained as a result of initializing a PSSS node (e.g., a SuperNode) authorized to generate PSSS crypto currency. In various embodiment, a crypto currency unit may be SiDough (i.e., PSSS crypto currency), crypto currency from proof of stake networks such as Ethereum, and other such crypto coins. In one embodiment, a crypto currency unit datastructure may store details regarding a crypto currency unit (e.g., amount, last transaction date, owner, etc.).

Total available PSSS crypto currency may be determined at 3505. In one embodiment, the total available crypto currency may include crypto currency that was generated and not garbage collected. In one implementation, the PSSS blockchain may be analyzed to determine total available crypto currency (e.g., based on blockchain addresses that have crypto currency and are not marked as garbage collected). In another implementation, information regarding total available crypto currency may be retrieved from a database (e.g., via a MySQL database command) that keeps track of blockchain addresses and associated crypto currency, e.g.:

SELECT SUM(assetValue)
FROM Assets
WHERE assetType='SiDough' AND assetGarbageCollected='false';

A determination may be made at 3509 whether it is time to dead-hand garbage collect. For example, dead-hand garbage collection may be used to facilitate replenishment of crypto currency inaccessible due to death of the owner, lost passwords, and/or the like to prevent the total available crypto currency from decreasing. In one implementation, dead-hand garbage collection may be performed periodically (e.g., once a year).

If it is time to dead-hand garbage collect, an inactivity threshold time period may be determined at 3513. For example, the inactivity threshold time period may be 1 year, 10 years, 50 years, 150 years (any period may be specified by the system, and/or alternatively by an owner of the asset), and/or the like. In one embodiment, crypto currency that has not been used for more than the inactivity threshold time period may be subject to garbage collection. In one implementation, a PSSS setting (e.g., collectively agreed upon by a majority of the PSSS nodes) may be checked to determine the inactivity threshold time period.

Crypto currency exceeding the inactivity threshold time period may be determined at 3517. In one embodiment, crypto currency exceeding the inactivity threshold time period may be considered inactive. In one implementation, each blockchain transaction involving crypto currency may be associated with a transaction date (e.g., and/or time). The transaction date may be checked against the current date to determine whether crypto currency associated with the transaction exceeded the inactivity threshold time period.

A determination may be made at 3521 whether there remain inactive crypto currency identifiers to process. In one embodiment, each crypto coin may be associated with an identifier that may be used to process the crypto coin. In another embodiment, crypto coins may be identified by the identifier of the last transaction involving the crypto coins, and the transaction identifier may be used to process the crypto coins. In one implementation, each of the crypto currency identifiers associated with inactive crypto currency may be processed. If there remain inactive crypto currency identifiers to process, the next crypto currency identifier (e.g., a blockchain address) may be selected for processing at 3525.

A determination may be made at 3529 whether a garbage collection notification has been previously sent to the holder (e.g., owner) of the inactive crypto currency associated with the selected crypto currency identifier. For example, the garbage collection notification may notify the holder that the PSSS intends to garbage collect the holder's crypto currency and/or may allow the holder to dispute the garbage collection to prevent the holder's crypto currency from being garbage collected. If a garbage collection notification has not been previously sent to the holder, a garbage collection notification may be sent to the holder at 3533.

If a garbage collection notification has been previously sent to the holder, a determination may be made at 3537 whether a dispute period (e.g., and time periods may be specified by the system and in some embodiments per the owners of the coins, e.g., 1 year, 3 years, 5 years, etc.) for filing a dispute has expired. If the dispute period has expired without receiving a dispute from the holder, the inactive crypto currency associated with the selected crypto currency identifier may be marked as garbage collected at 3541. In one embodiment, once crypto currency is marked as garbage collected, it can no longer be used by anyone. In one implementation, a (e.g., garbage collected) flag associated with the selected crypto currency identifier may be set to mark the inactive crypto currency as garbage collected, e.g., a digital hash representing the system may be used to unlock and make tracking marks on the blockchain and propagated.

If crypto currency identifiers associated with inactive crypto currency have been processed, the total amount of garbage collected crypto currency may be determined at 3545. In one implementation, the total amount of garbage collected crypto currency may be determined by summing amounts associated with each crypto currency identifier of the garbage collected crypto currency.

If it is not time to dead-hand garbage collect, or if the garbage collection was completed, a determination may be made at 3549 whether it is time to generate new crypto currency. In one implementation, new crypto currency may be generated periodically (e.g., once a quarter/year/etc., and/or as specified by the system operators). If it is time to generate new crypto currency, the amount of new crypto currency to generate may be determined at 3561. In one embodiment, the amount of new crypto currency to generate may be determined based on production difference between a current evaluation period (e.g., current week, quarter, year) and a previous evaluation period (e.g., previous week, quarter, year) and/or based on the total amount of garbage collected crypto currency that has not been replaced yet. See FIG. 35B for additional details regarding how the amount of new crypto currency to generate may be determined.

In one embodiment, a first-year production will allocate 100M SiDough crypto currency units for all production in the first year. Thereafter, increase in production unit measure will determine the subsequent year production. For example, if the following year there is an increase of overall production of 10% (e.g., 10% more messages, 10% more bandwidth, 10% more storage, 10% more likes, etc.), a 10% increase in crypto currency units will be allocated (e.g., 10M additional SiDough crypto currency units for allocation among the verified producers). In an alternative embodiment, the PSSS may diversify production via inclusion of foreign coins and currency. For example, if the 10% increase in production is valued at 10M SiDough coins, where each SiDough coin is worth $1, the PSSS may instead allocate production of 5M SiDough coins and $5M worth of other coins (e.g., from proof of stake networks such as Ethereum, and other such crypto coins). In an alternative embodiment, all production may ingest crypto coins from another network and no SiDough coins will be produced. All permutations of allocations between SiDough and other coins are contemplated.

A determination may be made at 3565 whether there remain resource production registrations to evaluate. In one implementation, each of the stored resource production registration datastructures with completion timeframe before the current date and/or time may be evaluated. For example, the resource production registration datastructures to evaluate may be determined via a MySQL database command similar to the following:

SELECT nodeID, userID, blockChainID
FROM productionRegistrations
WHERE completionTimeframe<NOW( );

If there remain resource production registration datastructures to evaluate, the next resource production registration datastructure (e.g., its blockchain address) may be selected at 3569.

Resource production verification data for the selected resource production registration datastructure may be obtained at 3573. For example, resource production verification data may be the output of a smart contract associated with the selected resource production registration datastructure. In one implementation, the smart contract stored at the blockchain address associated with the selected resource production registration datastructure may be evaluated (e.g., using oracle data from an oracle associated with the smart contract) to determine whether the node associated with the selected resource production registration datastructure produced resources promised in the selected resource production registration datastructure.

A determination may be made at 3577 whether resource production has been verified. If so, a crypto currency value of produced resources associated with the selected resource production registration datastructure may be determined at 3581. In one embodiment, the crypto currency value of produced resources may be determined as the fraction of the amount of new crypto currency to generate that corresponds to the fraction of the overall production difference assigned to the produced resources. In one implementation, the crypto currency value of produced resources may be determined as the fraction of the amount of new crypto currency to generate that corresponds to the fraction determined by dividing the produced resources (e.g., specified in the selected resource production registration datastructure, actually produced) as a fraction of total resources produced in the current evaluation period by the production difference between the current evaluation period and the previous evaluation period. For example, the crypto currency value of produced resources may be determined as follows:

$C_p$=crypto currency value of produced resources $C_n$=new crypto currency to generate $R_p$=produced resources for selected registration $P_c$=production in current evaluation period $P_p$=production in previous evaluation period $C_p/C_n=(R_p/P_c)/((P_c/P_p)-1)$ $C_p=(R_p/P_c)/((P_c/P_p)-1)*Cn$ The determined crypto currency value may be provisioned on the blockchain to the node (or user) associated with the selected resource production registration datastructure at 3585. In various embodiments, crypto currency may be provisioned by a central node, by one of the SuperNodes, by consensus, by the producer node itself, and/or the like. In one implementation, the determined crypto currency value may be provisioned via a crypto currency provision request.

A crypto currency provision notification may be sent to the node associated with the selected resource production registration datastructure at 3589. For example, the crypto currency provision notification may inform the user regarding the provisioned PSSS crypto currency. In one implementation, the crypto currency provision notification may be sent via a crypto currency provision notification request.

If there do not remain resource production registration datastructures to evaluate, and it is not yet time to dead-hand garbage collect or to generate crypto currency, the PSSS may wait at 3593.

In FIG. 35B, an evaluation period may be determined at 3502. For example, the evaluation period may be a second, minute, hour, day, week, month, quarter, year, decade, century, and/or the like. In one implementation, a PSSS setting (e.g., collectively agreed upon by a majority of the PSSS nodes) may be checked to determine the evaluation period.

Applicable resources to process may be determined at 3506. For example, applicable resources may include storage, bandwidth, processing power, energy, uptime, latency, number of processed transactions, attributes (e.g., likes), terms, and/or the like. In one embodiment, the applicable resources may include any resource that may be specified in a resource production allocation indication.

A determination may be made at 3510 whether there remain resources to process. In one implementation, each of the applicable resources may be processed. If there remain resources to process, the next resource may be selected for processing at 3514.

Total resource production of the selected resource during a previous evaluation period may be determined at 3518 and during a current evaluation period may be determined at 3522.

In various implementations, total resource production during an evaluation period may be determined based on actual resources produced during the evaluation period (e.g., for storage based on the amount of storage used by the PSSS across nodes during the evaluation period), based on promised resources for the evaluation period (e.g., specified in resource production registration datastructures), and/or the like.

A production difference for the selected resource may be determined at 3526. In one implementation, the production difference for the selected resource may be determined as a percentage change. For example, the production difference for the selected resource may be determined as follows:

$D_p$=production difference for the selected resource $P_c$=production of the selected resource in current evaluation period $P_p$=production of the selected resource in previous evaluation period $D_p=(P_c/P_p)-1$ An overall production difference for resources may be determined at 3530. In one embodiment, the overall production difference for resources may be determined as a (e.g., weighted) average of individual percentage changes.

The amount of new crypto currency to generate may be calculated at 3534. In one embodiment, the amount of new crypto currency to generate may be calculated based on the overall production difference and/or the total amount of garbage collected crypto currency that has not been replaced yet. In one implementation, the amount of new crypto currency to generate may be calculated as the fraction of the total available crypto currency corresponding to the overall production difference plus the total amount of garbage collected crypto currency that has not been replaced yet. For example, the amount of new crypto currency to generate may be calculated as follows:

$C_n$=new crypto currency to generate $C_t$=total available crypto currency $C_g$=unreplaced garbage collected crypto currency $D_p$=overall production difference

/

$C_n=(C_t*D_p)+C_g$

ADDITIONAL ALTERNATIVE EMBODIMENT EXAMPLES

Now, jumping back to FIGS. 7-26 and then concluding in FIG. 36, the following alternative example embodiments provide a number of variations expressing and furthering some of the already discussed principles for expanded color and discussion of additional abilities of the PSSS.

FIG. 7 shows non-limiting, example embodiments of a datagraph illustrating data flow(s) for the PSSS. This figure illustrates how a message (e.g., "Hello I love you") 799 may be delivered from node A (source node) 791 to node B (target node) 792 using intermediate nodes (e.g., nodes C-F). In one implementation, nodes A and B may exchange public keys 701, a symmetric key, etc. to facilitate encrypting messages sent between A and B. Keys do not necessarily have to be sent directly between A and B. In some embodiments, keys may be passed through intermediate nodes and themselves may be fractured into partial shards for distribution through multiple notes, e.g., in series, parallel, etc.

Once node A generates the message 702, the message may be broken up into shards and each shard may be encrypted (e.g., see FIGS. 1-6 for examples). Alternatively, the message may be encrypted and then broken up into shards. Each shard may be sent to a different intermediate node. For example, the shard corresponding to "Hello" may be sent to node C 703a and the shard corresponding to "I love you" may be sent to node D 703b.

Nodes C and D may relay the message shards to node B 704a, 704b. Alternatively, a shard may be split into more shards and sent to other intermediate nodes. For example, the shard corresponding to "Hello" may instead and/or in addition to (e.g., for redundancy) be further 703c split into a shard corresponding to "He" sent to node F 704f and a shard corresponding to "llo" sent to node E 704e. Nodes E and F may relay the message shards to node B. In one embodiment, a specified number of redundant messages and shards may be sent to intermediate nodes to facilitate message reconstruction when some nodes on the platform become inaccessible.

Node B 792 may reconstruct the message from the shards, decrypt the message, and display the message to a target user. Node B may confirm message receipt (e.g., through another message relayed via intermediate nodes) and node A may show a source user that the message was received.

FIGS. 8A-D show non-limiting, example embodiments of a datagraph illustrating data flow(s) for the PSSS. These figures illustrate that on first launch a source client A may send a whois DNS request 801 to a DNS server to get a network address of a SuperNode. The DNS server may reply 803 with a network address of a SuperNode, e.g., in the geographic, topological, etc. neighborhood of the source client A.

The source client A may request 805 an initial set of nodes that could be used to the PSSS network, and the SuperNode may provide 807 an initial set of intermediate clients with good performance to the source client A.

The source client A may create 811 a private/public key pair to be used by a source user along with the source user's PSSS account. The source client A may request 809 creation of a PSSS identifier for the source user and may pass the public key associated with the source user's account to the SuperNode 815. The public key may be sent to the SuperNode directly or via intermediate nodes in the same manner as other messages 813.

The SuperNode may generate 817 a new PSSS identifier for the source user, associate the public key with the new PSSS identifier, and inform 819 the source client A that the source user is authorized to use the new PSSS identifier.

The source user may specify 821 that the source user wishes to create a new channel (or another atom), with a set of specified terms, and a set of target user invitees. The source client A may send a channel and terms request 823 corresponding to the source user's specifications to the SuperNode. The SuperNode may generate 825 the new channel and a terms datastructure and inform 827 the source client A that the channel and the terms datastructure were created. The SuperNode may also send 831 a join channel and terms request with the source client A public key to a target client B of a target user. The source client A may instantiate the new channel and the terms 829.

If the target user agrees to the terms specified in the terms datastructure and wishes to join the new channel, the target client B may send 833 the target user's authorization to join to the SuperNode. The SuperNode may inform 835 the source client A that the target user agreed to join the channel, and may write the terms datastructure (e.g., cryptographically signed with the target user's private key) to the blockchain 837. The blockchain may inform 839 the SuperNode when the target user's authorization to join the new channel is recorded, and the SuperNode may send a PDF of the agreed to terms along with the blockchain identifier associated with the target user's authorization to the source client A 843 and to the target client B 841.

The source user may specify that the source user wishes to send a message for the new channel. The source client A may generate 845 the message (e.g., see FIGS. 10A-C for an example datastructure for the message, terms, accounts, etc.), encrypt the message based on any security requirements specified in the terms datastructure associated with the new channel, fracture the message into shards if requested, and send 847 the shards to the target user (e.g., and other members of the new channel) using a set of intermediate clients C. The intermediate clients C may 849 store and/or relay the shards 851 to the target client B, and the target client B may 853 reconstruct the message, decrypt the message, and display the message to the target user.

The target client B may send 855 an acknowledgment message indicating receipt of the source user's message to the source client A using a set of intermediate clients C. The intermediate clients C may relay 857 the acknowledgment message (e.g., encrypted shards that make up the acknowledgment message) to the source client A. The source client A may update its screen 859 to show the source user that the source user's message was delivered.

FIG. 9 shows non-limiting, example embodiments of a data structure for the PSSS. This figures illustrate how messages may be stored on a local PSSS node/client. In one implementation, messages may be stored for each user identifier 9002, for each year 9004, for each group identifier 9006, and for each day 9008 as illustrated by the hierarchy specified in the data structure. Each message may be stored along with a message identifier 9010, a terms identifier 9012, a user identifier 9014, a message hash 9016, and a message timestamp 9018. In one embodiment, these values may be any of: made part of the file name, may be embedded in a header in the file, as metadata, etc. Each message may be stored encrypted.

FIGS. 10A-C show non-limiting, example embodiments of a data structure for the PSSS. These figures illustrate an example of a message that may be sent (e.g., from a source node to a target node). As shown in the figures, some data fields (e.g., Account IDs, Alias IDs, Category IDs, Channel IDs, Conversation IDs, Events IDs, Following IDs, Group IDs, Media/Link IDs, Message IDs, People IDs, Project IDs, Task IDs, Thread IDs, Topic IDs) may comprise additional data structures shown in the figures. In one embodiment, these values may be specified as part of the PSSS database/records, e.g., see 3619p of FIG. 36.

FIG. 11 shows non-limiting, example embodiments of a data structure for the PSSS. This figure shows an example of how different relays 1101, 1102, 1103, 1104, 1105 (e.g., intermediate nodes) may be used to cache messages. In one implementation, the travel agency DB replication technique may be employed to facilitate caching. This figure also illustrates that a message may be sent via relays to a target node. In one implementation, a generated message 1121 may be terrified 1123, stored locally 1125, and sent to a relay. The message may be stored on the relay in a topography 1127. The relay may send the message to the target node (e.g., directly or through other relays) according to terms (e.g., specifying acceptable security settings) 1129. The relays may act as proxies to facilitate anonymity.

FIG. 12 shows non-limiting, example embodiments of a screenshot illustrating user interface(s) (e.g., alias, conversation/message editing) of the PSSS. This figure illustrates that different aliases may be used for interactions with different atoms (e.g., different groups). This figure also illustrates various conversations and messages (e.g., text messages, clips) that may be sent. This figure also illustrates how a user may select participants (e.g., of a group, of a conversation) and create a new atom (e.g., thread, topic, category, group) with the selected participants invited to join. This figure also illustrates work groups, which may include Projects, Tasks, Project Management, Getting Things Done (GTD), etc.

FIG. 13 shows non-limiting, example embodiments of a screenshot illustrating user interface(s) (e.g., clips, (a)synchronous app message attachments) of the PSSS. This figure illustrates that clips can be posts or attachments to posts. For example, clips may be audio, video, photos, stickers, documents, etc. This figure also illustrates message share, which comprises multiuser asynchronous app plugin attachments, which may include Links, Group Shopping carts, Group money bags/swear jars, Group Calendars/Events, More plugins: Kickstarter, GoFundMe, GrubHub, etc. This figure also illustrates funshare, which comprises multiuser synchronous app plugin attachments, which may include Group screenshare, Group whiteboard, Group audio/video chat, Group web surfing, Group shopping, More plugins: Group Netflix, YouTube, Gaming, etc.

FIG. 14 shows non-limiting, example embodiments of a screenshot illustrating user interface(s) (e.g., orthogonal atoms) of the PSSS. This figure illustrates orthogonality of atoms by showing that reactions (e.g., corresponding to an attribute (e.g., like, dislike upvote, downvote, LOL, Huh?, Wow!, Duh, Awww, Thanks, custom tag)) and other common atom actions (e.g., reply, mute) may apply to individual messages, to people, to media, etc. atoms.

FIG. 15 shows non-limiting, example embodiments of a screenshot illustrating user interface(s) (e.g., funshare) of the PSSS. This figure illustrates that a user may initiate a funshare and may invite other users to screenshare, video chat, game, shop, watch a movie or show, etc. together. The users may also discuss the funshare while participating in the funshare.

FIG. 16 shows non-limiting, example embodiments of a screenshot illustrating user interface(s) (e.g., inspectors) of the PSSS. This figure illustrates various inspectors that allow a user to view additional details regarding an atom. For example, the user may select an inspector, which may include terms, categories, conditions, media, members, muted, party, research, notifications, etc., and view additional details provided by that inspector.

FIG. 17 shows non-limiting, example embodiments of a screenshot illustrating user interface(s) (e.g., profile) of the PSSS. This figure illustrates profile information associated with a user. For example, the user may specify personal information (e.g., name, address, phone, email, etc.), interests, aliases, etc. Other information associated with the user's profile may include associated atoms (e.g., channels), alias timelines, mentions, etc. It shows a multi-column interest selection panel 1710 with a hierarchy of interests, where any of these interests (e.g., Sci-Fi) may be torn off 1712 from the browser and drag and dropped into the interests panel 1714 to further define interests of a user profile. In one example embodiment, when, e.g., Sci-Fi is torn off, the hierarchy of subordinate interests, e.g., Science 1713, are subsumed in the interest panel for the profile; as such, those that are interested in science and searching profiles for such, will find a match in the example portfolio as it has been automatically added as a sub-interest of the drag and dropped Sci-Fi interest.

FIG. 18 shows non-limiting, example embodiments of a screenshot illustrating user interface(s) (e.g., terms) of the PSSS. This figure illustrates how terms (e.g., custom NDA terms) may be associated with an atom. A user may select desired terms and may specify settings associated with each term (e.g., amount per NDA violation). The selected terms may be form filled into a legal agreement comprising the selected terms and also into a plain language description of the selected terms. This figure also illustrates that a user invited to join an atom (e.g., a group) may view the terms (e.g., both the legal agreement and the plan language description) and decided whether to accept the terms and join the group.

FIG. 19 shows non-limiting, example embodiments of a screenshot illustrating user interface(s) (e.g., new group) of the PSSS. This figure illustrates how a new group may be created. A user may provide basic information about the new group (e.g., name, description, type, whether to make the new group private) and set group terms. The user may select a preset or a favorite terms template, or may customize the terms for the new group. The user may invite other people to join the new group, who may view the terms (e.g., both the legal agreement and the plan language description) and decided whether to accept the terms and join the new group.

FIG. 20 shows non-limiting, example embodiments of a screenshot illustrating user interface(s) (e.g., search) of the PSSS. This figure illustrates that a user may search for content using a set of attributes (e.g., atoms), which may include word, date, user, group, channel, project, topic, thread, link, media, attachment, event, funshare, etc.

FIG. 21 shows non-limiting, example embodiments of a screenshot illustrating user interface(s) (e.g., hybrid, multi-column threads) of the PSSS. This figure illustrates that a user may post a hybrid message. For example, the hybrid message may show a message of the user, but not other people's replies to the message. A user can click on the hybrid message to view the replies (e.g., in a pop-up window). This figure also illustrates that a user may create a multicolumn thread that can be viewed separately (e.g., in a pop-up slide-over frame/window) from the main conversation.

FIG. 22 shows non-limiting, example embodiments of a screenshot illustrating user interface(s) of the PSSS. This figure illustrates alternative embodiments of various user interface elements (e.g., group editor, available conversations, current selected conversations, inspectors, alternative conversations, search, atom actions).

FIG. 23 shows non-limiting, example embodiments of a screenshot illustrating user interface(s) (e.g., inspectors, terms) of the PSSS. This figure illustrates alternative embodiments of user interface elements for specifying and viewing terms, and for various inspectors (e.g., profile, notification, muted, conditions).

FIG. 24 shows non-limiting, example embodiments of a screenshot illustrating user interface(s) of the PSSS. This figure illustrates alternative embodiments of user interface elements for selecting an atom (e.g., a person, a group, a topic) and interacting with the atom (e.g., sending messages, reacting to messages). A user can select whether to post messages anonymously, privately, publicly, etc. In one embodiment, icons on the left of the interface show: a rocket to blast everything to the public 2401, the second is self-destruct where you can have a default setting that all messages delete off the system after, for example 10 days, including all other peoples feeds 2402, and an incognito button where a post can be anonymous 2403. At the left of the interface is a representation of different individuals and/or groups or people a user may send messages to 2404. In one example embodiment, groups may include a band 2405 and/or politics group 2407. In addition, there's also a selection for all of the public 2410 and all follow for seeing all followers 2412. If a user wishes to add more people to a group, the interface shows a "+" feature atop the band group that may be engaged. Upon engaging the little plus a little, a red carpet will roll out 2420 and may show thumbnails representations of all the people that are in that group following the user's account. Another "+" symbol on the red carpet itself once engaged would allow addition of more people to the group. In another embodiment, the user interface includes a flip mode which makes posting as easy as messaging and can turn followers so they are engageable basically via a flip mode.

As such, in one embodiment the user can set up public posts where everyone follows them is viewable when the user unfolds that red carpet. After a certain number of followers, the followers will be replaced with an icon of a crowd. The bottom of the interface includes a public switch, so when a user types in a group, the user can choose for that message to go to the group, but also be completely public instead of limited to the group 2410.

FIG. 25 shows non-limiting, example embodiments of a screenshot illustrating user interface(s) of the PSSS. This figure illustrates alternative embodiments of user interface elements for selecting an atom (e.g., a person, a group, a topic) and interacting with the atom (e.g., searching, viewing additional data using various inspectors).

FIG. 26 shows non-limiting, example embodiments of a screenshot illustrating user interface(s) of the PSSS. This figure illustrates alternative embodiments of user interface elements for selecting an atom (e.g., a person, a group, a topic) and interacting with the atom (e.g., searching, reacting to messages, viewing and/or editing conversation terms).

Further PSSS Example Embodiments 1

The idea to have message groups, but when we need an expert for something, like Camera expert, we ring the bell to make a request for one. Other groups that are marked someone as a Camera expert might get a rain, and an invite to answer the question. This facilitates cross pollination between groups. Maybe other benefits like payments made to get someone to join or answer the question, or some kind of point structure for kudos.

Additional embodiments include:

A Private/Semi Public/Public switch that is a switch for any text typed . . . it enables all privacy, and prints the text in those modes in specific color/font so clear what it's being sent out as to reduce mistakes.

This is coupled with a clickwrap NDA that has a group members agreed upon penalty, say $200,000 that if anyone discloses anything or makes reference to anything in the list by others, they have to pay to the outed party. This may be structured as a license to use so it's not seen as a penalty.

When setting up a group, the users can specify the NDA amount that shows up.

On another embodiment they can vote in make comments go public, and vote to suggest it, go public, with veto power by the original poster.

Everything is encrypted.

A button asking to share a comment outside the group, where the originator of the statement may approve it to allow for the sharing. In one embodiment it feeds this to a public feed allowing for instant publishing on a topic thread where the groups underlying conversation stays private and the group can "wiki" the public posts Further to that, in a second part, anything that a user receives may get a digital signature or watermark. As such, if you move the item from your text, it will move out with a watermark. In one embodiment the watermark may be visual, e.g., for example, yellow dots that are difficult to see but by eye, but may be detected with optical sensor, e.g., like used in color laser printers to track currency forgeries. In one embodiment, the encryption key may act to create a unique alteration to each message to you. For example, a unique font, with a unique period symbol ".". As such, if the font is setup with different mappings it will result in messed up mappings if you try to paste it into Facebook and look like gibberish, but if you get a screenshot of it will have digital watermarks that are unique to the user.

For example "hello" might be ascii 12334 but the app uses a custom font that is 89665 and it renders correctly for the user. Also, the font ascii may be randomized per session. As such, to try and get around these protections, a user might have to take a photo of it to share, but the watermark will still show. So, a user would have to restore to taking a photo it and OCR it to get around the protections. However, in one embodiment, the PSSS may render the font to create special OCR errors specific to you for further finger printing, e.g., rendering common characters to map to highly unused characters, e.g., rendering periods to render and be recognized as rarely used bullet characters.

In another embodiment, a user can make a group private, or public. When it's public the terms of the NDA agreement will be different. People from outside Can read only in one embodiment, and another embodiment outsiders can try to make comments and it will appear in the comment stream only after a certain number of members approve.

Add sliders for amount of NDA, per person, per thread, per post. Add sliders for Creative Commons restrictions per person, per thread, per post. Override of overall default per person, thread, post.

Assent occurs and video clip taken, hashed, encoded, and put on blockchain as proof of assent.

Also, group actions. For example, the PSSS can allow for a contract with all members to each give $5, and then when $100 is reached, proceeds will go to a charity. Trigger can be any set of atmospherics, or vote by members. Also, multiple triggers. First trigger is when a certain amount of money is reached, which triggers a vote for where proceeds go. The PSSS allows for chain linking many triggers together, and many actions together. Actions can be donations, purchases, hiring services, triggers to other groups, etc.

In another embodiment, the PSSS allows incorporation with GitHub where GitHub publishes the filtering rules for the public to see the filtering used and they can vote to submit alterations that can be AB tested etc., allowing for transparent community policing on the platform Also, a plug in architecture that allows for group gaming. So normally posts scroll up but for group events, the window can float to the side to be pop'd out as a window where people can participate together.

In one embodiment, the PSSS user interface allows everyone that ever asked to follow a user to be shown in the users My Followers section, and the user could make posts to them public or private. For example, a celebrity like Brad Pitt having 1M followers may send private message to all followers because they are all in a group having executed a click-wrap NDA. He could have secret messages to all his followers but those messages would expire unseen by the rest of the non-participating public. In one embodiment, the PSSS provides a declined invitee, they no longer followed group.

The UI makes it easy to make group mishmashes off to the left column. Just drag and drop. The PSSS even allows one to search for groups on matching criteria and round them up to the left. Even employing smart rules.

In one embodiment, a user Max accepted the clickwrap. Everyone gets a copy of the clickwrap NDA Max supplied. The PSSS may require a mini video camera that the person says "I accept group X terms" with an overlay of the basic terms that gets saved, or alternatively just a screen shot.

Camera capture and your thumbnail photo of person accepting the NDA.

Thumb up/down, but also make this message a new thread topic, delete it, edit it etc.

Even if groups are private the PSSS may force a new NDA on the combo of those two group convos, or alternatively it makes a new temp one.

In one embodiment, the cart has an inspector. You can set it up as a GoFundMe. In another embodiment, it may act as a pot of money. Once the pot is filled by participants in a selected conversation it may trigger a threshold action to execute. The trigger might be GoFundPerson X with pizza money and they get cash upon threshold. Or it might trigger Amazon purchase of wedding registered glasses from Amazon that once funded and will ship to person Y. Everyone in the thread gives X amount to the cart. Once it's reached, trigger action executes. So, the GoFundMe would also offer an "anonymous" donation where all traces of the cash are deleted as via U.S. patent application Ser. No. 15/296,019 entitled "Delegated Expiring Encryption Wrapped Datastructures Apparatuses, Methods and Systems" filed 17-OCT-2016, hereby expressly incorporating the contents herein.

In one embodiment, the popup menu/HUD menus are different if you click on a person's icon versus their statement versus other parts of the chat window. One for the message. One for the person. And one for the content. So, you can like the person, the link/photo/media the person posted, or the statement made by the person. Or instead of like, dislike and many other options.

The research tab . . . in addition to search, one may research other people's profiles or trends or some combinations.

The interface allows user to create multiple aliases. A user might want followers for MyTechGalPersonality and MyMakeUpChannelCharacter.

In one embodiment, all those checkboxes in terms inspector allow for creation, for the originator of the group, and modification if you keep overlord mode, members would see different view. Voting inspector allow participants to vote.

In one embodiment, the PSSS allows for trial periods to let users join a group. Trial period makes sense, if the person doesn't get X likes or approvals in Y weeks they are auto ejected.

In one embodiment, the bubble for LOL means being another thread into this conversation, cross link like.

In one embodiment, the WWW icon, let me surf a web page and everyone can watch live so we could share a webcast simultaneously. Or a YouTube movie media simultaneously enjoying a show via the media icon. These shared media experiences may be encrypted per user settings for a secure shared experience.

In one embodiment, the PSSS has conversations in 3 types. Followers. Invitees. Open room. Where anyone can jump in and out. Like a topic forum chat room. Good for advice events like let's watch Oscars together or let's watch Apple keynote. Also, pull your private group into an open room like that for the time of an event. Virtual Townhall meetings where anyone can come in and listen.

Vacation feature. Putting people you follow or are followers on "vacation". Maybe you normally like them in a group but hate their politics. So, it could be a full vacation for 3 months (when you hope you're past the political event is over) but it could be a partial vacation where you add topic categories like "politics" so political postings will be filtered out, e.g., keywords like Trump or Biden could be used to filter/muffle posts. In another embodiment, the bubbles will be there but covered with scratch off filter. . . . In another embodiment, the duration for vacation is set to infinity/permanent, where you're basically booting the person without them knowing.

Trends and statistics, for example in the trends inspector, may include a speedometer and odometer. So, you can see how active the thread has been over time. 20 ft of texts per minute, and overall 500 ft of new texts since your last view. How many miles of texts since origination. You missed 13.7 ft of conversation since your last view 3.5 hrs ago, 90% of which occurred from 8:30-9:30. 13.7 ft between 4 participants, 2 of which (a and b) pushing 85% of the comments.

The user interface for trends/statistic may include highlighting of the thread. . . . For example, it's represented as a colored ball of yarn waiting for you in the conversation . . . . Different colors. Tap one ball and it zooms you up to that part of the conversation.

In another embodiment, keyword terms that allow ad placement in your invitation conversations. You group set the frequency. Proceeds of thread go to group pot.

Floating window showing droid could be moveable and expandable anywhere and let group games exist as plugins. Examples include video conferencing, audio conferencing, shopping, GrubHub web surfing, joint web surfing, gaming. Each of those icons are a "lens".

So, one can select the movie lens and it will move above the conversation as an overlay. A lens. Then the screen share lens over that where users can all scribble. So, the screen share overlay lens basically lets us group teleprompter where everyone in group can participate over the movie lens or the game lens etc.

Further PSSS Example Embodiments 2

Additional example embodiments include:

Highlighter. You highlight some texts with a highlight marker, and you can tag that. Tag it with a category or topic or keyword, etc. In addition, you then you can have a "compile category" feature where it will make a wiki or thread of just what people highlighted on a topic . . . people can then thumb up the highlighted thread. Really high level threads that have been upvoted a lot could be auto published outside the group. Also, other groups that made similar categories with different people can be allowed to merged in to grow a community around the topic.

Add Kickstarter for groups. By clicking the e.g., Kickstarter icon you could place an icon where others could contribute towards funding an idea or present or gift for others. This could be within any group, or thread, category, topic, etc.

Atomic level items. The system has several discrete atomic level items. They include: channels, conversations, followings, follow-lurk, groups, 1-1 conversations, people, accounts, aliases, messages, media/links, projects, topics, task, milestone, goal, categories, threads, events, hybrids of all other atoms, and/or the like. Actions can apply separately to any of those atoms individually. For example, a popup menu may be engaged to like a person over an icon of the person, but not like the comment they made. Or, the comment may be liked. Or just the media and/or shared link. This way you get finer granularity of people's reactions to these disparate atomic level things in the communications system. In one embodiment, the popup menu UI element may show this regular focus selector of atoms, e.g., keywords, posts, media, people, threads, topics, categories inside a menu bar and a user may click/tap to circle the atom type and then type in further keyword filters next to it.

Mute atomics. Add mute to atomic things like keywords, posts, media, people, threads, topics, categories. With the popup menu you could highlight a media item and mute anything from that media outlet from a single person, or the group or thread. You could type a keyword like politics when muting media so no media links about politics would show up, but political messages from group participants would still be seen. You could mute messages from a single person with a keyword of politics, and that way all messages that don't contain the word politics from that person would be seen, except those with the mute phrase. In one embodiment, muted messages may not be shown. In another embodiment, muted messages may show up as an emoji with tape over its mouth. In another embodiment, muted messages may show up as scratch to reveal messages. Etc.

Vote to release to NDA. Add vote to release from NDA feature where anyone can vote to real sense any of the atomic level items. For example, participants of a thread may wish to share the thread with others, they could take a vote to release it from NDA terms.

Add in NDA. In one embodiment, by default that NDA is on messages from people but that atomic items of media may be shared, e.g., so people can pass the public shared links (e.g., an article from a public website) from one group or forum to another. A poster sharing a piece of media may override that default and declare the media private contrary to the default with a setting, for instance if they are sharing a private baby picture they don't want to go beyond the group. As a default all media links know to be obtained from public sources could be public by default as already noted Add money collection basket. In one embodiment, a user may click a cash collection basket where that basket identifies a target beneficiary for the collected proceeds. In one embodiment, this may take the form of a swear jar, or for NDA violations. For groups choosing lower NDA violations or perhaps topic swearing violations people can pay for infractions. Then group terms or the creator of the collection basked would dictate where proceeds go say once a year or at a specified time or trigger event. Also, they can be voted on to dedicated to a charity. In another embodiment, a collection basket could be placed next to a group share video/movie so everyone can share in the expense of watching the movie together.

Additional features include:

True privacy and free speech and impartiality and security (fully end-to-end encrypted)

NDA held thread/groups/topics/media. This includes a new concept of a private giant public group. Millions of people held together by a singular giant NDA that may also be altered by group votes.

Distributed data so no control can be wrestled by any company/govt. In one embodiment this includes a central cache that employs document retention policies as noted by reference patent applications supra, and all data is held locally on client machines. Since communication is end-to-end encrypted, any data held at the central caching repository, it cannot be read or inspected in any way.

Open Source. In one embodiment, a release via open source occurs every 1-2 years. Interworking with latest API even if 3rd parties make inter-compatible competitors may require compatibility compliance with the latest running model.

Cooperative interactive group media. Surf together, watch videos together, shop together, buy together, gift together, raise money together, etc.

Extensible plug-in architecture (e.g., for stickers, games, financial systems, apps, etc.) makes a huge sticky ecosystem.

Further PSSS Example Embodiments 3

Additional example embodiments include:

Complete unmolested free speech & privacy. It's a live-your-entire-life-in-an-app app. Makes WhatsApp in China seem small time.

For viral adoption:
Consumer side free
Corporate side pays (like Slack model)
API interconnect
Hosting for 3rd parties/corporations of data
Wiki side creates YouTube like hosting abilities for video and vertical forum types of targeted audiences (e.g., interstitial and contextual advertising)
Voting polling for pay Advertising
Advertising

Further PSSS Example Embodiments 4

Additional example embodiments include:

True free speech: (1) fidelity/impartiality of speech (2) privacy, and (3) security
Distributed data so no control can be wrestled by any company/govt
Open Source
  likely model is to release open source 1-2 years later to keep advantage for company. Interworking with latest API even if 3rd parties make inter-compatible competitors just makes the company richer
Anti-Cancel-Culture Privacy with Terms Attachment & UI
  NDA held to any atom type, e.g.: categories/groups/media/threads/topics/etc.
    New concept of a private giant public group
  Mutually Assured Destruction (MAD) feature to help ensure privacy
End-to-end encryption In one embodiment, the MAD feature may be used as a deterrence to voiding confidentiality of others with whom you are having a private conversation. If someone is determined to have violated the terms of an agreed to NDA where the MAD feature was enabled, then the user that violated the terms of the NDA (e.g., found to violate the terms by a court, found by a smart contract via Blockchain, found by vote of group/thread/topic/etc. members, etc.) can suffer reciprocal disclosure of their up-until-then private messages. In one embodiment, the violators posts may then be released to the public. The release may occur via the PSSS wiki publication feature, e.g., into a wiki topic on NDA violators that is free to the world to see. The release of the violator's private posts may be specified in the terms and limited to an of the atom types (e.g., to a thread, topic, category, group, all posts for an account, all posts across all accounts, etc.). In one embodiment, although the encryption keys for the violator's messages are in the possession of the violator, the messages are shared with other message recipients/targets that have decryption keys and those clients may serve as the source of the violator's heretofore private message data.

Cooperative interactive group media
  Surf together, watch videos together, shop together, buy together, gift together, raise money together, etc.
  Plug-in architecture/UI, e.g., apps, games, financial systems, stickers, etc.; a huge sticky ecosystem.

In another embodiment, a search engine to search the websites where the search algorithm is opensource and where algorithm can be augmented by each individual user with a local instance of the search algorithm.

In another embodiment, the user gets to create their own custom tag variants of the "like" and "dislike" buttons with their own values like "duh", "I hate that person", "I love that person", emoji characters, and even custom images/gifs, etc.

In another embodiment, the PSSS is both a client and server application capable of performing all actions and activities. It can establish a specified (e.g., 10 GB) data store cache where encrypted messages for itself (as among the user's and user's communication target messages) are stored (e.g., stored as encrypted messages data), and for others not at all related to the users. In this way, the PSSS app may send encrypted versions of its data to be replicated to other PSSS app nodes for storage. Since those other PSSS app nodes will not have decryption keys for any of the message data they store, those communications will remain opaque and private, but yet, those messages may serve as a cache for other that participate with regard to the stored messages. This can help different nodes act as a caching backing store. In yet another embodiment, since the PSSS app nodes may enjoy long uptime runs, they may become SuperNodes to cache such data for participants nearer to them on the network, facilitating faster relays and caching. In yet another embodiment, larger servers, e.g., Akami servers, may be used as large caches of such data. In yet another embodiment, replication of messages from one node to another may employ intelligent replication of messages nearer where they may be used to speed up messaging, but also strategically back up messages in diverse nodes to enhance fidelity of failure recovery.

Further PSSS Example Embodiments 5

Additional example embodiments include:

In one embodiment, the PSSS may be deployed as an app that is both a client and server. It may create a cache on each machine with encrypted messages of local and nearby nodes and can act as a relay/proxy. It may communicate via encrypted protocol (e.g., HTTPS) over Port 80. In one embodiment, larger servers (e.g., Akami) may act as SuperNodes caching for large numbers of users, but SuperNodes can be made by regular users of the PSSS client/server app that may be selected based on proximity, high uptime, high throughput, etc.

In one embodiment, there are at least 5 types of group mashup types:
1 on 1, where an individual may speak to another individual.
Group chat with friends, where a group of individuals may all participate in a conversation and all see their messages in full.
Following: is type where 1 (or a few) 'stars/moderators' to many. In such following, a post by the 'star' makes an automatic thread so followers only see the stars post and have to expand the chevron to see other followers. Followings may be fed into a "World" thread where a user sees all the posts from all those they follow, but responses to such posts are accessed via chevron (and the user interface may slide in or show an additional column view, e.g., view multi-column browser view). In one embodiment, this may swarm/pull posts from nearby nodes and rely on the distributed storage of the PSSS.
Feed group: This is a special 'mashup' version of the Following in that rather than feeding all your followers into a single world view, you can make custom feeds of only a selected number of those that you follow. For example, although in your World following group you may be following 100 people, you may create a Feed group where you only follow 10 people, e.g., only those that are tech oriented, and another feed group for those that are politics oriented. In one embodiment, you can create separate feed groups by topics where feeds based on categories/topics from all those you follow are funneled into the feed by such a selected category/topic/thread/etc. (e.g., technology, politics, cooking, etc.). 0326.5. Hybrid following group: This is a combination of the Group chat type and Following type. In such a group, you may have a "star" (for example, your boss) and their posts create threads (with sub-thread chevrons where you can see deeper dives in each), but all members see each other's posts at the top level as well, or delve down into the 'automatic' sub-threads created by the star. In one embodiment, twitter users, RSS feeds, and other external datasources may be added to a group as if they were a group member making postings, and each post would create a new subthread, so other users of the group could click on the chevron leading to the subthread and see all the, e.g., twitter post responses and partake. The chevron could pull in a new column of multicolumn browser to overlay the existing group and show context that the user is in another thread. In one embodiment, the sources may also be articles automatically pulled into the group based on the common interest of group members.

In one embodiment, a subscription fee may be charged as part of the terms for membership in any of the group types.

In one embodiment, the interactive group media content that is synchronized and shared in a group, e.g., the group watching a YouTube video, a Netflix stream, an Apple keynote, a political debate, may be synchronized where the individual PSSS client/server apps instantiate play of the media independently (e.g., each user has their own Netflix account, and a URL to the media is employed to target the same media item for play at the same time; it may be pre-cached to keep variance of play time to a minimum among users). In another embodiment, group accounts/media access may be purchased.

Further PSSS Example Embodiments 6

Additional example embodiments include:

In one embodiment, PSSS may allow a user to establish terms that would allow advertiser and/or other $3^{rd}$ parties to provide ads, polls, donations, investments, etc. into any atom type, e.g., a group, thread, topic, category, etc. The terms may specify that the, e.g., group would receive a portion of the, e.g., ad, revenue from the participating $3^{rd}$ party service injection, and where such proceeds go (e.g., splitting up between group members equally, into a swear jar, a group cash basket, direct to a charity, GoFundMe, Kickstarter, etc.) The user specifying the terms may specify how many ads per quantum of time (e.g., per hour) may be provided.

In another embodiment, terms may attach per instances of any atom, e.g., message, thread, topic, via a terms identifier (e.g., termsID) that directs to a terms data structure record. In one embodiment, the terms data structure has a unique termsID and it may be instantiated on the blockchain with an identifier pointing to the distributed data store. In one embodiment, the distributed data store may employ InterPlanetary File System (IPFS).

In another embodiment, users attached a contact card to their account, e.g., a Vcard. They can choose to share that Vcard with all other users, users in just some groups/threads/atom types. In one embodiment, the sharing of the Vcard may occur in a publish and subscribe mechanism, where any changes by the user to their Vcard (e.g., adding a new photo, updating a new address, etc.) will automatically update to all others authorized to share that Vcard.

In one embodiment, the PSSS employs an autoTagger. The PSSS may create a continuously updated index of every word that comes across every group. In addition, an autoTagger may make associations of conversations in the groups. For example, in one embodiment, the autoTagger will notice no activity in a group for a threshold amount of time (e.g., an hour) when suddenly a member posts a link to an article and then quickly within 5 minutes there are 30 responses, and then again the group is quiet for an hour. The autoTagger may then use the link and/or the top most frequently used keywords by participants during the flurry conversation as a way to tag that conversation with a topic. Other algorithms may also be employed. In one embodiment, the autoTagger is an API that allows different algorithms to discern topics, categories, projects, subtopics, etc. and tag the stream of conversations. Such tagging will allow for greater searching results: e.g., searches for all "politics arguments" or "McKenzie work project" discussions. In one embodiment, these project, category, topics, etc. tags are created as a meta data layer above the all words index and instantiated as a graph topology where weights are changed over time depending on frequency of words relating to those atoms occurring. An autoTagger creating such a metadata layer can then be used by any part of the PSSS engaging the search mechanism. In one embodiment, it can be connected to the swear jar for a "jinx" system, where if one user nearly simultaneously repeats the same thing as a prior user, the next user calling jinx can impose a $1 coke owed contribution by the jinx loser to be given to the swear jar. In another embodiment, the meta data layer may be used to enhance search results for a user seeking to reply to a topic with an emoji/gif/sticker in the stream of an autoTagged topic. The autoTagger, as such, can provide a plugin architecture allowing the gameification of conversation streams.

In one embodiment, the PSSS employs a front-end user interface client app, where the app is both a client-and-server. In addition, instead of a web back end, the front end app communicates with a swarming encrypted distributing file system (e.g., in one embodiment, this may employ the Freenet<https://freenetproject.org>, IPFS<ipfs.io>, etc. distributed a file systems (e.g., so instead of having a web/server be the backing store for chat data, it could be encrypted (so even if your data is on someone else's computer, they can't see/read it) and distributed from the front end app), and also use a swarm serving component to fracture/connect and swarm files from multiple nodes to multiple nodes (e.g., Akamai, Bittorrent, etc.) to any nodes needing that data.

In one embodiment, the PSSS may include a "funshare" feature, e.g., an icon (e.g., party streamers) an any media item; when engaging the funshare feature, others in a group/conversation will be asked if they wish to participate in observing the shared media item. The media item may be any of, static audio file (e.g., a song), static video file (e.g., a stored video file), static photo file, URL link (e.g., streaming audio, video, web site navigation, etc.), screen share, video conference, multiuser whiteboard, etc. Others that get prompted and agree to participate will then get to see the same media synchronized to the same time. So, if a music video is shared, or a Youtube/Netflix video stream is shared, all those participating in the funshare will be synchronized to view the same time stamp as the all other participants. In some embodiments any of the users may pause/play and all participants will sync to such interaction. In other embodiments such as screen share, users will see the originating users screen, and even be able to take control that user's screen with permission. As such, a group could engage in funshare to watch a SpaceX launch and simultaneously and synchronously experience the event. In one embodiment, the PSSS may create a new thread/topic named after the funshare event (e.g., SpaceX launch 2021-03-02), and all comments made while the funshare is engaged by users will automatically be tagged by that thread/topic name. In one embodiment, the autoTagger may be employed to tag funshare events. In one embodiment, users may engage the PSSS' calendar feature to schedule a funshare event at some future time; users that join the calendar will have their PSSS client automatically launch the event (e.g., users wishing to watch a SpaceX launch live together could schedule the calendar event with the video stream URL for auto joining the event).

In one embodiment, on startup, the PSSS may use a SuperNodeDNS lookup to find other nodes. Initially, a set of DNS names may be purchased, e.g., SuperNode1.com, SuperNode2.com, SuperNode3.com, etc. In parallel, numerous PSSS clients may be running and have various uptimes. The various PSSS clients may all maintain uptime, throughput and latency statistics and vote on each other's quality. In the above example, the PSSS clients that are voted the top 3 in quality would then be assigned IP addresses that the SuperNode DNS addresses; e.g., SuperNode1.com would be set for an IP address resolution to the top best quality PSSS client, SuperNode2.com would be set for an IP address resolution for the $2^{nd}$ best quality PSSS client, etc. In such a scenario, when a new PSSS client runs for the first time, it can then do a whois inquiry and search via a DNS server for domains having a SuperNode name, and then use the results of the query to try and establish communications with PSSS clients at those entries for communication; upon being redirected to one or more of the high availability PSSS voted clients, it can further get a larger set of available PSSS clients, thereby breaking any catch 22 ability to find other nodes. DNS IP reassignment credentials (e.g., user, password, domain name reassignment URL, etc.) may be passed to the top serving PSSS clients that were voted for reliability once they become voted in to operate as a NewSuperNode. Those credentials may remain in encrypted form so even the PSSS client operator may not see them, but may be used to change IP forwarding for other new SuperNodes by the NewSuperNode; e.g., if some other OldSlowSuperNode is voted out to no longer be a SuperNode, one of the other SuperNodes may use the encrypted credentials to deregister the now slower OldSlowSuperNode, demoting its status so it is no longer a SuperNode and registering a newly voted PSSS client into being an EvenNewerSuperNode. Also, in one embodiment, SuperNodes and/or other high availability PSSS clients may be given rewards (e.g., points, dollars) for high uptime, low latency responses, high bandwidth usage, high energy usage, green-energy backing usage for the high energy usage, high amounts of storage/backup, high amount of relay transaction, high number of node lookup transactions, high number of node identity resolutions, and/or other high amounts of PSSS client/server work. In one embodiment, the PSSS may include a crypto currency, PSSS crypto, that is generated and backs the amount of PSSS client/server work and issued for transaction and offered as a reward.

In another embodiment, the PSSS includes dating and/or friendship features. In one embodiment, a user may select and note any number of hobbies and/or interests via a multi column interest browser. The user may choose some features to be publicly viewable, and others not. In one embodiment, even if the selections are not publicly viewable, they may be used to match against the interest of others in various groups and highlight such users to one another. In one embodiment, the highlight may change the color or ad a color halo around the image of a person and hovering over their icon may bring up an information bubble noting a compatibility rating. but if you're in a group or in a following group with some others. It could show compatibility ratings of those others highlighted people with similar interests. For example, if person A was too embarrassed to allow their hobby/interest in basket weaving be displayed for others publicly, but person B was in a group with person A and also checked an interest in basket weaving (either public or private), the PSSS could still highlight the common interest between person A and B, if the person allowed the PSSS to use private/non-publicly viewable interests to be used to find others with common interests.

In another embodiment, your interests may include topics. The topics can cause a search for articles that are popular on that topic and you can 'subscribe' to those topics so the topic acts to bring in a news feed. The articles may be posted akin to a hybrid group where the posts are shared in a group for members of the group to discuss, or you may engage a chevron and descend into the topic article post where many others are publicly posting into that topic thread. In another embodiment, such feed articles from those topics are fed into some groups automatically for people to see if you 'approve them' for sharing when they show up in that group feed; and if there is no approval, the subscriber is the only one to see those articles.

In another embodiment, when you engage with another person that has been highlighted as compatible in sharing some common interests, when you are typing to them, the PSSS may provide overlays of "topics suggestions" to help progress conversations along, i.e., a Cyrano feature. In a video conference, a chyron may be overlayed on the interest compatible person and scroll various interests and factoids about that person from their profile specified interests. For example, during a multiparty video conference, each participant might have interests, hobbies, birthdays, names of spouses and children, etc. scrolling across a chyron at the bottom of each of their video streams. In one embodiment, clicking/tapping on items in the chyron will bring up an inspector showing more details for that person, e.g., their profile information.

In one embodiment, user interface includes the ability to share file clips (e.g., audio, documents, photos, video, etc.), asynchronous plugin app attachments (e.g., web links, shopping baskets, money bags, kickstarter projects, swear jars, calendar events, grubhub ordering, gofundme projects, and/or other elements that do not need to occur simultaneously as amongst those in conversation/group, etc.), synchronous plugin app attachments (e.g., screen share, group whiteboard, group video chat, group audio chat, streaming video (e.g., Netflix; aka "funshare"), group web surfing, group/multiplayer video games, group shopping, and/or other events that are synchronized such that group participants experience such events simultaneously, etc.). Also, the interface may include an app store where additional plugin applications may be added/removed/purchased/etc. Such plugins allow the PSSS to bridge into other social networks and data sources for interactions therebetween.

In one embodiment, one of the plugins may include a Twitter plug in that allows users to sign into a twitter account and then add twitter accounts into hybrid group accounts where the posts are automatically seen by those in the group, and they may click on the twitter post and a multicolumn browser will overlay the current group allowing integration directly into the twitter feed. Such an overlay may also work with PSSS following groups instead. In another embodiment, a similar plugin may bring in other accounts like Facebook/Mastodon/etc. In yet another embodiment, the accounts brought in may be those of a publication, e.g., the Wall Street Journal, as such, articles/media from a publication/media outlet may automatically flow within a hybrid conversation as if the outlet was a participant in the group. In one embodiment, likes/dislikes/etc. tags lodged in the PSSS application may be passed through to the original outlets. In another embodiment, RSS and/or other media outlet feeds may be added to a group as if it is a participant in the group, such that each post (e.g., newspaper article post, web site post, blog post, Twitter post, etc.) looks as though it's being posted in a group by the owner of such an outlet/account; e.g., if Joe Biden or Donald Trump's twitter account is added, the posts will appear in the group as if they were members of a group, yet responses in the group to such posts would not be seen or posted back to the actual account/feed; users could engage a chevron for an overlay to enter those outlets and respond in those-such a structure creates hybrid groups of private users with public data outlets feeding into it. In an alternative embodiment, posts in the group may flow back into those outlets accounts as well. In one embodiment, a fee for such an outflow likes/tags/etc. may occur via paid subscription.

In one embodiment, a universal translator plugin may translate disparate languages used by different members of the group to appear in the preferred language of the user. Next to the speech bubble, a user may see a 'translated' icon, upon engaging, they may see the original untranslated text.

As such, all members of a group conversation may speak different languages, but each will see the conversation translated to their preferred language. In another embodiment, all other posts/information related to the group would also be translated: e.g., the terms, posts from hybrid accounts, media links/articles, etc. In one embodiment, any incoming text messages/data may be used as an input to a text language translation service, with the results being reformatted as inline messages.

In one embodiment, you can follow a user without having to see their messages. This is an 'egoboost follow' where upon following the user to make the user feel better, that user is shadow muted such that the user being followed's messages do not appear in following user's wall/feed/page/timeline/world view. In another embodiment, the accounts a user follows may be made public or private. If private, when others look at the user/alias' profile page, they will only accounts being followed that are deemed shareable, while those ticked with private checkmarks will not be displayed.

In one embodiment, the PSSS includes a data authentication component. The component evaluates what messages and information are accessible by user including encryption and access privilege settings. All messages and data may be piped through such a data authentication component.

In another embodiment, the PSSS includes a new revolutionary type of crypto currency: PSSS crypto. This currency is hyper secure, may be open sourced, includes anonymity and extended privacy, may be vetted by the crypto community of experts, completely decentralized (e.g., preventing oppression and tyranny of large stake holders), fast and highly scalable blockchain, prevents dead hand expiration of currency (e.g., when a currency owner dies and no one can obtain their wallet/passwords the coins essentially expire reducing the total amount of currency available), and solved with the currency being based on growing production value (e.g., mining work based on work (e.g., bandwidth of transactions and data being used, e.g., by PSSS messaging and storage), storage (e.g., PSSS nodes allotting storage of others' messaging/date), and energy (e.g., amount of kilowatt hours used to transact the currency, store the data, and power the bandwidth of transfers), and integrates oracles and smart contracts with the currency. As such, in one embodiment, this currency is produced as the PSSS allocates/generates more storage, and allocates/employs more bandwidth, allocates/employs more energy. In this way, this currency grows along with production of resources.

In another embodiment, the PSSS includes a storage service. This storage service is hyper secure, may be open sourced, includes anonymity and extended privacy, may be vetted by the crypto community of experts, completely decentralized (e.g., preventing oppression and tyranny of large stake holders), fast and highly scalable blockchain, prevents dead hand expiration of storage (e.g., when a storage owner dies and no one can obtain their wallet/passwords the storage essentially expires reducing the total amount of storage/date available), and solved with the storage being based on growing production value (e.g., mining work based on work (e.g., bandwidth of transactions and data being used, e.g., by PSSS messaging and storage), storage (e.g., PSSS nodes allotting storage of others' messaging/date), and energy (e.g., amount of kilowatt hours used to transact the currency, store the data, and power the bandwidth of transfers), and incorporates oracles and smart contracts with the currency.

Further PSSS Example Embodiments 7

Additional example embodiments include:

In one embodiment, the PSSS's crypto currency, PSSS crypto, may be limited to the production of resources as discussed above. In one embodiment, the resources are registered to the blockchain as having been created. In one example embodiment, when a PSSS node allocates, e.g., 10 gigabytes (e.g., in one embodiment, system and users may specify amounts of resources they wish to allocate), of storage, that allocation may be noted on the blockchain. The allocation may include the amount of storage, a node identifier, other resource information (bandwidth allocated, energy use, storage use, etc.) and a minimum time allocation for which those resources will be allocated. In one embodiment, a smart contract is used to verify that the allocated resources were made available for the time allocated/promised. As such, the PSSS crypto may then scan all new created resources on the blockchain and use that as a limit value for the amount of new crypto currency/coins that may be generated/mined. In another embodiment, upon the smart contract verifying that the resources were available as allocated/promised, the node providing such allocation may be allowed to generate and/or provided PSSS crypto for fulfillment of such a contract. In this manner, the PSSS crypto may be tied to only allowing production of cryptocurrency to match production and no overproduction may be allowed. As such, the PSSS crypto allows the measuring of both promised and delivered levels of resource production, and can ensure that generation of currency does not exceed production, ergo helping to maintain a constantly active and growing pool of currency, while preventing hyperinflation, hyper-deflation, dead-hand currency starvation, etc. problems with fiat currencies and existing crypto currencies like bitcoin.

In another embodiment, PSSS crypto, may employ dead-hand garbage collection. Over time owners of various crypto currencies may die and when they do, they may not pass on the password/credentials to their crypto wallets. As such, over time, more and more of a fixed crypto currency supply may become inaccessible, for crypto currencies like bitcoin. As such, over the course of many years, the active supply of such limited crypto currencies may evaporate to towards zero active coins since the supply is limited and coins are constantly lost to such dead hand (and forgotten/lost) credentials of users. Since PSSS crypto tie crypto coin to production levels, in one embodiment, the PSSS continuously evaluates how long it has been since PSSS crypto coins registered on the blockchain have been transacted. In one embodiment, if a PSSS crypto coin has not been transacted in over 150 years (e.g., or some other system specified time period; in one embodiment, the time period can be voted on, in yet another period, the PSSS crypto coin owner may specify the time period, etc.), it will be deemed a dead-hand coin. The PSSS may then increase the production of new coins allowed to deal with new production of resources, plus the count of any such newly deemed dead-hand coins. As such, the currency supply will not continuously dwindle as it does with older more limited crypto currencies such as bitcoin. In another embodiment, such coins may also be marked as dead-hand coins on the blockchain and listed for dispute resolution, e.g., and notification may be provided/pushed to coin holders to the extent they provided non-anonymous contact measures. In another embodiment, a wallet holding PSSS crypto may check against the dead-hand coin register to determine if any coins in in the users wallet have been so marked, allowing for a dispute to be lodged, and thereby preventing the coins from being marked dead-hand. This constant sweeping for stagnated currency and garbage collecting keeps the currency pool efficiently and properly sized for production and use.

In one embodiment, the PSSS may employ a plugin narrator such as synthesia.io. In this embodiment, the PSSS may generate "newscasts" of unread messages from any conversation. In one embodiment such conversations may be summarized, e.g., 'in the technology group there were 45 comments from Jane Doe concerning the costs of laptops in response to 3 articles from AcmeHardwareGuide.com discussing Apple and Windows laptops-another 22 comments were discussing reliability from Joe Shmo-another 10 comments by Janet Planet were made with regard to ease of use'. In one embodiment, summarization may employ text document summarization techniques, e.g., https://pypi.org/project/pysummarization/ may be used to generate summarizations of unread messages in conversations. In one embodiment, a user's messages are counted in various threads, totaled for those threads by topic (e.g., when a thread is created with a topic and/or articles in a thread dominate a topic, the topic of the article is used to name the topic), and such summaries are fed as text to the narrator plugin. In one embodiment, these digests may be engaged when a cursor hovers over an icon of the narrator. In yet another embodiment, narrators may be of another person in the conversation such text messages from the other person are spoken to the receiving user and vice versa. This allows for 'presence' of the user via asynchronous text chat communications to occur organically as if spoken via asynchronous text messaging.

Further PSSS Example Embodiments 8

Additional example embodiments include:

In one embodiment, the PSSS provides a PSSS group creation matching and merger component, which can be used to create groups for single individuals (and or small numbers of individuals) to participate in small groups with regard to common interests. The PSSS may employ machine learning on a user's interests, writing style, personality topics of interest, etc. to match with others having complementary interests, styles, personalities, etc. and invite them to a group around that common interest. In such a manner, the PSSS may encourage the growth of a federated number of groups of people common topics. Further, such groups may also be merged, joined, split from one another over time. In one embodiment, users may opt in to share their interests, personality styles, etc. without anonymity. However, in an alternative embodiment, they may opt to use such a PSSS group matching system anonymously. In such instances, personally identifying information may be stripped from any supplied information. In another embodiment, the PSSS may employ fully homomorphic encryption of the user information allowing matching without identifying information.

In another embodiment, the PSSS may employ its currency processing components which can mine for new PSSS crypto, archive transactions on the PSSS blockchain, process oracle/smart contracts for transactions, but can also anonymously process such interest matching analytics for group creation/merger as noted in the above PSSS group matching component. In another embodiment, the PSSS may generalize the currency processing components and allow $3^{rd}$ parties to process information, either stored in the PSSS distributed storage system, or elsewhere, and pay for employing the distributed processing service. In one embodiment, a portion or totality of the payments are distributed to the users operating the nodes processing such transactions.

In another embodiment, PSSS Crypto employs a system of staking unique from proof of stake and proof or work models. Proof of work have the problem of wasting a huge amount of energy from participants competing that duplicate and/or produce no useful work. And Proof of stake systems reward the rich with work that makes them richer, and does not give smaller participants a stake. PSSS Crypto is much more egalitarian system because in one sense it is more of a proof of production. In one example embodiment, the PSSS make reward a first time login with an allocation to stake and process and store PSSS network and crypto work, and as a reward stake them 10 coins. This is a reward for production, i.e., account/storage/processing instantiation is production. In another example, once a week each PSSS node may report its uptime for processing availability, network bandwidth availability, storage provided, transactions processed, and based on that it may be rewarded with more work, which may allow the node owner to stake out another 20 coins. This has the advantage that all work is useful and productive in that it stored information, participated in transactions, bandwidth offered, resiliency of the PSSS network, etc. with no waste of energy; and it also allocates rewards in an egalitarian way, based on participation, where rewards are not just allocated to the rich-getting-richer. It's a truly unique and revolutionary mechanism that has never before seen.

Further PSSS Example Embodiments 9

Additional example embodiments include:

In one embodiment, the PSSS may include a "I'm feeling lucky" feature. A user can select a target (e.g., romance/dating, special interest (e.g., tech group, machine learning, philosophy, movie group), etc.) and push the "I'm feeling lucky" button, and the PSSS may utilize the user's profile information to match the user with one or more people that have similar interests, geographic location, and/or the like. In one implementation, the PSSS may create a non-traceable alias for the user and may place the user in a group (e.g., a new group, an existing group that has a term flag that the group is open to new members) or another atom type. For example, the group may have its own terms (e.g., that may vary based on the target).

Further PSSS Example Embodiments 10

Additional example embodiments include:

In one embodiment, each PSSS node may function as a mail server. A user's node may store the user's email providing the user with a direct mail server. The user's emails may further be replicated through the PSSS network on other nodes. If a user does not have a PSSS node, the last leg for the user's emails can be delivered by regular IMAP/SMTP from the nearest PSSS node. If a user does have a PSSS node, the user's emails can be delivered directly to the node.

In one embodiment, the PSSS may function as a Customer Relationship Management (CRM) system. The backing store provided by the PSSS may be utilized as a CRM backing store.

Further PSSS Example Embodiments 11

Additional example embodiments include:

In one embodiment, the PSSS may implement a revision control system that allows a user to edit messages, but also to view prior versions. In some implementations, a user can grant other users permissions to edit the user's messages. In some implementations, a user may be precluded from viewing and/or revising messages that the user posted in a group if the user is no longer a member of the group. In one implementation, a checksum may be calculated for a user's messages periodically (e.g., daily) and logged to a blockchain to facilitate message revision auditing.

In one embodiment, the PSSS may provide a default archival period and an extended archival period for messages. For example, by default messages may be archived in PSSS storage for 1 year. However, if a user wishes an extended archival period, the user may be charged a cloud archiving fee, which may be split between nodes providing the storage. The storage provided for cloud archiving are an example of resource production that may be considered when determining how much new PSSS crypto currency to generate.

Further PSSS Example Embodiments 11

Additional example embodiments include:

In one embodiment, the PSSS may solve a problem of interstellar, long-range communication. When the PSSS facilitates a funshare, a user can set up a time to sing, watch, play, and/or the like simultaneously in the future. That can start simultaneously on Mars and on Earth, because PSSS nodes can keep metrics of delay from one node to another. That's part of the measurement it would take for seating popular content or content regularly used by some groups in a way that optimizes access. Thus, a user living on Mars and a user living on Earth could watch the same YouTube/Netflix video at the exact same time to share an experience. For example, a video may be cached to a YouTube/Netflix window and then played with a delay. In another example, playing a video may be synchronized to a time (e.g., UTC) that is the earliest time that allows everyone to watch (e.g., taking into account delays between user and/or content servers). In some implementations, key frames may be utilized to make sure videos continue to stay synchronized (e.g., some users' videos may be slowed down or sped up slightly to get them back in sync).

In one embodiment, the PSSS may deal with a problem of race conditions for crypto currency transactions. For example, a race condition may be caused by a faster node, node with more processing power, etc. abusing its advantage to spend the same crypto currency twice (e.g., by sending the first transaction to a remote part of the network, and then using its speed advantage to quickly spread the second transaction through a bigger local part of the network, making the chain with the first transaction invalid). The PSSS may deal with race conditions by adding an extra layer of terms that puts a hold on any funds being freed for the time period of the longest measured delay between nodes (e.g., nodes involved in a crypto currency transaction). The PSSS may act like a payment network with an issuer, issuing funds off of a reserve that can be pulled back. Thus the PSSS acts as escrow for the time delay. In one implementation, the PSSS may utilize local reserves that can clawback funds as transactions clear over the long haul. For example, if the communication time delay between nodes is over X amount of time, and a user specified they want the PSSS to act as escrow proxy, then the PSSS can step in to insure the transaction. A determination if the PSSS accepts the proxy transaction may be made based on a reputation rating on each party, and if over some Y threshold, the PSSS acts as escrow, if less than Y the PSSS declines to act as escrow and instead a delay (e.g., signal time to get there plus amount of time to write out) is put in so blocks show non-closed transaction on the blockchain until the PSSS gets confirmation from both areas on the blockchain (e.g., from Mars and Earth, or 2 remote and internet slow locations on Earth), and then write out a second transaction after confirmation from both areas to a forwarding blockchain address—so it takes 2 commits.

Additional embodiments may include:

1. An atom action message generating apparatus, comprising:
    at least one memory;
    a component collection stored in the at least one memory;
    at least one processor disposed in communication with the at least one memory, the at least one processor executing processor-executable instructions from the component collection, the component collection storage structured with processor-executable instructions, comprising:
        obtain, via the at least one processor, an atom interaction interface mechanism initial actuation from a user;
        determine, via the at least one processor, an atom messaging object datastructure corresponding to the actuated atom interaction interface mechanism,
            in which the atom messaging object datastructure is instantiated from an atom messaging object type from a set of orthogonal atom messaging object types,
            in which each orthogonal atom messaging object type is operable on by a set of common atom actions;
        retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;
        determine, via the at least one processor, a set of allowed common atom actions, in which the set of allowed common atom actions includes common atom actions, from the set of common atom actions, allowed by the atom terms datastructure;
        generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;
        provide, the generated atom action interaction interface mechanisms in the set of atom action interaction interface mechanisms for display to the user;
        obtain, via the at least one processor, an atom action interaction interface mechanism subsequent actuation from the user;
        determine, via the at least one processor, a performed atom action corresponding to the actuated atom action interaction interface mechanism; and
        generate, via the at least one processor, an atom action message corresponding to the performed atom action, in which the atom action message is structured to include a set of message parameters that specify the performed atom action.

2. The apparatus of embodiment 1, in which an atom messaging object type is any of: owners, conversation containers, content, hybrid container content, resources.

3. The apparatus of embodiment 2, in which the owners atom messaging object type includes atom messaging object types including any of: account, alias, people;
    in which the conversation containers atom messaging object type includes atom messaging object types including any of: channel, following, lurk, organization, team, group, 1-to-1, topic, category, thread, hybrids;
    in which the content atom messaging object type includes atom messaging object types including any of: message, media, link, attributes, interests, terms;
    in which the hybrid container content atom messaging object type includes atom messaging object types including any of: project, goal, milestone, events, tasks, attribute;
    in which the resources atom messaging object type includes atom messaging object types including any of: crypto currency, storage, bandwidth, uptime, latency, greater geographic interconnectivity access, greater topological interconnectivity access, lower likelihood of intervention of services, fewer outages.

4. The apparatus of embodiment 1, in which the instructions to retrieve the atom terms datastructure are structured as instructions to retrieve the atom terms datastructure from cache of a node associated with the user.

5. The apparatus of embodiment 1, in which the instructions to retrieve the atom terms datastructure are structured as instructions to:
    retrieve the atom terms datastructure from storage of a third party node; and
    verify validity of the atom terms datastructure, in which the validity of the atom terms datastructure is verified based on verification data obtained from a blockchain address associated with the atom terms datastructure.

6. The apparatus of embodiment 5, in which the third party node is a SuperNode providing caching for a plurality of unrelated users.

7. The apparatus of embodiment 5, in which the third party node hosts content associated with a specified address in a distributed file system, in which the specified address corresponds to the atom terms datastructure.

8. The apparatus of embodiment 5, in which the verification data comprises a hash of the atom terms datastructure.

9. The apparatus of embodiment 1, in which a term, in the set of terms, is a non-disclosure agreement pertaining to data associated with the atom messaging object datastructure.

10. The apparatus of embodiment 9, in which the atom messaging object datastructure is a public private group structured as a group that allows any user to join the group but prevents users from disclosing data shared with the group using the non-disclosure agreement.

11. The apparatus of embodiment 1, in which the set of terms is structured as allowed and disallowed atom actions for the atom messaging object datastructure.

12. The apparatus of embodiment 1, in which the component collection storage is further structured with processor-executable instructions, comprising:
    determine, via the at least one processor, a set of enhanced atom actions associated with the atom messaging object type;

determine, via the at least one processor, a set of allowed enhanced atom actions, in which the set of allowed enhanced atom actions comprises enhanced atom actions, from the set of enhanced atom actions associated with the atom messaging object type, allowed by the atom terms datastructure; and generate, via the at least one processor, a second set of atom action interaction interface mechanisms, each atom action interaction interface mechanism in the second set of atom action interaction interface mechanisms corresponding to an allowed enhanced atom action from the set of allowed enhanced atom actions.

13. The apparatus of embodiment 1, in which the component collection storage is further structured with processor-executable instructions, comprising:

determine, via the at least one processor, a set of atom action parameters for the performed atom action, in which the atom action message is structured to include a set of message parameters that specify the determined set of atom action parameters.

14. The apparatus of embodiment 13, in which the component collection storage is further structured with processor-executable instructions, comprising:

verify, via the at least one processor, that the set of atom action parameters for the performed atom action is allowed by the atom terms datastructure.

15. The apparatus of embodiment 13, in which the set of atom action parameters for the performed atom action is structured to include a target atom messaging object datastructure.

16. The apparatus of embodiment 15, in which the component collection storage is further structured with processor-executable instructions, comprising:

send, via the at least one processor, the atom action message to the target atom messaging object datastructure.

17. The apparatus of embodiment 1, in which the atom terms datastructure is generated based on selections performed using a set of selection interface mechanisms, in which each selection interface mechanism in the set of selection interface mechanisms corresponds to a term.

18. The apparatus of embodiment 17, in which terms selected using the set of selection interface mechanisms are form filled into a legal agreement comprising the selected terms and into a plain language description of the selected terms.

19. The apparatus of embodiment 1, in which the component collection storage is further structured with processor-executable instructions, comprising:

provide, via the at least one processor, the atom action message for subsequent action by a node.

20. An atom action message generating processor-readable, non-transient medium, the medium storing a component collection, the component collection storage structured with processor-executable instructions comprising:

obtain, via the at least one processor, an atom interaction interface mechanism initial actuation from a user;

determine, via the at least one processor, an atom messaging object datastructure corresponding to the actuated atom interaction interface mechanism, in which the atom messaging object datastructure is instantiated from an atom messaging object type from a set of orthogonal atom messaging object types, in which each orthogonal atom messaging object type is operable on by a set of common atom actions;

retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;

determine, via the at least one processor, a set of allowed common atom actions, in which the set of allowed common atom actions includes common atom actions, from the set of common atom actions, allowed by the atom terms datastructure;

generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;

provide, the generated atom action interaction interface mechanisms in the set of atom action interaction interface mechanisms for display to the user;

obtain, via the at least one processor, an atom action interaction interface mechanism subsequent actuation from the user;

determine, via the at least one processor, a performed atom action corresponding to the actuated atom action interaction interface mechanism; and generate, via the at least one processor, an atom action message corresponding to the performed atom action, in which the atom action message is structured to include a set of message parameters that specify the performed atom action.

21. The medium of embodiment 20, in which an atom messaging object type is any of: owners, conversation containers, content, hybrid container content, resources.

22. The medium of embodiment 21, in which the owners atom messaging object type includes atom messaging object types including any of: account, alias, people;

in which the conversation containers atom messaging object type includes atom messaging object types including any of: channel, following, lurk, organization, team, group, 1-to-1, topic, category, thread, hybrids;

in which the content atom messaging object type includes atom messaging object types including any of: message, media, link, attributes, interests, terms;

in which the hybrid container content atom messaging object type includes atom messaging object types including any of: project, goal, milestone, events, tasks, attribute;

in which the resources atom messaging object type includes atom messaging object types including any of: crypto currency, storage, bandwidth, uptime, latency, greater geographic interconnectivity access, greater topological interconnectivity access, lower likelihood of intervention of services, fewer outages.

23. The medium of embodiment 20, in which the instructions to retrieve the atom terms datastructure are structured as instructions to retrieve the atom terms datastructure from cache of a node associated with the user.

24. The medium of embodiment 20, in which the instructions to retrieve the atom terms datastructure are structured as instructions to:

retrieve the atom terms datastructure from storage of a third party node; and verify validity of the atom terms datastructure, in which the validity of the atom terms datastructure is verified based on verification data obtained from a blockchain address associated with the atom terms datastructure.

25. The medium of embodiment 24, in which the third party node is a SuperNode providing caching for a plurality of unrelated users.

26. The medium of embodiment 24, in which the third party node hosts content associated with a specified address in a distributed file system, in which the specified address corresponds to the atom terms datastructure.

27. The medium of embodiment 24, in which the verification data comprises a hash of the atom terms datastructure.

28. The medium of embodiment 20, in which a term, in the set of terms, is a non-disclosure agreement pertaining to data associated with the atom messaging object datastructure.

29. The medium of embodiment 28, in which the atom messaging object datastructure is a public private group structured as a group that allows any user to join the group but prevents users from disclosing data shared with the group using the non-disclosure agreement.

30. The medium of embodiment 20, in which the set of terms is structured as allowed and disallowed atom actions for the atom messaging object datastructure.

31. The medium of embodiment 20, in which the component collection storage is further structured with processor-executable instructions, comprising:
   determine, via the at least one processor, a set of enhanced atom actions associated with the atom messaging object type;
   determine, via the at least one processor, a set of allowed enhanced atom actions, in which the set of allowed enhanced atom actions comprises enhanced atom actions, from the set of enhanced atom actions associated with the atom messaging object type, allowed by the atom terms datastructure; and
   generate, via the at least one processor, a second set of atom action interaction interface mechanisms, each atom action interaction interface mechanism in the second set of atom action interaction interface mechanisms corresponding to an allowed enhanced atom action from the set of allowed enhanced atom actions.

32. The medium of embodiment 20, in which the component collection storage is further structured with processor-executable instructions, comprising:
   determine, via the at least one processor, a set of atom action parameters for the performed atom action, in which the atom action message is structured to include a set of message parameters that specify the determined set of atom action parameters.

33. The medium of embodiment 32, in which the component collection storage is further structured with processor-executable instructions, comprising:
   verify, via the at least one processor, that the set of atom action parameters for the performed atom action is allowed by the atom terms datastructure.

34. The medium of embodiment 32, in which the set of atom action parameters for the performed atom action is structured to include a target atom messaging object datastructure.

35. The medium of embodiment 34, in which the component collection storage is further structured with processor-executable instructions, comprising:
   send, via the at least one processor, the atom action message to the target atom messaging object datastructure.

36. The medium of embodiment 20, in which the atom terms datastructure is generated based on selections performed using a set of selection interface mechanisms, in which each selection interface mechanism in the set of selection interface mechanisms corresponds to a term.

37. The medium of embodiment 36, in which terms selected using the set of selection interface mechanisms are form filled into a legal agreement comprising the selected terms and into a plain language description of the selected terms.

38. The medium of embodiment 20, in which the component collection storage is further structured with processor-executable instructions, comprising:
   provide, via the at least one processor, the atom action message for subsequent action by a node.

39. An atom action message generating processor-implemented system, comprising: means to store a component collection;
   means to process processor-executable instructions from the component collection, the component collection storage structured with processor-executable instructions including:
      obtain, via the at least one processor, an atom interaction interface mechanism initial actuation from a user;
      determine, via the at least one processor, an atom messaging object datastructure corresponding to the actuated atom interaction interface mechanism,
         in which the atom messaging object datastructure is instantiated from an atom messaging object type from a set of orthogonal atom messaging object types,
            in which each orthogonal atom messaging object type is operable on by a set of common atom actions;
      retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;
      determine, via the at least one processor, a set of allowed common atom actions, in which the set of allowed common atom actions includes common atom actions, from the set of common atom actions, allowed by the atom terms datastructure;
      generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;
      provide, the generated atom action interaction interface mechanisms in the set of atom action interaction interface mechanisms for display to the user;
      obtain, via the at least one processor, an atom action interaction interface mechanism subsequent actuation from the user;
      determine, via the at least one processor, a performed atom action corresponding to the actuated atom action interaction interface mechanism; and
      generate, via the at least one processor, an atom action message corresponding to the performed atom action, in which the atom action message is structured to include a set of message parameters that specify the performed atom action.

40. The system of embodiment 39, in which an atom messaging object type is any of: owners, conversation containers, content, hybrid container content, resources.

41. The system of embodiment 40, in which the owners atom messaging object type includes atom messaging object types including any of: account, alias, people;
in which the conversation containers atom messaging object type includes atom messaging object types including any of: channel, following, lurk, organization, team, group, 1-to-1, topic, category, thread, hybrids;
in which the content atom messaging object type includes atom messaging object types including any of: message, media, link, attributes, interests, terms;
in which the hybrid container content atom messaging object type includes atom messaging object types including any of: project, goal, milestone, events, tasks, attribute;
in which the resources atom messaging object type includes atom messaging object types including any of: crypto currency, storage, bandwidth, uptime, latency, greater geographic interconnectivity access, greater topological interconnectivity access, lower likelihood of intervention of services, fewer outages.

42. The system of embodiment 39, in which the instructions to retrieve the atom terms datastructure are structured as instructions to retrieve the atom terms datastructure from cache of a node associated with the user.

43. The system of embodiment 39, in which the instructions to retrieve the atom terms datastructure are structured as instructions to:
retrieve the atom terms datastructure from storage of a third party node; and
verify validity of the atom terms datastructure, in which the validity of the atom terms datastructure is verified based on verification data obtained from a blockchain address associated with the atom terms datastructure.

44. The system of embodiment 43, in which the third party node is a SuperNode providing caching for a plurality of unrelated users.

45. The system of embodiment 43, in which the third party node hosts content associated with a specified address in a distributed file system, in which the specified address corresponds to the atom terms datastructure.

46. The system of embodiment 43, in which the verification data comprises a hash of the atom terms datastructure.

47. The system of embodiment 39, in which a term, in the set of terms, is a non-disclosure agreement pertaining to data associated with the atom messaging object datastructure.

48. The system of embodiment 47, in which the atom messaging object datastructure is a public private group structured as a group that allows any user to join the group but prevents users from disclosing data shared with the group using the non-disclosure agreement.

49. The system of embodiment 39, in which the set of terms is structured as allowed and disallowed atom actions for the atom messaging object datastructure.

50. The system of embodiment 39, in which the component collection storage is further structured with processor-executable instructions, comprising:
determine, via the at least one processor, a set of enhanced atom actions associated with the atom messaging object type;
determine, via the at least one processor, a set of allowed enhanced atom actions, in which the set of allowed enhanced atom actions comprises enhanced atom actions, from the set of enhanced atom actions associated with the atom messaging object type, allowed by the atom terms datastructure; and
generate, via the at least one processor, a second set of atom action interaction interface mechanisms, each atom action interaction interface mechanism in the second set of atom action interaction interface mechanisms corresponding to an allowed enhanced atom action from the set of allowed enhanced atom actions.

51. The system of embodiment 39, in which the component collection storage is further structured with processor-executable instructions, comprising:
determine, via the at least one processor, a set of atom action parameters for the performed atom action, in which the atom action message is structured to include a set of message parameters that specify the determined set of atom action parameters.

52. The system of embodiment 51, in which the component collection storage is further structured with processor-executable instructions, comprising:
verify, via the at least one processor, that the set of atom action parameters for the performed atom action is allowed by the atom terms datastructure.

53. The system of embodiment 51, in which the set of atom action parameters for the performed atom action is structured to include a target atom messaging object datastructure.

54. The system of embodiment 53, in which the component collection storage is further structured with processor-executable instructions, comprising:
send, via the at least one processor, the atom action message to the target atom messaging object datastructure.

55. The system of embodiment 39, in which the atom terms datastructure is generated based on selections performed using a set of selection interface mechanisms, in which each selection interface mechanism in the set of selection interface mechanisms corresponds to a term.

56. The system of embodiment 55, in which terms selected using the set of selection interface mechanisms are form filled into a legal agreement comprising the selected terms and into a plain language description of the selected terms.

57. The system of embodiment 39, in which the component collection storage is further structured with processor-executable instructions, comprising:
provide, via the at least one processor, the atom action message for subsequent action by a node.

58. An atom action message generating processor-implemented process, including processing processor-executable instructions via at least one processor from a component collection stored in at least one memory, the component collection storage structured with processor-executable instructions comprising:
obtain, via the at least one processor, an atom interaction interface mechanism initial actuation from a user;
determine, via the at least one processor, an atom messaging object datastructure corresponding to the actuated atom interaction interface mechanism,
in which the atom messaging object datastructure is instantiated from an atom messaging object type from a set of orthogonal atom messaging object types,
in which each orthogonal atom messaging object type is operable on by a set of common atom actions;
retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;

determine, via the at least one processor, a set of allowed common atom actions, in which the set of allowed common atom actions includes common atom actions, from the set of common atom actions, allowed by the atom terms datastructure;

generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;

provide, the generated atom action interaction interface mechanisms in the set of atom action interaction interface mechanisms for display to the user;

obtain, via the at least one processor, an atom action interaction interface mechanism subsequent actuation from the user;

determine, via the at least one processor, a performed atom action corresponding to the actuated atom action interaction interface mechanism; and generate, via the at least one processor, an atom action message corresponding to the performed atom action, in which the atom action message is structured to include a set of message parameters that specify the performed atom action.

59. The process of embodiment 58, in which an atom messaging object type is any of: owners, conversation containers, content, hybrid container content, resources.

60. The process of embodiment 59, in which the owners atom messaging object type includes atom messaging object types including any of: account, alias, people;
in which the conversation containers atom messaging object type includes atom messaging object types including any of: channel, following, lurk, organization, team, group, 1-to-1, topic, category, thread, hybrids;
in which the content atom messaging object type includes atom messaging object types including any of: message, media, link, attributes, interests, terms;
in which the hybrid container content atom messaging object type includes atom messaging object types including any of: project, goal, milestone, events, tasks, attribute;
in which the resources atom messaging object type includes atom messaging object types including any of: crypto currency, storage, bandwidth, uptime, latency, greater geographic interconnectivity access, greater topological interconnectivity access, lower likelihood of intervention of services, fewer outages.

61. The process of embodiment 58, in which the instructions to retrieve the atom terms datastructure are structured as instructions to retrieve the atom terms datastructure from cache of a node associated with the user.

62. The process of embodiment 58, in which the instructions to retrieve the atom terms datastructure are structured as instructions to:
retrieve the atom terms datastructure from storage of a third party node; and verify validity of the atom terms datastructure, in which the validity of the atom terms datastructure is verified based on verification data obtained from a blockchain address associated with the atom terms datastructure.

63. The process of embodiment 62, in which the third party node is a SuperNode providing caching for a plurality of unrelated users.

64. The process of embodiment 62, in which the third party node hosts content associated with a specified address in a distributed file system, in which the specified address corresponds to the atom terms datastructure.

65. The process of embodiment 62, in which the verification data comprises a hash of the atom terms datastructure.

66. The process of embodiment 58, in which a term, in the set of terms, is a non-disclosure agreement pertaining to data associated with the atom messaging object datastructure.

67. The process of embodiment 66, in which the atom messaging object datastructure is a public private group structured as a group that allows any user to join the group but prevents users from disclosing data shared with the group using the non-disclosure agreement.

68. The process of embodiment 58, in which the set of terms is structured as allowed and disallowed atom actions for the atom messaging object datastructure.

69. The process of embodiment 58, in which the component collection storage is further structured with processor-executable instructions, comprising:
determine, via the at least one processor, a set of enhanced atom actions associated with the atom messaging object type;
determine, via the at least one processor, a set of allowed enhanced atom actions, in which the set of allowed enhanced atom actions comprises enhanced atom actions, from the set of enhanced atom actions associated with the atom messaging object type, allowed by the atom terms datastructure; and
generate, via the at least one processor, a second set of atom action interaction interface mechanisms, each atom action interaction interface mechanism in the second set of atom action interaction interface mechanisms corresponding to an allowed enhanced atom action from the set of allowed enhanced atom actions.

70. The process of embodiment 58, in which the component collection storage is further structured with processor-executable instructions, comprising:
determine, via the at least one processor, a set of atom action parameters for the performed atom action, in which the atom action message is structured to include a set of message parameters that specify the determined set of atom action parameters.

71. The process of embodiment 70, in which the component collection storage is further structured with processor-executable instructions, comprising:
verify, via the at least one processor, that the set of atom action parameters for the performed atom action is allowed by the atom terms datastructure.

72. The process of embodiment 70, in which the set of atom action parameters for the performed atom action is structured to include a target atom messaging object datastructure.

73. The process of embodiment 72, in which the component collection storage is further structured with processor-executable instructions, comprising:
send, via the at least one processor, the atom action message to the target atom messaging object datastructure.

74. The process of embodiment 58, in which the atom terms datastructure is generated based on selections performed using a set of selection interface mechanisms, in which each selection interface mechanism in the set of selection interface mechanisms corresponds to a term.

75. The process of embodiment 74, in which terms selected using the set of selection interface mechanisms are form filled into a legal agreement comprising the selected terms and into a plain language description of the selected terms.

76. The process of embodiment 58, in which the component collection storage is further structured with processor-executable instructions, comprising:
provide, via the at least one processor, the atom action message for subsequent action by a node.

101. An atom action message delivering apparatus, comprising:
at least one memory;
a component collection stored in the at least one memory;
at least one processor disposed in communication with the at least one memory, the at least one processor executing processor-executable instructions from the component collection, the component collection storage structured with processor-executable instructions, comprising:
obtain, via the at least one processor, by a source node corresponding to a user, an atom action message associated with the user, in which the atom action message is structured to include a set of message parameters that specify a target atom messaging object datastructure;
determine, via the at least one processor, an identifier of a target node corresponding to the target atom messaging object datastructure;
parse, via the at least one processor, a message security settings datastructure to determine number of shards and number of hops to utilize to send the atom action message to the target node;
fracture, via the at least one processor, the atom action message into the determined number of shards, each shard comprising encrypted data that is decryptable by the target atom messaging object datastructure;
generate, via the at least one processor, a message shard datastructure for each shard, a respective message shard datastructure for a respective shard structured to include: an identifier of the source node, the identifier of the target node, encrypted data for the respective shard, a determined number of hops to make before delivering the respective message shard datastructure to the target node;
determine, via the at least one processor, for each generated message shard datastructure, a first hop intermediate node to utilize for delivering a respective message shard datastructure to the target node; and
send, via the at least one processor, for each generated message shard datastructure, a respective message shard datastructure to the respective first hop intermediate node determined for the respective message shard datastructure.

102. The apparatus of embodiment 101, in which the target atom messaging object datastructure comprises a set of constituent atom messaging object datastructures, and in which the atom action message is sent separately to each constituent atom messaging object datastructure in the set of constituent atom messaging object datastructures.

103. The apparatus of embodiment 101, in which the identifier of the target node is a network address associated with the target node.

104. The apparatus of embodiment 101, in which the message security settings datastructure is structured to include a function that specifies how to calculate the number of shards to utilize for the atom action message and for each generated message shard datastructure.

105. The apparatus of embodiment 101, in which the message security settings datastructure is structured to include a function that specifies how to calculate the number of hops to utilize for each generated message shard datastructure.

106. The apparatus of embodiment 101, in which the instructions to fracture the atom action message into the determined number of shards are structured as instructions to encrypt the atom action message and to fracture the encrypted atom action message into the determined number of shards.

107. The apparatus of embodiment 101, in which the instructions to fracture the atom action message into the determined number of shards are structured as instructions to fracture the atom action message into the determined number of shards and to encrypt each shard separately.

108. The apparatus of embodiment 101, in which encrypted data for a shard is encrypted using one of: a public key of the target atom messaging object datastructure, a symmetric key pre-shared with the target atom messaging object datastructure using public-key cryptography.

109. The apparatus of embodiment 108, in which encrypted data for a shard is further encrypted using an expiring key.

110. The apparatus of embodiment 101, in which a first hop intermediate node to utilize for delivering a message shard datastructure to the target node is predetermined by a delivery path specified by the user.

111. The apparatus of embodiment 101, in which a first hop intermediate node to utilize for delivering a message shard datastructure to the target node is selected randomly.

112. The apparatus of embodiment 101, in which a first hop intermediate node to utilize for delivering a message shard datastructure to the target node is selected based on performance characteristics.

113. The apparatus of embodiment 101, in which the component collection storage is further structured with processor-executable instructions, comprising:
obtain, via the at least one processor, by an intermediate node, a message shard datastructure addressed to the target node;
update, via the at least one processor, remaining hops count associated with the obtained message shard datastructure, in which the remaining hops count is decreased by one;
determine, via the at least one processor, a next hop node to utilize for delivering the obtained message shard datastructure to the target node; and
send, via the at least one processor, the obtained message shard datastructure to the determined next hop node.

114. The apparatus of embodiment 113, in which the component collection storage is further structured with processor-executable instructions, comprising:
update, via the at least one processor, a source node identifier associated with the obtained message shard datastructure, in which the source node identifier is set to an identifier of the intermediate node.

115. The apparatus of embodiment 113, in which the determined next hop node is one of: another intermediate node, the target node.

116. The apparatus of embodiment 101, in which the component collection storage is further structured with processor-executable instructions, comprising:
- obtain, via the at least one processor, by an intermediate node, a message shard datastructure addressed to the target node;
- update, via the at least one processor, remaining hops count associated with the obtained message shard datastructure, in which the remaining hops count is decreased by one;
- parse, via the at least one processor, a shard security settings datastructure to determine number of new shards to utilize to send the obtained message shard datastructure to the target node;
- fracture, via the at least one processor, the obtained message shard datastructure into the determined number of new shards;
- generate, via the at least one processor, a new message shard datastructure for each new shard;
- determine, via the at least one processor, for each new generated message shard datastructure, a next hop node to utilize for delivering a respective new message shard datastructure to the target node; and
- send, via the at least one processor, for each new generated message shard datastructure, a respective new message shard datastructure to the respective next hop node determined for the respective new message shard datastructure.

117. The apparatus of embodiment 101, in which the component collection storage is further structured with processor-executable instructions, comprising:
- obtain, via the at least one processor, by the target node, a message shard datastructure addressed to the target node;
- determine, via the at least one processor, a message identifier associated with the obtained message shard datastructure;
- obtain, via the at least one processor, other message shard datastructures associated with the message identifier;
- reconstruct, via the at least one processor, the atom action message using the obtained message shard datastructures; and
- execute, via the at least one processor, an atom action associated with the atom action message.

118. The apparatus of embodiment 117, in which the instructions to reconstruct the atom action message are structured as instructions to decrypt an encrypted atom action message reconstructed from the obtained message shard datastructures.

119. The apparatus of embodiment 118, in which the encrypted atom action message is decrypted using one of: a private key of the target atom messaging object datastructure, a symmetric key pre-shared with the target atom messaging object datastructure using public-key cryptography.

120. The apparatus of embodiment 118, in which the encrypted atom action message is decrypted using an expiring key.

121. The apparatus of embodiment 101, in which the target atom messaging object datastructure is a node.

122. The apparatus of embodiment 101, in which the target atom messaging object datastructure includes a target user identifier and an atom messaging object datastructure identifier.

123. The apparatus of embodiment 122, in which the atom messaging object datastructure identifier is a message identifier, and the atom action message is associated with a Like action.

124. An atom action message delivering processor-readable, non-transient medium, the medium storing a component collection, the component collection storage structured with processor-executable instructions comprising:
- obtain, via the at least one processor, by a source node corresponding to a user, an atom action message associated with the user, in which the atom action message is structured to include a set of message parameters that specify a target atom messaging object datastructure;
- determine, via the at least one processor, an identifier of a target node corresponding to the target atom messaging object datastructure;
- parse, via the at least one processor, a message security settings datastructure to determine number of shards and number of hops to utilize to send the atom action message to the target node;
- fracture, via the at least one processor, the atom action message into the determined number of shards, each shard comprising encrypted data that is decryptable by the target atom messaging object datastructure;
- generate, via the at least one processor, a message shard datastructure for each shard, a respective message shard datastructure for a respective shard structured to include: an identifier of the source node, the identifier of the target node, encrypted data for the respective shard, a determined number of hops to make before delivering the respective message shard datastructure to the target node;
- determine, via the at least one processor, for each generated message shard datastructure, a first hop intermediate node to utilize for delivering a respective message shard datastructure to the target node; and
- send, via the at least one processor, for each generated message shard datastructure, a respective message shard datastructure to the respective first hop intermediate node determined for the respective message shard datastructure.

125. The medium of embodiment 124, in which the target atom messaging object datastructure comprises a set of constituent atom messaging object datastructures, and in which the atom action message is sent separately to each constituent atom messaging object datastructure in the set of constituent atom messaging object datastructures.

126. The medium of embodiment 124, in which the identifier of the target node is a network address associated with the target node.

127. The medium of embodiment 124, in which the message security settings datastructure is structured to include a function that specifies how to calculate the number of shards to utilize for the atom action message and for each generated message shard datastructure.

128. The medium of embodiment 124, in which the message security settings datastructure is structured to include a function that specifies how to calculate the number of hops to utilize for each generated message shard datastructure.

129. The medium of embodiment 124, in which the instructions to fracture the atom action message into the determined number of shards are structured as instructions to encrypt the atom action message and to fracture the encrypted atom action message into the determined number of shards.

130. The medium of embodiment 124, in which the instructions to fracture the atom action message into the determined number of shards are structured as instructions to fracture the atom action message into the determined number of shards and to encrypt each shard separately.

131. The medium of embodiment 124, in which encrypted data for a shard is encrypted using one of: a public key of the target atom messaging object datastructure, a symmetric key pre-shared with the target atom messaging object datastructure using public-key cryptography.

132. The medium of embodiment 131, in which encrypted data for a shard is further encrypted using an expiring key.

133. The medium of embodiment 124, in which a first hop intermediate node to utilize for delivering a message shard datastructure to the target node is predetermined by a delivery path specified by the user.

134. The medium of embodiment 124, in which a first hop intermediate node to utilize for delivering a message shard datastructure to the target node is selected randomly.

135. The medium of embodiment 124, in which a first hop intermediate node to utilize for delivering a message shard datastructure to the target node is selected based on performance characteristics.

136. The medium of embodiment 124, in which the component collection storage is further structured with processor-executable instructions, comprising:
   obtain, via the at least one processor, by an intermediate node, a message shard datastructure addressed to the target node;
   update, via the at least one processor, remaining hops count associated with the obtained message shard datastructure, in which the remaining hops count is decreased by one;
   determine, via the at least one processor, a next hop node to utilize for delivering the obtained message shard datastructure to the target node; and send, via the at least one processor, the obtained message shard datastructure to the determined next hop node.

137. The medium of embodiment 136, in which the component collection storage is further structured with processor-executable instructions, comprising:
   update, via the at least one processor, a source node identifier associated with the obtained message shard datastructure, in which the source node identifier is set to an identifier of the intermediate node.

138. The medium of embodiment 136, in which the determined next hop node is one of: another intermediate node, the target node.

139. The medium of embodiment 124, in which the component collection storage is further structured with processor-executable instructions, comprising:
   obtain, via the at least one processor, by an intermediate node, a message shard datastructure addressed to the target node;
   update, via the at least one processor, remaining hops count associated with the obtained message shard datastructure, in which the remaining hops count is decreased by one;
   parse, via the at least one processor, a shard security settings datastructure to determine number of new shards to utilize to send the obtained message shard datastructure to the target node;
   fracture, via the at least one processor, the obtained message shard datastructure into the determined number of new shards;
   generate, via the at least one processor, a new message shard datastructure for each new shard; determine, via the at least one processor, for each new generated message shard datastructure, a next hop node to utilize for delivering a respective new message shard datastructure to the target node; and
   send, via the at least one processor, for each new generated message shard datastructure, a respective new message shard datastructure to the respective next hop node determined for the respective new message shard datastructure.

140. The medium of embodiment 124, in which the component collection storage is further structured with processor-executable instructions, comprising:
   obtain, via the at least one processor, by the target node, a message shard datastructure addressed to the target node;
   determine, via the at least one processor, a message identifier associated with the obtained message shard datastructure;
   obtain, via the at least one processor, other message shard datastructures associated with the message identifier;
   reconstruct, via the at least one processor, the atom action message using the obtained message shard datastructures; and
   execute, via the at least one processor, an atom action associated with the atom action message.

141. The medium of embodiment 140, in which the instructions to reconstruct the atom action message are structured as instructions to decrypt an encrypted atom action message reconstructed from the obtained message shard datastructures.

142. The medium of embodiment 141, in which the encrypted atom action message is decrypted using one of: a private key of the target atom messaging object datastructure, a symmetric key pre-shared with the target atom messaging object datastructure using public-key cryptography.

143. The medium of embodiment 141, in which the encrypted atom action message is decrypted using an expiring key.

144. The medium of embodiment 124, in which the target atom messaging object datastructure is a node.

145. The medium of embodiment 124, in which the target atom messaging object datastructure includes a target user identifier and an atom messaging object datastructure identifier.

146. The medium of embodiment 145, in which the atom messaging object datastructure identifier is a message identifier, and the atom action message is associated with a Like action.

147. An atom action message delivering processor-implemented system, comprising: means to store a component collection;
   means to process processor-executable instructions from the component collection, the component collection storage structured with processor-executable instructions including:
      obtain, via the at least one processor, by a source node corresponding to a user, an atom action message associated with the user, in which the atom action message is structured to include a set of message parameters that specify a target atom messaging object datastructure;
      determine, via the at least one processor, an identifier of a target node corresponding to the target atom messaging object datastructure;
      parse, via the at least one processor, a message security settings datastructure to determine number of shards and number of hops to utilize to send the atom action message to the target node;

fracture, via the at least one processor, the atom action message into the determined number of shards, each shard comprising encrypted data that is decryptable by the target atom messaging object datastructure;

generate, via the at least one processor, a message shard datastructure for each shard, a respective message shard datastructure for a respective shard structured to include: an identifier of the source node, the identifier of the target node, encrypted data for the respective shard, a determined number of hops to make before delivering the respective message shard datastructure to the target node;

determine, via the at least one processor, for each generated message shard datastructure, a first hop intermediate node to utilize for delivering a respective message shard datastructure to the target node; and send, via the at least one processor, for each generated message shard datastructure, a respective message shard datastructure to the respective first hop intermediate node determined for the respective message shard datastructure.

148. The system of embodiment 147, in which the target atom messaging object datastructure comprises a set of constituent atom messaging object datastructures, and in which the atom action message is sent separately to each constituent atom messaging object datastructure in the set of constituent atom messaging object datastructures.

149. The system of embodiment 147, in which the identifier of the target node is a network address associated with the target node.

150. The system of embodiment 147, in which the message security settings datastructure is structured to include a function that specifies how to calculate the number of shards to utilize for the atom action message and for each generated message shard datastructure.

151. The system of embodiment 147, in which the message security settings datastructure is structured to include a function that specifies how to calculate the number of hops to utilize for each generated message shard datastructure.

152. The system of embodiment 147, in which the instructions to fracture the atom action message into the determined number of shards are structured as instructions to encrypt the atom action message and to fracture the encrypted atom action message into the determined number of shards.

153. The system of embodiment 147, in which the instructions to fracture the atom action message into the determined number of shards are structured as instructions to fracture the atom action message into the determined number of shards and to encrypt each shard separately.

154. The system of embodiment 147, in which encrypted data for a shard is encrypted using one of: a public key of the target atom messaging object datastructure, a symmetric key pre-shared with the target atom messaging object datastructure using public-key cryptography.

155. The system of embodiment 154, in which encrypted data for a shard is further encrypted using an expiring key.

156. The system of embodiment 147, in which a first hop intermediate node to utilize for delivering a message shard datastructure to the target node is predetermined by a delivery path specified by the user.

157. The system of embodiment 147, in which a first hop intermediate node to utilize for delivering a message shard datastructure to the target node is selected randomly.

158. The system of embodiment 147, in which a first hop intermediate node to utilize for delivering a message shard datastructure to the target node is selected based on performance characteristics.

159. The system of embodiment 147, in which the component collection storage is further structured with processor-executable instructions, comprising:

obtain, via the at least one processor, by an intermediate node, a message shard datastructure addressed to the target node;

update, via the at least one processor, remaining hops count associated with the obtained message shard datastructure, in which the remaining hops count is decreased by one;

determine, via the at least one processor, a next hop node to utilize for delivering the obtained message shard datastructure to the target node; and send, via the at least one processor, the obtained message shard datastructure to the determined next hop node.

160. The system of embodiment 159, in which the component collection storage is further structured with processor-executable instructions, comprising:

update, via the at least one processor, a source node identifier associated with the obtained message shard datastructure, in which the source node identifier is set to an identifier of the intermediate node.

161. The system of embodiment 159, in which the determined next hop node is one of: another intermediate node, the target node.

162. The system of embodiment 147, in which the component collection storage is further structured with processor-executable instructions, comprising:

obtain, via the at least one processor, by an intermediate node, a message shard datastructure addressed to the target node;

update, via the at least one processor, remaining hops count associated with the obtained message shard datastructure, in which the remaining hops count is decreased by one;

parse, via the at least one processor, a shard security settings datastructure to determine number of new shards to utilize to send the obtained message shard datastructure to the target node;

fracture, via the at least one processor, the obtained message shard datastructure into the determined number of new shards;

generate, via the at least one processor, a new message shard datastructure for each new shard;

determine, via the at least one processor, for each new generated message shard datastructure, a next hop node to utilize for delivering a respective new message shard datastructure to the target node; and send, via the at least one processor, for each new generated message shard datastructure, a respective new message shard datastructure to the respective next hop node determined for the respective new message shard datastructure.

163. The system of embodiment 147, in which the component collection storage is further structured with processor-executable instructions, comprising:

obtain, via the at least one processor, by the target node, a message shard datastructure addressed to the target node;

determine, via the at least one processor, a message identifier associated with the obtained message shard datastructure;

obtain, via the at least one processor, other message shard datastructures associated with the message identifier;

reconstruct, via the at least one processor, the atom action message using the obtained message shard datastructures; and execute, via the at least one processor, an atom action associated with the atom action message.

164. The system of embodiment 163, in which the instructions to reconstruct the atom action message are structured as instructions to decrypt an encrypted atom action message reconstructed from the obtained message shard datastructures.

165. The system of embodiment 164, in which the encrypted atom action message is decrypted using one of: a private key of the target atom messaging object datastructure, a symmetric key pre-shared with the target atom messaging object datastructure using public-key cryptography.

166. The system of embodiment 164, in which the encrypted atom action message is decrypted using an expiring key.

167. The system of embodiment 147, in which the target atom messaging object datastructure is a node.

168. The system of embodiment 147, in which the target atom messaging object datastructure includes a target user identifier and an atom messaging object datastructure identifier.

169. The system of embodiment 168, in which the atom messaging object datastructure identifier is a message identifier, and the atom action message is associated with a Like action.

170. An atom action message delivering processor-implemented process, including processing processor-executable instructions via at least one processor from a component collection stored in at least one memory, the component collection storage structured with processor-executable instructions comprising:

obtain, via the at least one processor, by a source node corresponding to a user, an atom action message associated with the user, in which the atom action message is structured to include a set of message parameters that specify a target atom messaging object datastructure;

determine, via the at least one processor, an identifier of a target node corresponding to the target atom messaging object datastructure;

parse, via the at least one processor, a message security settings datastructure to determine number of shards and number of hops to utilize to send the atom action message to the target node;

fracture, via the at least one processor, the atom action message into the determined number of shards, each shard comprising encrypted data that is decryptable by the target atom messaging object datastructure;

generate, via the at least one processor, a message shard datastructure for each shard, a respective message shard datastructure for a respective shard structured to include: an identifier of the source node, the identifier of the target node, encrypted data for the respective shard, a determined number of hops to make before delivering the respective message shard datastructure to the target node;

determine, via the at least one processor, for each generated message shard datastructure, a first hop intermediate node to utilize for delivering a respective message shard datastructure to the target node; and send, via the at least one processor, for each generated message shard datastructure, a respective message shard datastructure to the respective first hop intermediate node determined for the respective message shard datastructure.

171. The process of embodiment 170, in which the target atom messaging object datastructure comprises a set of constituent atom messaging object datastructures, and in which the atom action message is sent separately to each constituent atom messaging object datastructure in the set of constituent atom messaging object datastructures.

172. The process of embodiment 170, in which the identifier of the target node is a network address associated with the target node.

173. The process of embodiment 170, in which the message security settings datastructure is structured to include a function that specifies how to calculate the number of shards to utilize for the atom action message and for each generated message shard datastructure.

174. The process of embodiment 170, in which the message security settings datastructure is structured to include a function that specifies how to calculate the number of hops to utilize for each generated message shard datastructure.

175. The process of embodiment 170, in which the instructions to fracture the atom action message into the determined number of shards are structured as instructions to encrypt the atom action message and to fracture the encrypted atom action message into the determined number of shards.

176. The process of embodiment 170, in which the instructions to fracture the atom action message into the determined number of shards are structured as instructions to fracture the atom action message into the determined number of shards and to encrypt each shard separately.

177. The process of embodiment 170, in which encrypted data for a shard is encrypted using one of: a public key of the target atom messaging object datastructure, a symmetric key pre-shared with the target atom messaging object datastructure using public-key cryptography.

178. The process of embodiment 177, in which encrypted data for a shard is further encrypted using an expiring key.

179. The process of embodiment 170, in which a first hop intermediate node to utilize for delivering a message shard datastructure to the target node is predetermined by a delivery path specified by the user.

180. The process of embodiment 170, in which a first hop intermediate node to utilize for delivering a message shard datastructure to the target node is selected randomly.

181. The process of embodiment 170, in which a first hop intermediate node to utilize for delivering a message shard datastructure to the target node is selected based on performance characteristics.

182. The process of embodiment 170, in which the component collection storage is further structured with processor-executable instructions, comprising:

obtain, via the at least one processor, by an intermediate node, a message shard datastructure addressed to the target node;

update, via the at least one processor, remaining hops count associated with the obtained message shard datastructure, in which the remaining hops count is decreased by one;

determine, via the at least one processor, a next hop node to utilize for delivering the obtained message shard datastructure to the target node; and send, via the at least one processor, the obtained message shard datastructure to the determined next hop node.

183. The process of embodiment 182, in which the component collection storage is further structured with processor-executable instructions, comprising:
update, via the at least one processor, a source node identifier associated with the obtained message shard datastructure, in which the source node identifier is set to an identifier of the intermediate node.

184. The process of embodiment 182, in which the determined next hop node is one of: another intermediate node, the target node.

185. The process of embodiment 170, in which the component collection storage is further structured with processor-executable instructions, comprising:
obtain, via the at least one processor, by an intermediate node, a message shard datastructure addressed to the target node;
update, via the at least one processor, remaining hops count associated with the obtained message shard datastructure, in which the remaining hops count is decreased by one;
parse, via the at least one processor, a shard security settings datastructure to determine number of new shards to utilize to send the obtained message shard datastructure to the target node;
fracture, via the at least one processor, the obtained message shard datastructure into the determined number of new shards;
generate, via the at least one processor, a new message shard datastructure for each new shard; determine, via the at least one processor, for each new generated message shard datastructure, a next hop node to utilize for delivering a respective new message shard datastructure to the target node; and
send, via the at least one processor, for each new generated message shard datastructure, a respective new message shard datastructure to the respective next hop node determined for the respective new message shard datastructure.

186. The process of embodiment 170, in which the component collection storage is further structured with processor-executable instructions, comprising:
obtain, via the at least one processor, by the target node, a message shard datastructure addressed to the target node;
determine, via the at least one processor, a message identifier associated with the obtained message shard datastructure;
obtain, via the at least one processor, other message shard datastructures associated with the message identifier;
reconstruct, via the at least one processor, the atom action message using the obtained message shard datastructures; and
execute, via the at least one processor, an atom action associated with the atom action message.

187. *The process of embodiment 186, in which messages and shard counts are increased by specified redundancy values, and
in which the instructions to reconstruct the atom action message are structured as instructions to decrypt an encrypted atom action message reconstructed from the obtained message shard datastructures, in which any missing shards may be obtained from nodes hosting redundant versions of the messages and shards.

188. The process of embodiment 187, in which the encrypted atom action message is decrypted using one of: a private key of the target atom messaging object datastructure, a symmetric key pre-shared with the target atom messaging object datastructure using public-key cryptography.

189. The process of embodiment 187, in which the encrypted atom action message is decrypted using an expiring key.

190. The process of embodiment 170, in which the target atom messaging object datastructure is a node.

191. The process of embodiment 170, in which the target atom messaging object datastructure includes a target user identifier and an atom messaging object datastructure identifier.

192. The process of embodiment 191, in which the atom messaging object datastructure identifier is a message identifier, and the atom action message is associated with a Like action.

201. A proof-of-production crypto currency provisioning apparatus, comprising: at least one memory;
a component collection stored in the at least one memory;
at least one processor disposed in communication with the at least one memory, the at least one processor executing processor-executable instructions from the component collection, the component collection storage structured with processor-executable instructions, comprising:
obtain, via the at least one processor, a request to generate new crypto currency unit datastructure, associated with a blockchain, subject to proof of platform production;
determine, via the at least one processor, total available crypto currency units associated with the blockchain;
determine, via the at least one processor, an overall production difference for a set of resources between a current resource production evaluation period and a previous resource production evaluation period;
calculate, via the at least one processor, an amount of new crypto currency units to generate as a fraction of the total available crypto currency units corresponding to the overall production difference for the set of resources;
select, via the at least one processor, a resource production registration datastructure to evaluate; determine, via the at least one processor, a blockchain address corresponding to resource production verification data for the selected resource production registration datastructure;
obtain, via the at least one processor, resource production verification using the resource production verification data at the blockchain address;
calculate, via the at least one processor, a crypto currency units value of produced resources associated with the selected resource production registration datastructure as a fraction of the amount of new crypto currency units to generate corresponding to the fraction of the overall production difference attributable to the produced resources; and
provision, via the at least one processor, new crypto currency unit datastructures corresponding to the calculated crypto currency units value to an atom messaging object datastructure associated with the selected resource production registration datastructure.

202. The apparatus of embodiment 201, in which the instructions to determine the total available crypto currency units are structured as instructions to:
analyze the blockchain to determine blockchain addresses associated with crypto currency unit datastructures that have not been spent or garbage collected; and sum crypto currency units amounts associated with the determined blockchain addresses.

203. The apparatus of embodiment 201, in which a resource in the set of resources is any of: storage, bandwidth, processing power, energy, uptime, latency, number of processed transactions, terms.

204. The apparatus of embodiment 201, in which the overall production difference for the set of resources is determined as a weighted average of production differences of individual resources in the set of resources.

205. The apparatus of embodiment 201, in which the calculated amount of new crypto currency units to generate is further increased by an amount corresponding to total amount of garbage collected crypto currency units that have not been replaced yet.

206. The apparatus of embodiment 205, in which the component collection storage is further structured with processor-executable instructions, comprising:
 identify, via the at least one processor, a set of crypto currency identifiers associated with crypto currency unit datastructures exceeding an inactivity threshold time period;
 determine, via the at least one processor, a subset of the set of crypto currency identifiers for which a dispute period for filing a garbage collection dispute has expired; and
 mark, via the at least one processor, crypto currency unit datastructures associated with the determined subset as garbage collected.

207. The apparatus of embodiment 206, in which a crypto currency identifier in the set of crypto currency identifiers identifies a crypto currency unit datastructure.

208. The apparatus of embodiment 206, in which a crypto currency identifier in the set of crypto currency identifiers identifies the last transaction involving a set of crypto currency unit datastructures.

209. The apparatus of embodiment 206, in which receipt of a garbage collection dispute prior to expiration of a dispute period prevents associated crypto currency unit datastructures from being marked as garbage collected.

210. The apparatus of embodiment 201, in which the resource production verification data corresponds to an output of a smart contract stored on the blockchain at the blockchain address.

211. The apparatus of embodiment 210, in which the smart contract is structured to provide resource production verification using oracle data from an oracle associated with the smart contract.

212. The apparatus of embodiment 210, in which the smart contract comprises a set of smart contract portions, each smart contract portion in the set of smart contract portions corresponding to a resource and production characteristics associated with the resource allocated by a user associated with the atom messaging object datastructure.

213. The apparatus of embodiment 201, in which the selected resource production registration datastructure is cryptographically signed by a user associated with the atom messaging object datastructure.

214. The apparatus of embodiment 201, in which the calculated crypto currency units value is provisioned to the atom messaging object datastructure by one of: central node, SuperNode, consensus of nodes, producer node associated with the atom messaging object datastructure.

215. The apparatus of embodiment 201, in which an atom messaging object datastructure is any of: owners, conversation containers, content, hybrid container content, resources.

216. The apparatus of embodiment 215, in which the owners atom messaging object datastructure includes atom messaging object datastructures including any of: account, alias, people; in which the conversation containers atom messaging object datastructure includes atom messaging object datastructures including any of: channel, following, lurk, organization, team, group, 1-to-1, topic, category, thread, hybrids; in which the content atom messaging object datastructure includes atom messaging object datastructures including any of: message, media, link, attributes, interests, terms; in which the hybrid container content atom messaging object datastructure includes atom messaging object datastructures including any of: project, goal, milestone, events, tasks, attribute; in which the resources atom messaging object datastructure includes atom messaging object datastructures including any of: crypto currency, storage, bandwidth, uptime, latency, greater geographic interconnectivity access, greater topological interconnectivity access, lower likelihood of intervention of services, fewer outages.

217. The apparatus of embodiment 201, in which the atom messaging object datastructure is a user account.

218. A proof-of-production crypto currency provisioning processor-readable, non-transient medium, the medium storing a component collection, the component collection storage structured with processor-executable instructions comprising:
 obtain, via the at least one processor, a request to generate new crypto currency unit datastructure, associated with a blockchain, subject to proof of platform production;
 determine, via the at least one processor, total available crypto currency units associated with the blockchain;
 determine, via the at least one processor, an overall production difference for a set of resources between a current resource production evaluation period and a previous resource production evaluation period;
 calculate, via the at least one processor, an amount of new crypto currency units to generate as a fraction of the total available crypto currency units corresponding to the overall production difference for the set of resources;
 select, via the at least one processor, a resource production registration datastructure to evaluate;
 determine, via the at least one processor, a blockchain address corresponding to resource production verification data for the selected resource production registration datastructure;
 obtain, via the at least one processor, resource production verification using the resource production verification data at the blockchain address;
 calculate, via the at least one processor, a crypto currency units value of produced resources associated with the selected resource production registration datastructure as a fraction of the amount of new crypto currency units to generate corresponding to the fraction of the overall production difference attributable to the produced resources; and
 provision, via the at least one processor, new crypto currency unit datastructures corresponding to the calculated crypto currency units value to an atom messaging object datastructure associated with the selected resource production registration datastructure.

219. The medium of embodiment 218, in which the instructions to determine the total available crypto currency units are structured as instructions to:
 analyze the blockchain to determine blockchain addresses associated with crypto currency unit datastructures that have not been spent or garbage collected; and sum crypto currency units amounts associated with the determined blockchain addresses.

220. The medium of embodiment 218, in which a resource in the set of resources is any of: storage, bandwidth, processing power, energy, uptime, latency, number of processed transactions, terms.

221. The medium of embodiment 218, in which the overall production difference for the set of resources is determined as a weighted average of production differences of individual resources in the set of resources.

222. The medium of embodiment 218, in which the calculated amount of new crypto currency units to generate is further increased by an amount corresponding to total amount of garbage collected crypto currency units that have not been replaced yet.

223. The medium of embodiment 222, in which the component collection storage is further structured with processor-executable instructions, comprising:
  identify, via the at least one processor, a set of crypto currency identifiers associated with crypto currency unit datastructures exceeding an inactivity threshold time period;
  determine, via the at least one processor, a subset of the set of crypto currency identifiers for which a dispute period for filing a garbage collection dispute has expired; and
  mark, via the at least one processor, crypto currency unit datastructures associated with the determined subset as garbage collected.

224. The medium of embodiment 223, in which a crypto currency identifier in the set of crypto currency identifiers identifies a crypto currency unit datastructure.

225. The medium of embodiment 223, in which a crypto currency identifier in the set of crypto currency identifiers identifies the last transaction involving a set of crypto currency unit datastructures.

226. The medium of embodiment 223, in which receipt of a garbage collection dispute prior to expiration of a dispute period prevents associated crypto currency unit datastructures from being marked as garbage collected.

227. The medium of embodiment 218, in which the resource production verification data corresponds to an output of a smart contract stored on the blockchain at the blockchain address.

228. The medium of embodiment 227, in which the smart contract is structured to provide resource production verification using oracle data from an oracle associated with the smart contract.

229. The medium of embodiment 227, in which the smart contract comprises a set of smart contract portions, each smart contract portion in the set of smart contract portions corresponding to a resource and production characteristics associated with the resource allocated by a user associated with the atom messaging object datastructure.

230. The medium of embodiment 218, in which the selected resource production registration datastructure is cryptographically signed by a user associated with the atom messaging object datastructure.

231. The medium of embodiment 218, in which the calculated crypto currency units value is provisioned to the atom messaging object datastructure by one of: central node, SuperNode, consensus of nodes, producer node associated with the atom messaging object datastructure.

232. The medium of embodiment 218, in which an atom messaging object datastructure is any of: owners, conversation containers, content, hybrid container content, resources.

233. The medium of embodiment 232, in which the owners atom messaging object datastructure includes atom messaging object datastructures including any of: account, alias, people; in which the conversation containers atom messaging object datastructure includes atom messaging object datastructures including any of: channel, following, lurk, organization, team, group, 1-to-1, topic, category, thread, hybrids; in which the content atom messaging object datastructure includes atom messaging object datastructures including any of: message, media, link, attributes, interests, terms; in which the hybrid container content atom messaging object datastructure includes atom messaging object datastructures including any of: project, goal, milestone, events, tasks, attribute; in which the resources atom messaging object datastructure includes atom messaging object datastructures including any of: crypto currency, storage, bandwidth, uptime, latency, greater geographic interconnectivity access, greater topological interconnectivity access, lower likelihood of intervention of services, fewer outages.

234. The medium of embodiment 218, in which the atom messaging object datastructure is a user account.

235. A proof-of-production crypto currency provisioning processor-implemented system, comprising: means to store a component collection;
  means to process processor-executable instructions from the component collection, the component collection storage structured with processor-executable instructions including: obtain, via the at least one processor, a request to generate new crypto currency unit datastructure, associated with a blockchain, subject to proof of platform production;
  determine, via the at least one processor, total available crypto currency units associated with the blockchain;
  determine, via the at least one processor, an overall production difference for a set of resources between a current resource production evaluation period and a previous resource production evaluation period;
  calculate, via the at least one processor, an amount of new crypto currency units to generate as a fraction of the total available crypto currency units corresponding to the overall production difference for the set of resources;
  select, via the at least one processor, a resource production registration datastructure to evaluate;
  determine, via the at least one processor, a blockchain address corresponding to resource production verification data for the selected resource production registration datastructure;
  obtain, via the at least one processor, resource production verification using the resource production verification data at the blockchain address;
  calculate, via the at least one processor, a crypto currency units value of produced resources associated with the selected resource production registration datastructure as a fraction of the amount of new crypto currency units to generate corresponding to the fraction of the overall production difference attributable to the produced resources; and
  provision, via the at least one processor, new crypto currency unit datastructures corresponding to the calculated crypto currency units value to an atom messaging object datastructure associated with the selected resource production registration datastructure.

236. The system of embodiment 235, in which the instructions to determine the total available crypto currency units are structured as instructions to:
analyze the blockchain to determine blockchain addresses associated with crypto currency unit datastructures that have not been spent or garbage collected; and sum crypto currency units amounts associated with the determined blockchain addresses.

237. The system of embodiment 235, in which a resource in the set of resources is any of: storage, bandwidth, processing power, energy, uptime, latency, number of processed transactions, terms.

238. The system of embodiment 235, in which the overall production difference for the set of resources is determined as a weighted average of production differences of individual resources in the set of resources.

239. The system of embodiment 235, in which the calculated amount of new crypto currency units to generate is further increased by an amount corresponding to total amount of garbage collected crypto currency units that have not been replaced yet.

240. The system of embodiment 239, in which the component collection storage is further structured with processor-executable instructions, comprising:
identify, via the at least one processor, a set of crypto currency identifiers associated with crypto currency unit datastructures exceeding an inactivity threshold time period;
determine, via the at least one processor, a subset of the set of crypto currency identifiers for which a dispute period for filing a garbage collection dispute has expired; and
mark, via the at least one processor, crypto currency unit datastructures associated with the determined subset as garbage collected.

241. The system of embodiment 240, in which a crypto currency identifier in the set of crypto currency identifiers identifies a crypto currency unit datastructure.

242. The system of embodiment 240, in which a crypto currency identifier in the set of crypto currency identifiers identifies the last transaction involving a set of crypto currency unit datastructures.

243. The system of embodiment 240, in which receipt of a garbage collection dispute prior to expiration of a dispute period prevents associated crypto currency unit datastructures from being marked as garbage collected.

244. The system of embodiment 235, in which the resource production verification data corresponds to an output of a smart contract stored on the blockchain at the blockchain address.

245. The system of embodiment 244, in which the smart contract is structured to provide resource production verification using oracle data from an oracle associated with the smart contract.

246. The system of embodiment 244, in which the smart contract comprises a set of smart contract portions, each smart contract portion in the set of smart contract portions corresponding to a resource and production characteristics associated with the resource allocated by a user associated with the atom messaging object datastructure.

247. The system of embodiment 235, in which the selected resource production registration datastructure is cryptographically signed by a user associated with the atom messaging object datastructure.

248. The system of embodiment 235, in which the calculated crypto currency units value is provisioned to the atom messaging object datastructure by one of: central node, SuperNode, consensus of nodes, producer node associated with the atom messaging object datastructure.

249. The system of embodiment 235, in which an atom messaging object datastructure is any of: owners, conversation containers, content, hybrid container content, resources.

250. The system of embodiment 249, in which the owners atom messaging object datastructure includes atom messaging object datastructures including any of: account, alias, people; in which the conversation containers atom messaging object datastructure includes atom messaging object datastructures including any of: channel, following, lurk, organization, team, group, 1-to-1, topic, category, thread, hybrids; in which the content atom messaging object datastructure includes atom messaging object datastructures including any of: message, media, link, attributes, interests, terms; in which the hybrid container content atom messaging object datastructure includes atom messaging object datastructures including any of: project, goal, milestone, events, tasks, attribute; in which the resources atom messaging object datastructure includes atom messaging object datastructures including any of: crypto currency, storage, bandwidth, uptime, latency, greater geographic interconnectivity access, greater topological interconnectivity access, lower likelihood of intervention of services, fewer outages.

251. The system of embodiment 235, in which the atom messaging object datastructure is a user account.

252. A proof-of-production crypto currency provisioning processor-implemented process, including processing processor-executable instructions via at least one processor from a component collection stored in at least one memory, the component collection storage structured with processor-executable instructions comprising:
obtain, via the at least one processor, a request to generate new crypto currency unit datastructure, associated with a blockchain, subject to proof of platform production;
determine, via the at least one processor, total available crypto currency units associated with the blockchain;
determine, via the at least one processor, an overall production difference for a set of resources between a current resource production evaluation period and a previous resource production evaluation period;
calculate, via the at least one processor, an amount of new crypto currency units to generate as a fraction of the total available crypto currency units corresponding to the overall production difference for the set of resources;
select, via the at least one processor, a resource production registration datastructure to evaluate;
determine, via the at least one processor, a blockchain address corresponding to resource production verification data for the selected resource production registration datastructure;
obtain, via the at least one processor, resource production verification using the resource production verification data at the blockchain address;
calculate, via the at least one processor, a crypto currency units value of produced resources associated with the selected resource production registration datastructure as a fraction of the amount of new crypto currency units to generate corresponding to the fraction of the overall production difference attributable to the produced resources; and
provision, via the at least one processor, new crypto currency unit datastructures corresponding to the calculated crypto currency units value to an atom messaging object datastructure associated with the selected resource production registration datastructure.

253. The process of embodiment 252, in which the instructions to determine the total available crypto currency units are structured as instructions to:
  analyze the blockchain to determine blockchain addresses associated with crypto currency unit datastructures that have not been spent or garbage collected; and
  sum crypto currency units amounts associated with the determined blockchain addresses.

254. The process of embodiment 252, in which a resource in the set of resources is any of: storage, bandwidth, processing power, energy, uptime, latency, number of processed transactions, terms.

255. The process of embodiment 252, in which the overall production difference for the set of resources is determined as a weighted average of production differences of individual resources in the set of resources.

256. The process of embodiment 252, in which the calculated amount of new crypto currency units to generate is further increased by an amount corresponding to total amount of garbage collected crypto currency units that have not been replaced yet.

257. The process of embodiment 256, in which the component collection storage is further structured with processor-executable instructions, comprising:
  identify, via the at least one processor, a set of crypto currency identifiers associated with crypto currency unit datastructures exceeding an inactivity threshold time period;
  determine, via the at least one processor, a subset of the set of crypto currency identifiers for which a dispute period for filing a garbage collection dispute has expired; and
  mark, via the at least one processor, crypto currency unit datastructures associated with the determined subset as garbage collected.

258. The process of embodiment 257, in which a crypto currency identifier in the set of crypto currency identifiers identifies a crypto currency unit datastructure.

259. The process of embodiment 257, in which a crypto currency identifier in the set of crypto currency identifiers identifies the last transaction involving a set of crypto currency unit datastructures.

260. The process of embodiment 257, in which receipt of a garbage collection dispute prior to expiration of a dispute period prevents associated crypto currency unit datastructures from being marked as garbage collected.

261. The process of embodiment 252, in which the resource production verification data corresponds to an output of a smart contract stored on the blockchain at the blockchain address.

262. The process of embodiment 261, in which the smart contract is structured to provide resource production verification using oracle data from an oracle associated with the smart contract.

263. The process of embodiment 261, in which the smart contract comprises a set of smart contract portions, each smart contract portion in the set of smart contract portions corresponding to a resource and production characteristics associated with the resource allocated by a user associated with the atom messaging object datastructure.

264. The process of embodiment 252, in which the selected resource production registration datastructure is cryptographically signed by a user associated with the atom messaging object datastructure.

265. The process of embodiment 252, in which the calculated crypto currency units value is provisioned to the atom messaging object datastructure by one of: central node, SuperNode, consensus of nodes, producer node associated with the atom messaging object datastructure.

266. The process of embodiment 252, in which an atom messaging object datastructure is any of: owners, conversation containers, content, hybrid container content, resources.

267. The process of embodiment 266, in which the owners atom messaging object datastructure includes atom messaging object datastructures including any of: account, alias, people; in which the conversation containers atom messaging object datastructure includes atom messaging object datastructures including any of: channel, following, lurk, organization, team, group, 1-to-1, topic, category, thread, hybrids; in which the content atom messaging object datastructure includes atom messaging object datastructures including any of: message, media, link, attributes, interests, terms; in which the hybrid container content atom messaging object datastructure includes atom messaging object datastructures including any of: project, goal, milestone, events, tasks, attribute; in which the resources atom messaging object datastructure includes atom messaging object datastructures including any of: crypto currency, storage, bandwidth, uptime, latency, greater geographic interconnectivity access, greater topological interconnectivity access, lower likelihood of intervention of services, fewer outages.

268. The process of embodiment 252, in which the atom messaging object datastructure is a user account.

PSSS Controller

FIG. 36 shows a block diagram illustrating non-limiting, example embodiments of a PSSS controller. In this embodiment, the PSSS controller 3601 may serve to aggregate, process, store, search, serve, identify, instruct, generate, match, and/or facilitate interactions with a computer through cryptographic distributed communications technologies, and/or other related data.

Users, which may be people and/or other systems, may engage information technology systems (e.g., computers) to facilitate information processing. In turn, computers employ processors to process information; such processors 3603 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 3629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PSSS controller 3601 may be connected to and/or communicate with entities such as, but not limited to: one or more users from peripheral devices 3612 (e.g., user input devices 3611); an optional cryptographic processor device 3628; and/or a communications network 3613.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The PSSS controller 3601 may be based on computer systems that may comprise, but are not limited to, components such as: a computer systemization 3602 connected to memory 3629.

Computer Systemization

A computer systemization 3602 may comprise a clock 3630, central processing unit ("CPU(s)" and/or "processor(s)" (these terms are used interchangeably throughout the disclosure unless noted to the contrary)) 3603, a memory 3629 (e.g., a read only memory (ROM) 3606, a random access memory (RAM) 3605, etc.), and/or an interface bus 3607, and most frequently, although not necessarily, are all interconnected and/or communicating through a system bus 3604 on one or more (mother)board(s) 3602 having conductive and/or otherwise transportive circuit pathways through which instructions (e.g., binary encoded signals) may travel to effectuate communications, operations, storage, etc. The computer systemization may be connected to a power source 3686; e.g., optionally the power source may be internal. Optionally, a cryptographic processor 3626 may be connected to the system bus.

In another embodiment, the cryptographic processor, transceivers (e.g., ICs) 3674, and/or sensor array (e.g., accelerometer, altimeter, ambient light, barometer, global positioning system (GPS) (thereby allowing PSSS controller to determine its location), gyroscope, magnetometer, pedometer, proximity, ultra-violet sensor, etc.) 3673 may be connected as either internal and/or external peripheral devices 3612 via the interface bus I/O 3608 (not pictured) and/or directly via the interface bus 3607. In turn, the transceivers may be connected to antenna(s) 3675, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3629 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's®80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the PSSS controller and beyond through various interfaces. Should processing requirements dictate a greater amount speed and/or capacity, distributed processors (e.g., see Distributed PSSS below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the PSSS may be achieved by implementing a microcontroller such as CAST's® R8051XC2 microcontroller; Intel's® MCS 51 (i.e., 8051 microcontroller); and/or the like. Also, to implement certain features of the PSSS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the PSSS component collection (distributed or otherwise) and/or features may be implemented via the microprocessor and/or via embedded components; e.g., via ASIC, coprocessor, DSP, FPGA, and/ or the like. Alternately, some implementations of the PSSS may be implemented with embedded components that are configured and used to achieve a variety of features or signal processing.

Depending on the particular implementation, the embedded components may include software solutions, hardware solutions, and/or some combination of both hardware/software solutions. For example, PSSS features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the PSSS features. A hierarchy of programmable interconnects allow logic blocks to be interconnected as needed by the PSSS system designer/ administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the PSSS may be developed on FPGAs and then migrated into a fixed version that more resembles ASIC implementations. Alternate or coordinating implementations may migrate PSSS controller features to a final ASIC instead of or in addition to FPGAs. Depending on the implementation all of the aforementioned embedded components and microprocessors may be considered the "CPU" and/or "processor" for the PSSS.

Power Source

The power source 3686 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3686 is connected to at least one of the interconnected subsequent components of the PSSS thereby providing an electric current to all subsequent components. In one example, the power source 3686 is connected to the system bus component 3604. In an alternative embodiment, an outside power source 3686 is provided through a connection across the I/O 3608 interface. For example, Ethernet (with power on Ethernet), IEEE 1394, USB and/or the like connections carry both data and power across the connection and is therefore a suitable source of power.

Interface Adapters

Interface bus(ses) 3607 may accept, connect, and/or communicate to a number of interface adapters, variously although not necessarily in the form of adapter cards, such as but not limited to: input output interfaces (I/O) 3608, storage interfaces 3609, network interfaces 3610, and/or the like. Optionally, cryptographic processor interfaces 3627 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3609 may accept, communicate, and/or connect to a number of storage devices such as, but not limited to: (removable) storage devices 3614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 3610 may accept, communicate, and/ or connect to a communications network 3613. Through a communications network 3613, the PSSS controller is accessible through remote clients 3633b (e.g., computers with web browsers) by users 3633a. Network interfaces may employ connection protocols such as, but not limited to: direct connect, Ethernet (thick, thin, twisted pair 10/100/ 1000/10000 Base T, and/or the like), Token Ring, wireless connection such as IEEE 802.11a-x, and/or the like. Should processing requirements dictate a greater amount speed and/or capacity, distributed network controllers (e.g., see Distributed PSSS below), architectures may similarly be employed to pool, load balance, and/or otherwise decrease/increase the communicative bandwidth required by the PSSS controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 3610 may be used to engage with various communications network types 3613. For example, multiple network interfaces may be employed to allow for the communication over broadcast, multicast, and/or unicast networks.

Input Output interfaces (I/O) 3608 may accept, communicate, and/or connect to user, peripheral devices 3612 (e.g., input devices 3611), cryptographic processor devices 3628, and/or the like. I/O may employ connection protocols such as, but not limited to: audio: analog, digital, monaural, RCA, stereo, and/or the like; data: Apple Desktop Bus (ADB), IEEE 1394*a-b*, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 3612 may be connected and/or communicate to I/O and/or other facilities of the like such as network interfaces, storage interfaces, directly to the interface bus, system bus, the CPU, and/or the like. Peripheral devices may be external, internal and/or part of the PSSS controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 3611 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the PSSS controller may be embodied as an embedded, dedicated, and/or monitor-less (i.e., headless) device, and access may be provided over a network interface connection.

Cryptographic units such as, but not limited to, microcontrollers, processors 3626, interfaces 3627, and/or devices 3628 may be attached, and/or communicate with the PSSS controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 3629. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the PSSS controller and/or a computer systemization may employ various forms of memory 3629. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 3629 will include ROM 3606, RAM 3605, and a storage device 3614. A storage device 3614 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 3629 may contain a collection of processor-executable application/library/program and/or database components (e.g., including processor-executable instructions) and/or data such as, but not limited to: operating system component(s) 3615 (operating system); information server component(s) 3616 (information server); user interface component(s) 3617 (user interface); Web browser component(s) 3618 (Web browser); database(s) 3619; mail server component(s) 3621; mail client component(s) 3622; cryptographic server component(s) 3620 (cryptographic server); the PSSS component(s) 3635 (e.g., which may include AAP, AAMSG, MSP, AAMP, RPA, RPR, CCG 3641-3653, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 3614, they may also be loaded and/or stored in memory such as: cache, peripheral devices, processor registers, RAM, remote storage facilities through a communications network, ROM, various forms of memory, and/or the like.

Operating System

The operating system component 3615 is an executable program component facilitating the operation of the PSSS controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9@; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)@, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the PSSS controller to communicate with other entities through a communications network 3613. Various communication protocols may be used by the PSSS controller as a subcarrier transport mechanism for interaction, such as, but not limited to: multicast, TCP/IP, UDP, unicast, and/or the like.

Information Server

An information server component 3616 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo!Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PSSS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PSSS database 3619, operating systems, other program components, user interfaces, Web browsers, and/or the like.

Access to the PSSS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PSSS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the PSSS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)@(i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 3617 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3618 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the PSSS enabled nodes. The combined application may be nugatory on systems employing Web browsers.

Mail Server

A mail server component 3621 is a stored program component that is executed by a CPU 3603. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts,Java,JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the PSSS. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the PSSS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3622 is a stored program component that is executed by a CPU 3603. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like.

Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3620 is a stored program component that is executed by a CPU 3603, cryptographic processor 3626, cryptographic processor interface 3627, cryptographic processor device 3628, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the PSSS may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the PSSS component to engage in secure transactions if so desired. The cryptographic component facilitates the secure accessing of resources on the PSSS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The PSSS Database

The PSSS database component 3619 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the PSSS database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the PSSS database is implemented as a data-structure, the use of the PSSS database 3619 may be integrated into another component such as the PSSS component 3635. Also, the database may be implemented as a mix of data structures, objects, programs, relational structures, scripts, and/or the like. Databases may be consolidated and/or distributed in countless variations (e.g., see Distributed PSSS below). Portions of databases, e.g., tables, may be exported and/or imported and thus decentralized and/or integrated.

In one embodiment, the database component 3619 includes several tables representative of the schema, tables, structures, keys, entities and relationships of the described database 3619*a-z*:

An accounts table 3619*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountUR- LAccessCode, accountPortNo, accountAuthorizationCode, accountAccessPrivileges, accountPreferences, accountRestrictions, and/or the like;

A users table 3619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, reputationScore, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a PSSS);

An devices table 3619c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 3619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 3619e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetGarbageCollected, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 3619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 3619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 3619h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 3619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An retentionSchedule table 3619j includes fields such as, but not limited to: retentionScheduleID, assetID, deviceID, userID, accountID, transactionID, delegateNodeID, blockChainID, retentionType, retentionStart, retentionLength, retentionEnd, retentionToll, retentionKeyID, and/or the like;

An delegateNode table 3619k includes fields such as, but not limited to: delegateNodeID, transactionID, accountID, assetIDs, deviceIDs, paymentIDs, transactionIDs, userID, delegateAddress, retentionKey, delegateAdditionalAlternativeNodeID, apportionmentAmount, recombineKey, and/or the like;

An blockChainEntry table 3619l includes fields such as, but not limited to: blockchainID, delegateNodeID, transactionID, accountID, assetIDs, deviceIDs, paymentIDs, transactionIDs, userID, delegateNodeID, blockchainPayload, and/or the like;

An retentionKey table 3619*m* includes fields such as, but not limited to: retentionKeyID, retentionScheduleID, assetID, deviceID, userID, accountID, transactionID, delegateNodeID, blockChainID, privateKey, privateKeyLocation, publicKey, publicKeyLocation, encryptionType, and/or the like;

An atoms table 3619*n* includes fields such as, but not limited to: atomID, atomType, atomTermsID, atomTermsAddress, atomCommonActions, atomEnhancedActions, atomParameters, atomConstituents, and/or the like;

An atomTerms table 3619*o* includes fields such as, but not limited to: atomTermsID, atomID, specifiedTerms, userID, transactionID, blockchainID, and/or the like;

A messages table 3619*p* includes fields such as, but not limited to including all table values expressed in FIGS. 10A-10C, including any of: messageID, messageShardID, sourceNodeID, targetNodeID, atomID, messageDateTime, messageEncryptedData, shardEncryptedData, numberOfHops, numberOfShards, transactionID, userID, blockchainID, deviceID, timeStamps, termsID, dataPayload, linkSetPayload, instantiationHash, hybridIDs, 1to 1_IDs, accountIDs, aliasIDs, categoryIDs, channelIDs, conversationIDs, eventsIDs, followingIDs, groupIDs, mediaLinkIDs, messageIDs, peopleIDs, projectIDs, taskIDs, threadIDs, topicIDs, targetID, verifiedStatementHash, dataSize, nodeList, energyValue, commerceValue, and/or the like;

A productionRegistrations table 3619*q* includes fields such as, but not limited to: nodeID, userID, productionResource, productionResourceCharacteristics, productionRegistrationSignature, transactionID, blockChainID, completionTimeframe, and/or the like;

A market_data table 3619*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the PSSS database may interact with other database systems. For example, employing a distributed database system, queries and data access by search PSSS component may treat the combination of the PSSS database, an integrated data security layer database as a single database entity (e.g., see Distributed PSSS below).

In one embodiment, user programs may contain various user interface primitives, which may serve to update the PSSS. Also, various accounts may require custom database tables depending upon the environments and the types of clients the PSSS may need to serve. It should be noted that any unique fields may be designated as a key field throughout. In an alternative embodiment, these tables have been decentralized into their own databases and their respective database controllers (i.e., individual database controllers for each of the above tables). The PSSS may also be configured to distribute the databases over several computer systemizations and/or storage devices. Similarly, configurations of the decentralized database controllers may be varied by consolidating and/or distributing the various database components 3619*a-z*. The PSSS may be configured to keep track of various settings, inputs, and parameters via database controllers.

The PSSS database may communicate to and/or with other components in a component collection, including itself, and/or facilities of the like. Most frequently, the PSSS database communicates with the PSSS component, other program components, and/or the like. The database may contain, retain, and provide information regarding other nodes and data.

The PSSSs

The PSSS component 3635 is a stored program component that is executed by a CPU via stored instruction code configured to engage signals across conductive pathways of the CPU and ISICI controller components. In one embodiment, the PSSS component incorporates any and/or all combinations of the aspects of the PSSS that were discussed in the previous figures. As such, the PSSS affects accessing, obtaining and the provision of information, services, transactions, and/or the like across various communications networks.

The features and embodiments of the PSSS discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the PSSS's features and facilities, and in many cases reduce the costs, energy consumption/requirements, and extend the life of PSSS's underlying infrastructure; this has the added benefit of making the PSSS more reliable.

Similarly, many of the features and mechanisms are designed to be easier for users to use and access, thereby broadening the audience that may enjoy/employ and exploit the feature sets of the PSSS; such ease of use also helps to increase the reliability of the PSSS. In addition, the feature sets include heightened security as noted via the Cryptographic components 3620, 3626, 3628 and throughout, making access to the features and data more reliable and secure The PSSS transforms atom interaction mechanism actuations, atom action interaction mechanism actuations, message shard send request, resource production allocation indication inputs, via PSSS components (e.g., AAP, AAMSG, MSP, AAMP, RPA, RPR, CCG), into message shard acknowledgement response, user interface display, message shard acknowledgement response, crypto currency provision notification request outputs.

The PSSS component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the PSSS server employs a cryptographic server to encrypt and decrypt communications. The PSSS component may communicate to and/or with other components in a component collection, including itself, and/or facilities of the like. Most frequently, the PSSS component communicates with the PSSS database, operating systems, other program components, and/or the like. The PSSS may contain, communicate, generate, obtain, and/or provide program component, system, user, and/or data communications, requests, and/or responses.

Distributed PSSSs

The structure and/or operation of any of the PSSS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the PSSS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for PSSS controller and/or PSSS component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent.

The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the PSSS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
```

-continued

```
// create a server-side SSL socket, listen for/
accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in
1024 byte blocks until end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2rl/index.jsp?topic=/com.ibm.IBMDI.doc/referenceguide295.htm and other parser implementations:

http://publib.boulder.ibm.com/infocenter/tivihelp/v2rl/index.jsp?topic=/com.ibm.IBMDI.doc/referenceguide259.htm all of which are hereby expressly incorporated by reference.

In order to address various issues and advance the art, the entirety of this application for Privacy Secure Social Set Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a PSSS individual and/or enterprise user, database configuration and/or relational model, data type, data transmission and/or network framework, library, syntax structure, and/or the like, various embodiments of the PSSS, may be implemented that allow a great deal of flexibility and customization. For example, aspects of the PSSS may be adapted for file systems, data anonymization, inter-application communication and messaging, messaging, storage, chat applications, intercomputer messaging, API messaging, financial services, etc. While various embodiments and discussions of the PSSS have included cryptographic distributed communications, however, it is to be understood that the embodiments described herein may be readily configured and/or customized for a wide variety of other applications and/or implementations.

What is claimed is:

1. An atom action message generating apparatus, comprising:
   at least one memory;
   a component collection stored in the at least one memory;
   at least one processor disposed in communication with the at least one memory, the at least one processor executing processor-executable instructions from the component collection, the component collection storage structured with processor-executable instructions, comprising:
      obtain, via the at least one processor, an atom interaction interface mechanism initial actuation from a user;
      determine, via the at least one processor, an atom messaging object datastructure corresponding to the actuated atom interaction interface mechanism,
         in which the atom messaging object datastructure is instantiated from an atom messaging object type from a set of orthogonal atom messaging object types,
            in which each orthogonal atom messaging object type is operable on by a set of common atom actions;
      retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;
      determine, via the at least one processor, a set of allowed common atom actions, in which the set of allowed common atom actions includes common atom actions, from the set of common atom actions, allowed by the atom terms datastructure;
      generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;
      provide, via the at least one processor, the generated atom action interaction interface mechanisms in the set of atom action interaction interface mechanisms for display to the user
      obtain, via the at least one processor, an atom action interaction interface mechanism subsequent actuation from the user;
      determine, via the at least one processor, a performed atom action corresponding to the actuated atom action interaction interface mechanism; and
      generate, via the at least one processor, an atom action message corresponding to the performed atom action, in which the atom action message is structured to include a set of message parameters that specify the performed atom action.

2. The apparatus of claim 1, in which the atom messaging object type is any of: owners, conversation containers, content, hybrid container content, resources.

3. The apparatus of claim 2, in which the owners atom messaging object type includes atom messaging object types including any of: account, alias, people;
   in which the conversation containers atom messaging object type includes atom messaging object types including any of: channel, following, lurk, organization, team, group, 1-to-1, topic, category, thread, hybrids;
   in which the content atom messaging object type includes atom messaging object types including any of: message, media, link, attributes, interests, terms;
   in which the hybrid container content atom messaging object type includes atom messaging object types including any of: project, goal, milestone, events, tasks, attribute;
   in which the resources atom messaging object type includes atom messaging object types including any of: crypto currency, storage, bandwidth, uptime, latency, greater geographic interconnectivity access, greater topological interconnectivity access, lower likelihood of intervention of services, fewer outages.

4. The apparatus of claim 1, in which the instructions to retrieve the atom terms datastructure are structured as instructions to retrieve the atom terms datastructure from cache of a node associated with the user.

5. The apparatus of claim 1, in which the instructions to retrieve the atom terms datastructure are structured as instructions to:
   retrieve the atom terms datastructure from storage of a third party node; and
   verify validity of the atom terms datastructure, in which the validity of the atom terms datastructure is verified based on verification data obtained from a blockchain address associated with the atom terms datastructure.

6. The apparatus of claim 5, in which the third party node is a SuperNode providing caching for a plurality of unrelated users.

7. The apparatus of claim 5, in which the third party node hosts content associated with a specified address in a distributed file system, in which the specified address corresponds to the atom terms datastructure.

8. The apparatus of claim 5, in which the verification data comprises a hash of the atom terms datastructure.

9. The apparatus of claim 1, in which a term, in the set of terms, is a non-disclosure agreement pertaining to data associated with the atom messaging object datastructure.

10. The apparatus of claim 9, in which the atom messaging object datastructure is a public private group structured as a group that allows any user to join the group but prevents users from disclosing data shared with the group using the non-disclosure agreement.

11. The apparatus of claim 1, in which the set of terms is structured as allowed and disallowed atom actions for the atom messaging object datastructure.

12. The apparatus of claim 1, in which the component collection storage is further structured with processor-executable instructions, comprising:
   determine, via the at least one processor, a set of enhanced atom actions associated with the atom messaging object type;
   determine, via the at least one processor, a set of allowed enhanced atom actions, in which the set of allowed enhanced atom actions comprises enhanced atom actions, from the set of enhanced atom actions associated with the atom messaging object type, allowed by the atom terms datastructure; and
   generate, via the at least one processor, a second set of atom action interaction interface mechanisms, each atom action interaction interface mechanism in the second set of atom action interaction interface mechanisms corresponding to an allowed enhanced atom action from the set of allowed enhanced atom actions.

13. The apparatus of claim 1, in which the component collection storage is further structured with processor-executable instructions, comprising:
determine, via the at least one processor, a set of atom action parameters for the performed atom action, in which the atom action message is structured to include a set of message parameters that specify the determined set of atom action parameters.

14. The apparatus of claim 13, in which the component collection storage is further structured with processor-executable instructions, comprising:
verify, via the at least one processor, that the set of atom action parameters for the performed atom action is allowed by the atom terms datastructure.

15. The apparatus of claim 13, in which the set of atom action parameters for the performed atom action is structured to include a target atom messaging object datastructure.

16. The apparatus of claim 15, in which the component collection storage is further structured with processor-executable instructions, comprising:
send, via the at least one processor, the atom action message to the target atom messaging object datastructure.

17. The apparatus of claim 1, in which the atom terms datastructure is generated based on selections performed using a set of selection interface mechanisms, in which each selection interface mechanism in the set of selection interface mechanisms corresponds to a term.

18. The apparatus of claim 17, in which terms selected using the set of selection interface mechanisms are form filled into a legal agreement comprising the selected terms and into a plain language description of the selected terms.

19. The apparatus of claim 1, in which the component collection storage is further structured with processor-executable instructions, comprising:
provide, via the at least one processor, the atom action message for subsequent action by a node.

20. An atom action message generating processor-readable, non-transient medium, the medium storing a component collection, the component collection storage structured with processor-executable instructions comprising:
obtain, via the at least one processor, an atom interaction interface mechanism initial actuation from a user;
determine, via the at least one processor, an atom messaging object datastructure corresponding to the actuated atom interaction interface mechanism,
in which the atom messaging object datastructure is instantiated from an atom messaging object type from a set of orthogonal atom messaging object types,
in which each orthogonal atom messaging object type is operable on by a set of common atom actions;
retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;
determine, via the at least one processor, a set of allowed common atom actions, in which the set of allowed common atom actions includes common atom actions, from the set of common atom actions, allowed by the atom terms datastructure;
generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;
provide, via the at least one processor, the generated atom action interaction interface mechanisms in the set of atom action interaction interface mechanisms for display to the user
obtain, via the at least one processor, an atom action interaction interface mechanism subsequent actuation from the user;
determine, via the at least one processor, a performed atom action corresponding to the actuated atom action interaction interface mechanism; and
generate, via the at least one processor, an atom action message corresponding to the performed atom action, in which the atom action message is structured to include a set of message parameters that specify the performed atom action.

21. An atom action message generating processor-implemented system, comprising:
means to store a component collection;
means to process processor-executable instructions from the component collection, the component collection storage structured with processor-executable instructions including:
obtain, via the at least one processor, an atom interaction interface mechanism initial actuation from a user;
determine, via the at least one processor, an atom messaging object datastructure corresponding to the actuated atom interaction interface mechanism,
in which the atom messaging object datastructure is instantiated from an atom messaging object type from a set of orthogonal atom messaging object types,
in which each orthogonal atom messaging object type is operable on by a set of common atom actions;
retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;
determine, via the at least one processor, a set of allowed common atom actions, in which the set of allowed common atom actions includes common atom actions, from the set of common atom actions, allowed by the atom terms datastructure;
generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;
provide, via the at least one processor, the generated atom action interaction interface mechanisms in the set of atom action interaction interface mechanisms for display to the user
obtain, via the at least one processor, an atom action interaction interface mechanism subsequent actuation from the user;

determine, via the at least one processor, a performed atom action corresponding to the actuated atom action interaction interface mechanism; and generate, via the at least one processor, an atom action message corresponding to the performed atom action, in which the atom action message is structured to include a set of message parameters that specify the performed atom action.

22. An atom action message generating processor-implemented process, including processing processor-executable instructions via at least one processor from a component collection stored in at least one memory, the component collection storage structured with processor-executable instructions comprising:

obtain, via the at least one processor, an atom interaction interface mechanism initial actuation from a user;

determine, via the at least one processor, an atom messaging object datastructure corresponding to the actuated atom interaction interface mechanism,
  in which the atom messaging object datastructure is instantiated from an atom messaging object type from a set of orthogonal atom messaging object types,
    in which each orthogonal atom messaging object type is operable on by a set of common atom actions;

retrieve, via the at least one processor, an atom terms datastructure associated with the atom messaging object datastructure, in which the atom terms datastructure is structured to specify a set of terms by which the user agreed to abide in return for being allowed to interact with the atom messaging object datastructure;

determine, via the at least one processor, a set of allowed common atom actions, in which the set of allowed common atom actions includes common atom actions, from the set of common atom actions, allowed by the atom terms datastructure;

generate, via the at least one processor, a set of atom action interaction interface mechanisms, each atom action interaction interface mechanism in the set of atom action interaction interface mechanisms corresponding to an allowed common atom action from the set of allowed common atom actions and in response to the initial actuation;

provide, via the at least one processor, the generated atom action interaction interface mechanisms in the set of atom action interaction interface mechanisms for display to the user obtain, via the at least one processor, an atom action interaction interface mechanism subsequent actuation from the user;

determine, via the at least one processor, a performed atom action corresponding to the actuated atom action interaction interface mechanism; and generate, via the at least one processor, an atom action message corresponding to the performed atom action, in which the atom action message is structured to include a set of message parameters that specify the performed atom action.

\* \* \* \* \*